US011980813B2

(12) United States Patent
Gan

(10) Patent No.: US 11,980,813 B2
(45) Date of Patent: May 14, 2024

(54) SYSTEM AND METHOD OF USING A VIRTUAL FOCAL POINT IN REAL PHYSICAL GAME

(71) Applicant: ZTAG, INC., Castaic, CA (US)

(72) Inventor: Quan Gan, Castaic, CA (US)

(*) Notice: Subject to any disclaimer, the term of this patent is extended or adjusted under 35 U.S.C. 154(b) by 112 days.

(21) Appl. No.: 17/703,070

(22) Filed: Mar. 24, 2022

(65) Prior Publication Data
US 2022/0355198 A1    Nov. 10, 2022

Related U.S. Application Data

(60) Provisional application No. 63/183,739, filed on May 4, 2021.

(51) Int. Cl.
*A63F 13/12* (2006.01)
*A63F 13/50* (2014.01)
*A63F 13/65* (2014.01)

(52) U.S. Cl.
CPC .............. *A63F 13/50* (2014.09); *A63F 13/65* (2014.09)

(58) Field of Classification Search
CPC .... A63F 13/211; A63F 13/235; A63F 13/245; A63F 13/30; A63F 13/327; A63F 13/332; A63F 13/428; A63F 13/44; A63F 13/65; A63F 13/70; A63F 13/92; A63F 2300/105; A63F 2300/204; A63F 2300/537; A63F 2300/5573; A63F 7/0604; A63H 27/00; A63H 27/12; A63H 30/04; A63H 17/00; B64C 39/024; B64C 27/08; B64C 2203/00; B64U 2101/00; B64U 10/13; B64U 2201/20; G06F 3/0346; G06F 3/0481; G06F 1/1684
See application file for complete search history.

(56) References Cited

U.S. PATENT DOCUMENTS

| | | | |
|---|---|---|---|
| 8,391,825 | B2 | 3/2013 | Arseneau et al. |
| 8,570,168 | B2 | 10/2013 | Logan et al. |
| 8,651,961 | B2 | 2/2014 | Muller |
| 8,860,760 | B2 | 10/2014 | Chen et al. |
| 9,047,698 | B2 | 6/2015 | Maciocci et al. |

(Continued)

FOREIGN PATENT DOCUMENTS

| | | |
|---|---|---|
| JP | 0869378 | 3/1996 |
| JP | 6499154 | 3/2019 |
| KR | 101591579 | 2/2016 |

OTHER PUBLICATIONS

Cradle: Combined RF/Acoustic Detection and Localization of Passive Tags; Arbabian et al. IEEE Publication vol. 68, No. 6, Jun. 2021.

(Continued)

*Primary Examiner* — Lawrence S Galka
(74) *Attorney, Agent, or Firm* — Patent Law Agency, LLC; Peter Ganjian

(57) ABSTRACT

The present invention discloses a gaming system that is comprised of a plurality of computing devices, where a computing device initially exhibits an active state of an instance of a Virtual Focal Point (VFP), and another computing device initially exhibit an IN-active state of the instance of the Virtual Focal Point of the computing device. The active state of the instance of the VFP of the computing device may be transferred to the other computing device with the IN-active state of the instance of the VFP.

12 Claims, 44 Drawing Sheets

(56) References Cited

U.S. PATENT DOCUMENTS

| | | |
|---|---|---|
| 9,077,865 B1 | 7/2015 | Molyneux |
| 9,143,564 B2 | 9/2015 | Milburn et al. |
| 9,330,478 B2 | 5/2016 | Anderson |
| 9,700,781 B2 | 7/2017 | Monari et al. |
| 9,734,477 B2 | 8/2017 | Weast et al. |
| 9,741,244 B2 | 8/2017 | Berelejis et al. |
| 9,832,441 B2 | 11/2017 | Osman |
| 9,898,663 B2 | 2/2018 | Wexler et al. |
| 10,089,772 B2 | 10/2018 | Tayloer et al. |
| 10,104,329 B2 | 10/2018 | Faratzis |
| 10,105,619 B2 | 10/2018 | Gutierrez et al. |
| 10,127,723 B2 | 11/2018 | Miller |
| 10,176,637 B2 | 1/2019 | Billbrey et al. |
| 10,203,762 B2 | 2/2019 | Bradski et al. |
| 10,336,469 B2 | 7/2019 | Mallinson |
| 10,653,337 B2 | 5/2020 | Markison et al. |
| 2006/0287113 A1 | 12/2006 | Small et al. |
| 2007/0053201 A1 | 3/2007 | Dietz et al. |
| 2009/0325699 A1 | 12/2009 | Delgiannidis |
| 2011/0300941 A1 | 12/2011 | Weston et al. |
| 2012/0105466 A1 | 5/2012 | Leslie |
| 2012/0229381 A1 | 9/2012 | Langridge |
| 2013/0130758 A1* | 5/2013 | Moore .................. A63F 13/92 463/2 |
| 2014/0204002 A1 | 7/2014 | Bennet et al. |
| 2014/0320824 A1 | 10/2014 | Kim et al. |
| 2014/0328485 A1 | 11/2014 | Saulters |
| 2016/0134911 A1 | 5/2016 | Tetreault |
| 2016/0228764 A9 | 8/2016 | Condon et al. |
| 2016/0317383 A1 | 11/2016 | Stanfield et al. |
| 2017/0006356 A1 | 1/2017 | Krasadakis |
| 2018/0052648 A1 | 2/2018 | Ziv et al. |
| 2018/0077276 A1 | 3/2018 | Wright et al. |
| 2018/0174401 A1 | 6/2018 | Iao et al. |
| 2018/0234742 A1 | 8/2018 | Abrams |
| 2018/0329671 A1 | 11/2018 | Einziger et al. |
| 2018/0352303 A1 | 12/2018 | Siddique et al. |
| 2018/0364741 A1 | 12/2018 | Van Voorst |
| 2019/0132372 A1 | 5/2019 | Litsyn et al. |
| 2019/0162834 A1 | 5/2019 | Al-Alusi |
| 2019/0246146 A1 | 8/2019 | Bustamante et al. |
| 2022/0402606 A1* | 12/2022 | Kovács ................ A63F 13/213 |

OTHER PUBLICATIONS

Energy-Neutral Devices: Can Hybrid RF-Acoustic Signals Point Them Out?; COX et al. Dept of EE, Ku Leuven, Belgim Dec. 2020.

High Percision Hybrid RF Ultrasonic Chirp-Based Ranging for Low Power IOT Nodes; Cox et al., Eurasip Journal On Wireless Communications and Networking 2020.

Radio Frequnecy Time-Of-Flight Distance Measurtment for Low-Cost Wireless Sensor Localization; IEEE Sensors Journal Apr. 2011.

High Accuracy Ultrasound Micro-Distance Measurments With Pmuts Under Liquid Operation; Zamora et al. ; Jun. 2021.

PCT/US2022/027211 ; ISR and Written Opinion dated Jan. 12, 2023.

* cited by examiner

RF SET-VFP SIGNAL PACKET

| Header | Packet type: SET VFP | Source ID Central Command | Destination ID (selected device) | Other PAYLOAD(S) (e.g., team ID) | Error Checking |

DIRECTIONAL SIGNAL PACKET

| Header | Packet type: ATTACK | SOURCE DEVICE ID | DESTINATION DEVICES ID: BROADCAST | OTHER PAYLOAD(S) (e.g., Team ID) | ERROR CHECKING |

DESTINATION DEVICES ID: BROADCAST — IR PACKET FROM SOURCE DEVICE IS BROADCAST TRANSMITTED TO ALL OTHER DEVICES

FIG. 3M-1

RF VFP HANDOFF SIGNAL PACKET

| Header | Packet type: HANDOFF | SOURCE ID | DESTINATION ID | OTHER PAYLOAD(S) (e.g., team ID) | ERROR CHECKING |

SOURCE ID = DEVICE with ACTIVE state of the instance of the VFP

DESTINATION ID = DEVICE with IN-active state of the instance of the VFP

FIG. 3M-2

RF RECEIVE VFP SIGNAL PACKET

| Header | Packet type: RECEIVE VFP | SOURCE ID | DESTINATION ID (E.G., ATTACKER) | OTHER PAYLOAD(S) (e.g., team ID) | ERROR CHECKING |

FIG. 3M-3

RF HIT-ACK SIGNAL PACKET

| Header | Packet type: HIT-ACK | SOURCE DEVICE ID | DESTINATION DEVICE ID (Broadcast mode) | OTHER PAYLOAD(S) | ERROR CHECKING |

FIG. 3M-4

Directional VFP Handoff Signal Packet

| Header | Packet type: VFP HANDOFF | SOURCE DEVICE ID | DESTINATION DEVICES ID: BROADCAST | OTHER PAYLOAD(S) (e.g., Team ID) | ERROR CHECKING |
|---|---|---|---|---|---|

FIG. 3N-4

RF VFP HANDOFF-ACK SIGNAL PACKET

| Header | Packet type: VFP HANOFF-ACK | SOURCE ID | DESTINATION ID (E.G., PASSER) | OTHER PAYLOAD(S) (e.g., team ID) | ERROR CHECKING |
|---|---|---|---|---|---|

FIG. 3N-5

SYSTEM AND METHOD OF USING A VIRTUAL FOCAL POINT IN REAL PHYSICAL GAME

CROSS-REFERENCE TO RELATED APPLICATIONS

This Application claims the benefit of priority of U.S. Utility Provisional Patent Application 63/183,739, filed 4 May 2021 the entire disclosure of which is expressly incorporated by reference in its entirety herein.

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention relate to a system and a method using a virtual focal point that is perceptible (observable or discernible, etc.) in a real, physical game. More particularly, one or more embodiments of the present invention relate to a system and a method using a virtual focal point in a real, physical, in-person multi-player game using one or more computing devices.

Description of Related Art

Conventional physical-digital games using multiple players with computing devices that may also use a real physical object such as a ball or flag are well known and have been in use for a number of years. As a non-limiting example, multiple players with their player computing devices (e.g., wearable device) may electronically tag other player devices, with a physical player of an electronically tagged device physically handing over a physical object such as a real physical ball or a flag to the player with the electronically tagging player device.

Regrettably, for most players and spectators such physical-digital games are confusing to follow since the players are dispersed and the devices used by players provide limited information, which are generally available to each individual player associated with the device only. Further, there is a physical delay between the time player devices are electronically tagged and the recognition of the players that their devices have been tagged. For example, a player device may have been electronically tagged by another player device, but the tagged player may continue to play as if they have not been tagged, unaware of the fact that their device is tagged. This creates confusion for both players and spectators.

In drone aerial combat using ZTAG®, LED indicators mounted on drones is another "tag" game based on multiple players with drones. The ZTAG®, LED indicators are visible only to the player with the remote control of the drone (similar to a heads-up display). The object of the game is similar to a tag game where one drone electronically tags another drone, with the ZTAG®, LED indicators notifying the player that their drone has been tagged. Use of drones in such games is even more confusing in that all activity takes place hundreds of feet above and away from players and spectators. For example, a drone flying hundreds of feet in air at a left-end of a large open field does not provide tagging status information about itself to other players or to spectators. This creates confusion for players. The problem is compounded for spectators, where they would merely observe random, confusing mess of flying motions and directions of multiple drones, not knowing which drone is being chased and or which is tagged.

Accordingly, a system and a method are needed that would provide a virtual focal point that would be perceptible (or observable or discernible, etc.) in a real, physical game by players and spectators. More particularly, a system and a method are needed that would provide a virtual focal point in a real, physical, in-person multi-player game using one or more computing devices that would enable both players and spectators to "follow" the game and not be confused.

BRIEF SUMMARY OF THE INVENTION

A non-limiting, exemplary aspect of an embodiment of the present invention provides a gaming system, comprising:
- a plurality of computing devices;
- a computing device of the plurality of the computing devices initially exhibits an active state of an instance of a Virtual Focal Point (VFP); and
- one or more other computing device of the plurality of the computing devices initially exhibits an in-active state of the instance of the VFP;
- wherein: the VFP of the computing device is transferred to one of the one or more other computing device with the in-active state of the instance of the VFP when the computing device receives a targeted signal from the one of the one or more other computing device.

Another non-limiting, exemplary aspect of an embodiment of the present invention provides a gaming system, comprising:
- a plurality of computing devices;
- a computing device of the plurality of the computing devices initially exhibits an active state of an instance of a Virtual Focal Point (VFP); and
- one of the one or more other computing device of the plurality of the computing devices initially exhibits an in-active state of the instance of the VFP of the computing device;
- wherein: the VFP of the computing device is transferred to the one of the one or more other computing device with the in-active state of the instance of the VFP when the one of the one or more other computing device receives a targeted signal from the one of the one or more other computing device.

Still another non-limiting, exemplary aspect of an embodiment of the present invention provides a gaming system, comprising:
- a plurality of computing devices;
- a computing device of the plurality of computing devices exhibits an active state of an instance of a Virtual Focal Point (VFP), and
- one of the one or more other computing device of the plurality of computing devices exhibits an inactive state of the instance of the VFP of the first computing device;
- the computing device transmits a Handoff Signal Packet of Virtual Focal Point to the one of the one or more other computing device;
- the one of the one or more other computing device receives the Handoff Signal Packet of VFP, and transmits a Handoff-Acknowledgement (Handoff-ACK) Signal Packet of VFP to the computing device;

the computing device determines if Handoff-ACK Signal Packet of Virtual Focal Point from the other computing device is received and transmits Virtual Focal Point Release Signal Packet to other computing device;

the one of the one or more other computing device determines if VFP Release Signal Packet is received from the computing device and transmits VFP Transfer Complete Signal Packet to the computing device;

the computing device determines if VFP Transfer Complete Signal Packet is received from the one of the one or more other computing device;

wherein: the computing device that exhibited the active state of the instance of the VFP exhibits the inactivated state of the instance of the VFP, and the one of the one or more other computing device that exhibited the inactive state of the instance of the VFP of the computing device exhibits an activate state of the instance of the VFP of the computing device.

A further non-limiting, exemplary aspect of an embodiment of the present invention provides a gaming system, comprising:

a plurality of computing devices;

a first computing device of the plurality of the computing devices initially exhibits an active state of an instance of a Virtual Focal Point (VFP); and a second computing device of the plurality of the computing devices initially exhibits an in-active state of the instance of the Virtual Focal Point;

wherein: for voluntary transfer of VFP, the VFP of the first computing device is transferred to the second computing device when the second computing device receives a targeted signal from the first computing device;

wherein: for involuntary transfer of VFP, the VFP of the first computing device is transferred to the second computing device when the first computing device receives a targeted signal from the second computing device.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

DETAILED DESCRIPTION OF THE INVENTION

Figure 1A:
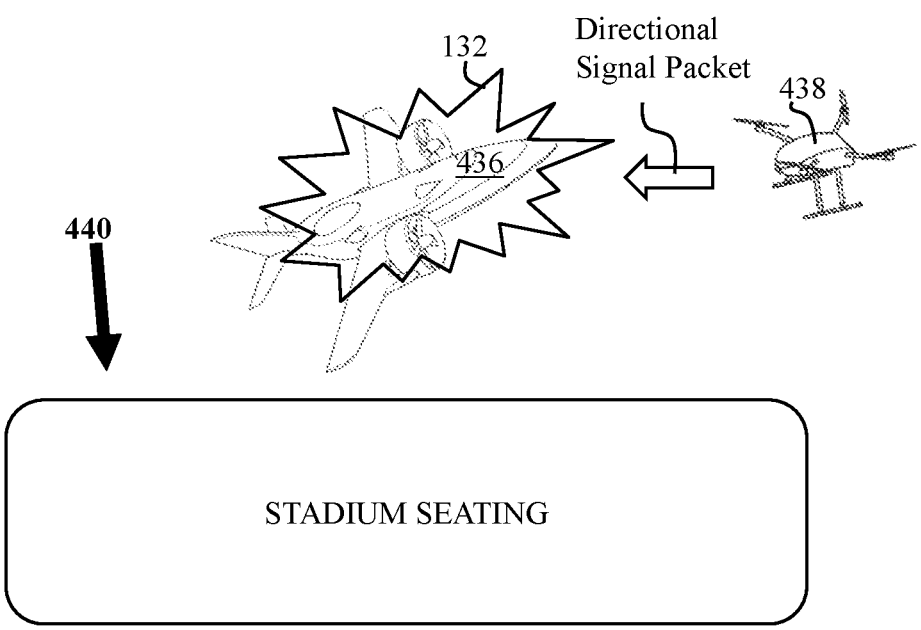
FIGS. 1A and 1B are non-limiting, exemplary systems overview illustrations of use of virtual focal point in a real, physical, in-person multi-player game using one or more computing devices in accordance with one or more embodiments of the present invention.

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

For purposes of illustration, programs and other executable program components are illustrated herein as discrete blocks, although it is recognized that such programs and components may reside at various times in different storage components, and are executed by the data processor(s) of the computers. Further, each block within a flowchart (if a flowchart is used) may represent both method function(s), operation(s), or act(s) and one or more elements for performing the method function(s), operation(s), or act(s). In addition, depending upon the implementation, the corresponding one or more elements may be configured in hardware, software, firmware, or combinations thereof.

The below-described computer hardware and software are presented for purposes of illustrating the basic underlying computer components that may be employed for implementing the present invention. The present invention may be implemented in any well-known type of system architecture or processing environment capable of supporting the methodologies of the present invention presented in detail below. Therefore, for example, the present invention may operate directly between computing devices with or without the use of a central computing device (or a Central Command, further detailed below). In general, computing devices, databases, and networks that may be used in accordance with one or more embodiments of the present invention are very well documented in the technical, trade, and patent literature.

The present invention provides a user interface that is understandable by human intellect and human senses for interaction. A non-limiting example of a user interface may include physical interface or graphic user interface (GUI) to allow a visual way of interacting with computing devices. The disclosed user interface (if any), provided throughout the disclosure is meant to be illustrative and for convenience of example only and should not be limiting. Therefore, the present invention is not limited to any particular user interface configuration and may be implemented in a variety of different types of user interfaces (physical or virtual—GUI). Further, all user interface representations (if any) of any concepts, aspects, functions, or features may be varied and therefore, none should be limiting. The non-limiting, non-exhaustive illustrations of the user interfaces (if any) used throughout the disclosure are provided only for a framework for discussion.

One or more embodiments of the present invention define "virtual" as not physically existing as such but made by software to appear to do so, and carried out, accessed, or stored by means of one or more computing devices (networked or otherwise).

One or more embodiments of the present invention define non-virtual as physically existing in real, physical space. Throughout the disclosure "non-virtual", "real", "physical", or "physical space" may be used interchangeably.

One or more embodiments of the present invention define a "Virtual Focal Point" (or VFP) as a virtual center of focus that is perceptible (observable, noticeable, discernible, etc.) in the real physical space.

One or more embodiments of the present invention define tag, tagging, tagged, etc. or shoot, or hit, etc. as when one computing device electronically breaches an electronic proximity threshold of another computing device and or when one computing device's targeted signal is received by another computing device. Non-limiting examples of a targeted signal are electronic signals, acoustic signals, RF signals, IR signals, etc. that may be either directional or non-directional (e.g., broadcast) signals, etc.

Accordingly, it should be understood that the terms "tag," "tagging," "tagged," "hit," "shoot," etc. are equivalent and shorthand for "electronic tagging" "electronically tagged," "electronically hit," etc.

One or more embodiments of the present invention define the phrase "physical-digital" as an actual physical game played by physically active players that involved the use of digital devices.

It should be noted that throughout the disclosure, all signals (e.g., RF, IR, etc.), signal transmissions, signal communications, etc., may use any well-known packet format types, non-limiting examples of which may be those used in Ethernet protocol, WLAN, or any other similar format types, subsets thereof, etc.

One or more embodiments of the present invention provide a system and a method that uses a virtual focal point that may be perceptible (or observable or discernible, etc.) in real, physical space by players and spectators. More particularly, a system and a method are provided that introduce a virtual focal point in a real, physical, in-person multi-player game using one or more computing devices that enables both players and spectators to "follow" the game based on the perceptible (or observable or discernible, etc.) virtual focal point and not be confused.

Figure 1B:
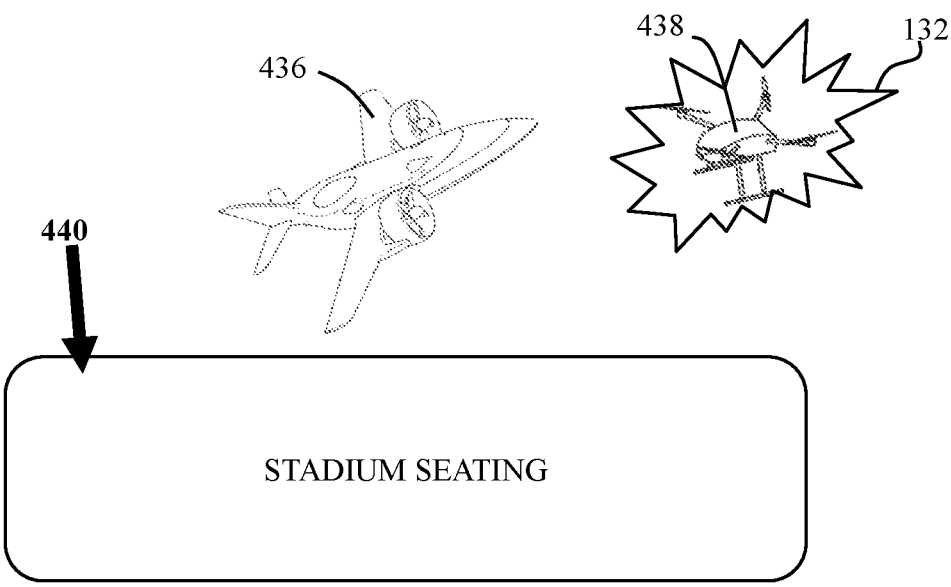

FIGS. 1A and 1B are non-limiting, exemplary systems overview illustrations of use of virtual focal point in a real, physical, in-person multi-player game using one or more computing devices in accordance with one or more embodiments of the present invention. As illustrated, a first drone 436 exhibiting an active state of an instance of a VFP 132 (e.g., strobing light) is being chased by a second drone 438 with the IN-active state of the instance of the VFP 132. As shown in FIG. 1B, after the first drone 436 is successfully tagged by the chasing second drone 438, the possession of the active state of the instance of the VFP 132 is virtually "transferred" to the second drone 438.

A non-limiting example of actualization "or transfer" of a virtual focal point would be to enable a computing device to store a Boolean of "hasPossession". If the Boolean "hasPossession" returns a TRUE, then the device may switch to an active state of an instance of VFP. As a non-limiting, example, it may provide perceptible, discernible, or observable indication (e.g., emit visual and or audio indicators) to signal to other participants and spectators that it has possession of a virtual focal point. On the other hand, if the Boolean "hasPossession" returns a FALSE, then the device will return to its default output state of an IN-active state of an instance of VFP.

Accordingly, as illustrated in FIGS. 1A and 1B, spectators 440 no longer observe a random, confusing mess of flying motions and directions of multiple drones, not knowing which drone is being chased and or which is tagged for this exemplary game. With the use of VFPs 132, spectators 440 may easily follow the game played and distinguish the various computing devices (e.g., chasing drone 438 from the chased drone 436), in addition to enjoying the spectacular maneuvering of the drones by players. Therefore, the use of VFP enables both players and spectators to "follow" the game based on the perceptible (or observable or discernible, etc.) virtual focal point and not be confused. As further detailed below, the generation of a virtual focal point enables possession-based game dynamics and allows for both players and spectators to easily follow the game action.

Figure 1C:
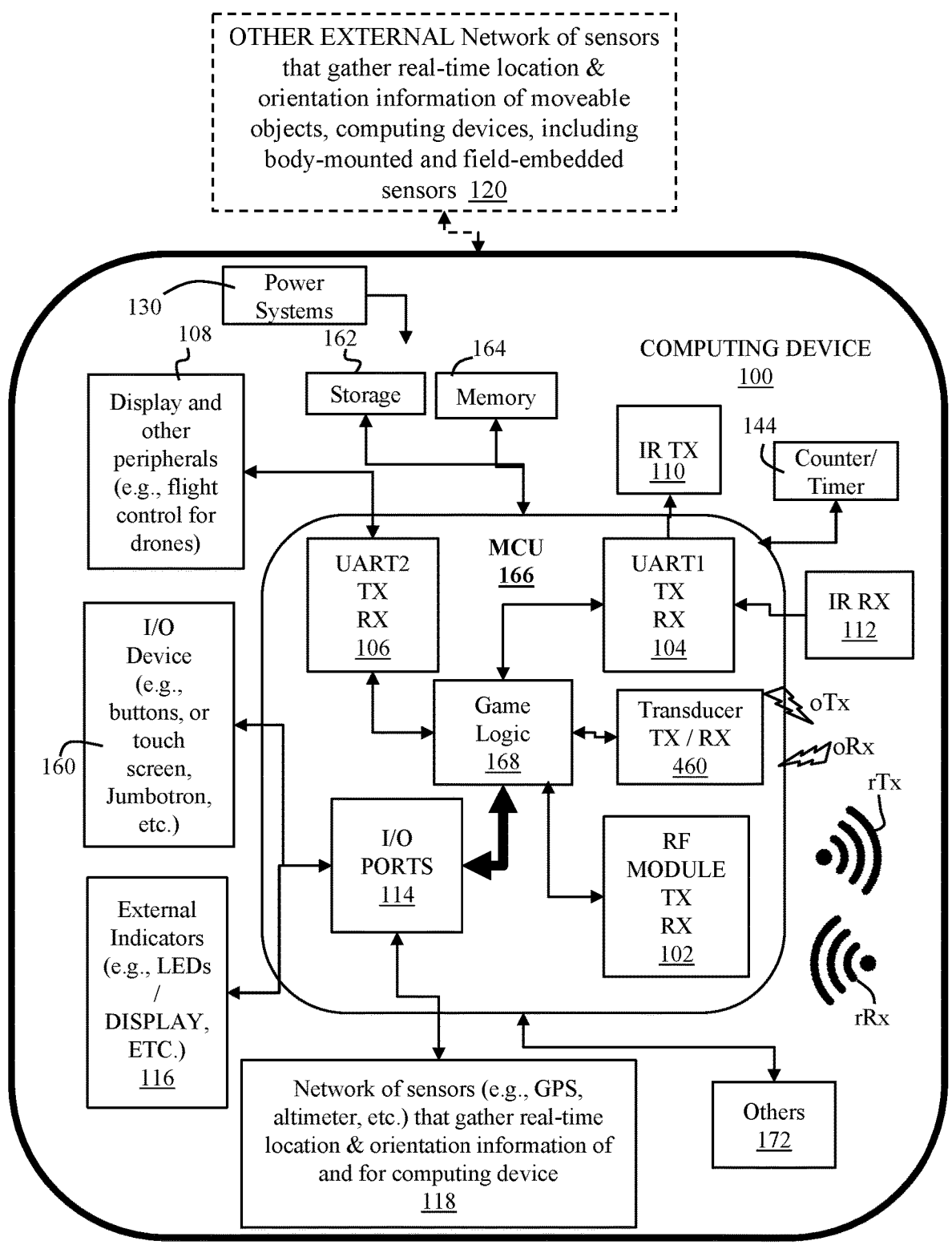
FIG. 1C is a non-limiting, exemplary illustration of a computing machine hardware with a game logic in accordance with one or more embodiments of the present invention.

The present invention may be implemented on conventional computing machines. FIG. 1C is a non-limiting, exemplary illustration of well-known, conventional computing machine hardware in accordance with one or more embodiments of the present invention. As illustrated in FIG. 1C, the computing machines (or computing devices 100) for implementing the system and method of the present invention may be any well-known conventional computing machine, non-limiting examples of which may include mobile devices, wearable devices, or a simple Printed Circuit Board that includes all of the conventional components of a conventional computing device, but mounted on a chassis of a second device such as a drone for example. The illustrated computing device 100 may (or may not) be Network and or Internet enabled in a well-known conventional manner.

Computer device 100 shown in FIG. 1C is a representative of all computing devices disclosed throughout the present invention and includes the typical, conventional components such as a power system (e.g., battery, USB charging, etc.) 130, an I/O module 160 (e.g., a keyboard or touch screen display, etc.), a storage module 162 for storing information (may use Cloud Computing Systems and services), and memory 164 used by a Microcontroller Unit (MCU) 166 to execute programs (game logic 168). Computing device 100 may also include well-known incremental counter/Timer mechanism 144, which may be used for a variety of factors detailed below such as Cumulative Possession Time (CPT), hit, tag, or goal counts, etc.

Further included are a number of different communication modules for implementing desired communication protocol and their respective communications interface (e.g., transceiver modules) for transmitting and receiving data or signal packets, and may or may not include other components 172 such as an image/video/sound capture device such as a camera, voice recording microphone, stylus, etc.

In the non-limiting, exemplary instance illustrated in FIG. 1C, computing device 100 implements both omni-directional and directional transmission of data/signal packets.

In this non-limiting, exemplary instance, omni-directional transmission of data/signal packets may be implemented using Radio Frequency (RF) for radio transmission rTx and radio reception rRx of various signal/packets intended for omni-directional transmission via a well-known RF Module 102.

In this non-limiting, exemplary instance, directional (or line-of-sight) transmission of data/signal packets may be implemented using Infrared (IR) signal/packets for IR transmission iTx and IR reception iRx of various signal/packets intended for directional transmission via a well-known first Universal Asynchronous Receiver/Transmitter (or UART1) 104 module of MCU 166 through IR emitter IR TX 110 and IR sensor IR RX 112. It should be noted that sound, RF transmission/reception, etc., may also be used for directional signaling.

As further illustrated, computing device 100 may further include a second UART2 106 for RF transmission and reception of RF signals/packets in communications with a display or other peripherals (e.g., flight control for drones) 108.

In this non-limiting, exemplary instance, other omni-directional and or directional transmission of data/signal packets may be implemented using other medium such as acoustic signals (e.g., ultrasound) for transmission oTx and reception oRx of various signal/packets via any well-known transducer 460. As a very specific, non-limiting, example, MCU 166 may be connected to a speaker to transmit acoustic signals oTx and a microphone to receive acoustic signals oRx, both of which may be implemented as either directional or omni-directional.

As further illustrated, the computing device further includes I/O ports 114 communicatively associated with one or more external indicators 116, other network of sensors 118, and other input/output devices 160. The present invention may further include other external network of sensors 120 in communication with computing device 100. Network of sensors 118 and 120 may include, for example, GPS, altimeter, etc. that gather real-time location & orientation information of objects, computing device 100, etc. including body-mounted and field-embedded sensors.

Figure 2A:
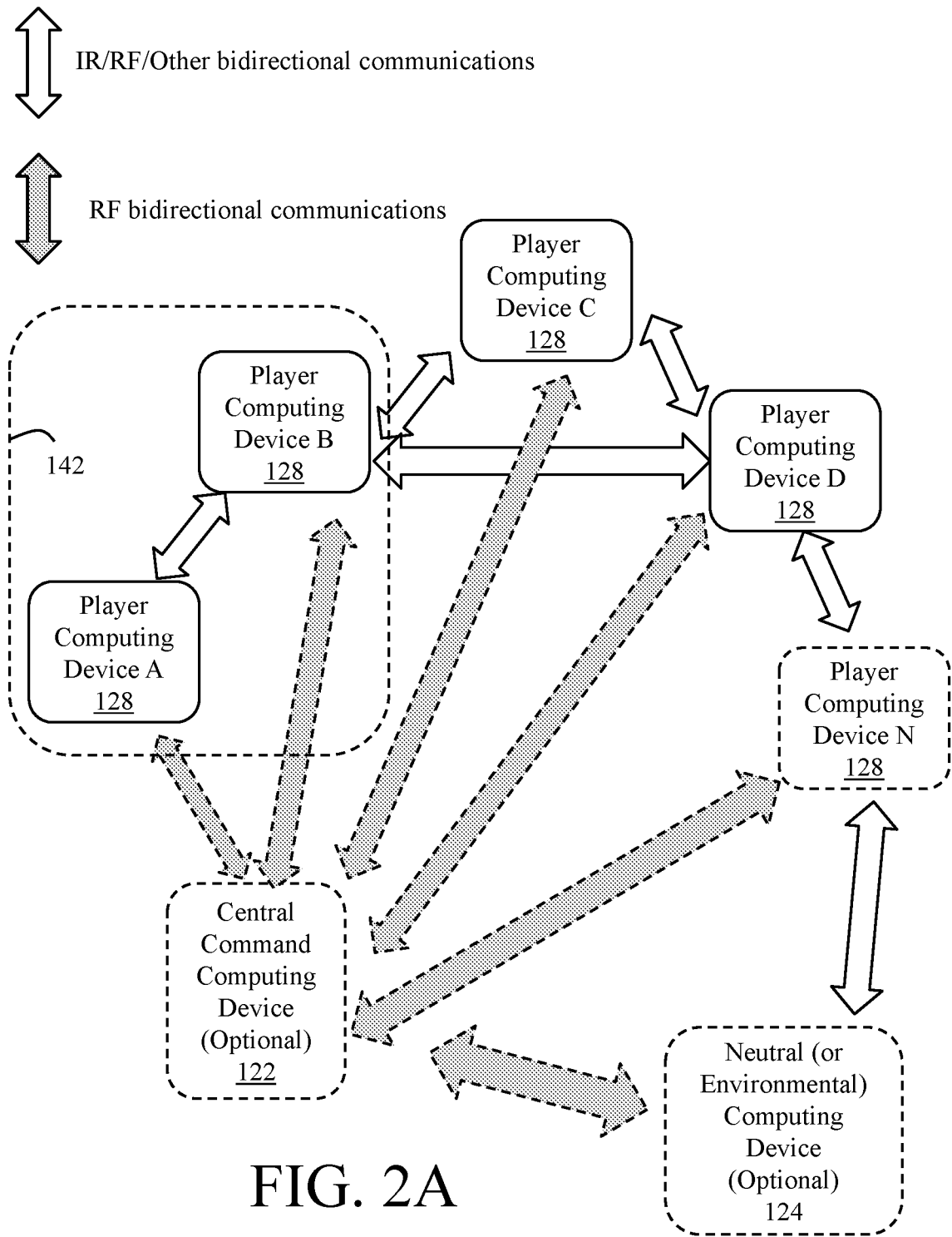
FIG. 2A is a non-limiting, exemplary illustration of interaction between a plurality of player computing devices, including interactions with one or more optional Central Command computing device, and one or more optional Neutral computing device in accordance with one or more embodiments of the present invention.

FIG. 2A is a non-limiting, exemplary illustration of interaction between a plurality of player computing devices, including interactions with one or more optional Central Command computing device(s), and one or more optional Neutral computing device(s) in accordance with one or more embodiments of the present invention. For simplicity, only one Central Command computing device and one Neutral computing device are shown in FIG. 2A.

Player computing devices 128, optional Central Command computing device 122, and the optional Neutral computing device 124 are all identical to computing device 100 illustrated in FIG. 1C in terms of hardware architecture, but may differ in terms of form factor and or stored logic. Accordingly, the present invention merely uses the terms "player" or "Central Command" or "Neutral" computing device as a naming convention to distinguish between computing devices based on game logic 168 and identify the various members of the system in accordance with one or more embodiments of the present invention.

As illustrated in FIG. 2A, a player computing device 128 may communicate with any other player computing device 128 and the optional Neutral computing device 124 using IR, RF, or other bidirectional communications. Further, any computing devices 128 and the optional Neutral computing device 124 may communicate with the optional Central Command computing device 122 with RF bidirectional communications.

Although not illustrated, all computing devices 100 may comprise one or more standalone devices connected to one or more server systems (not shown) using a well-known conventional network/Internet and conventional communications protocols. The network/Internet may be any one of a number of conventional, well-known network systems that includes functionality for packaging computing device 100 communications in any well-known manner together with any parameter (or attributes) information into a format (of one or more packets) suitable for communications between the server systems and computing devices 100 (e.g., player computing devices 128, the optional Central Command computing device 122, and or the optional Neutral computing device 124).

FIGS. 2B to 2E are non-limiting, exemplary illustrations of a focused view of interactions between a randomly selected pair of computing devices (shown within dashed lines 142 in FIG. 2A) in accordance with one or more embodiments of the present invention. As illustrated, the randomly selected pair of the computing devices selected from FIG. 2A for discussion purposes are the player computing device A and the player computing device B, referred simply as "computing device A" and "computing device B" in FIGS. 2B to 2E. The discussions in relations to FIGS. 2B to 2E are applicable to all computing devices 100, including the optional Central Command computing device 122 and the Neutral (or Environmental) computing device 124, unless specified otherwise.

Figure 2B:
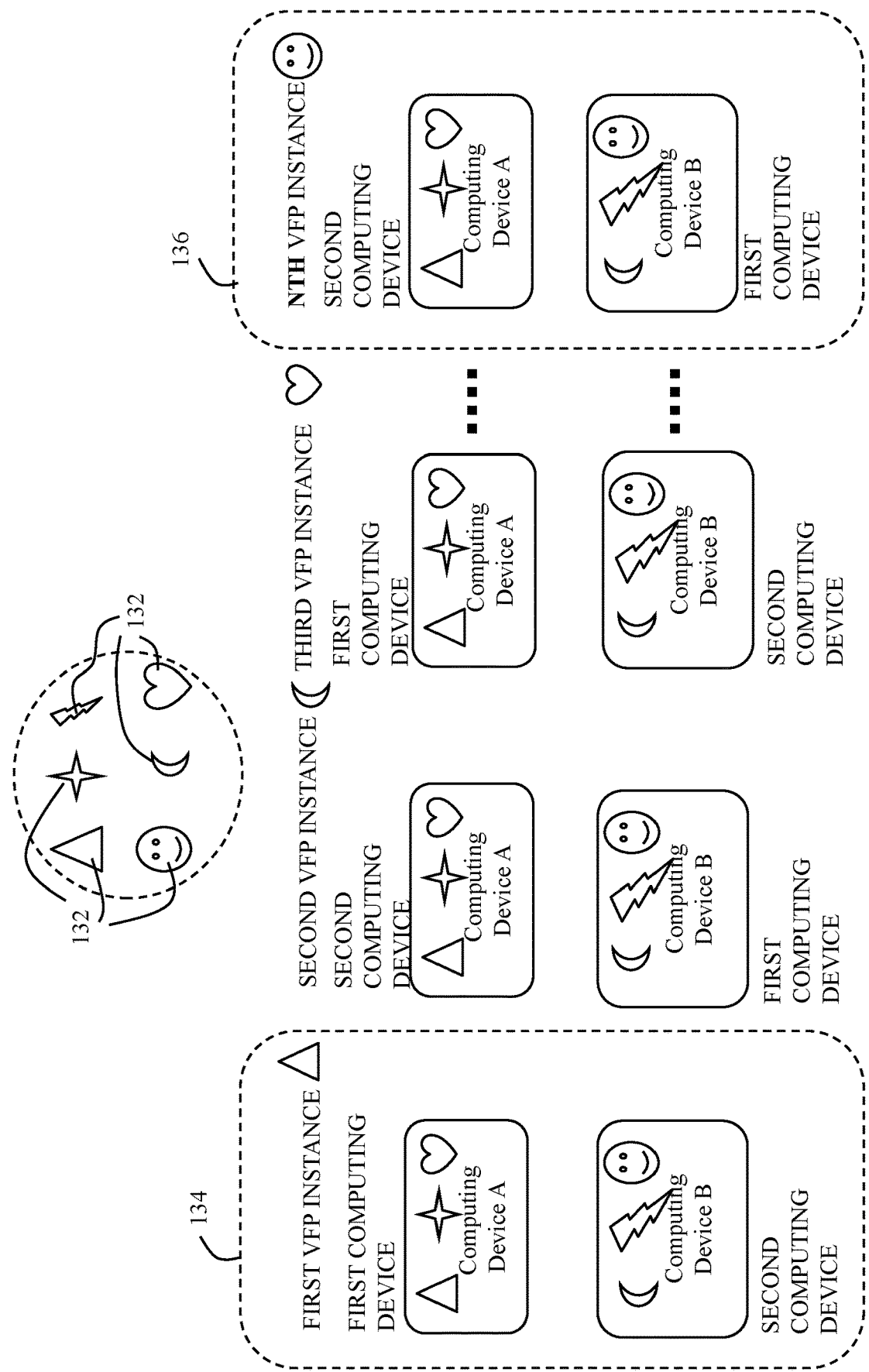
FIGS. 2B to 2E are non-limiting, exemplary illustrations of a focused view of interactions between a randomly selected pair of computing devices (shown within dashed lines 142 in FIG. 2A) in accordance with one or more embodiments of the present invention.
Figure 2C:
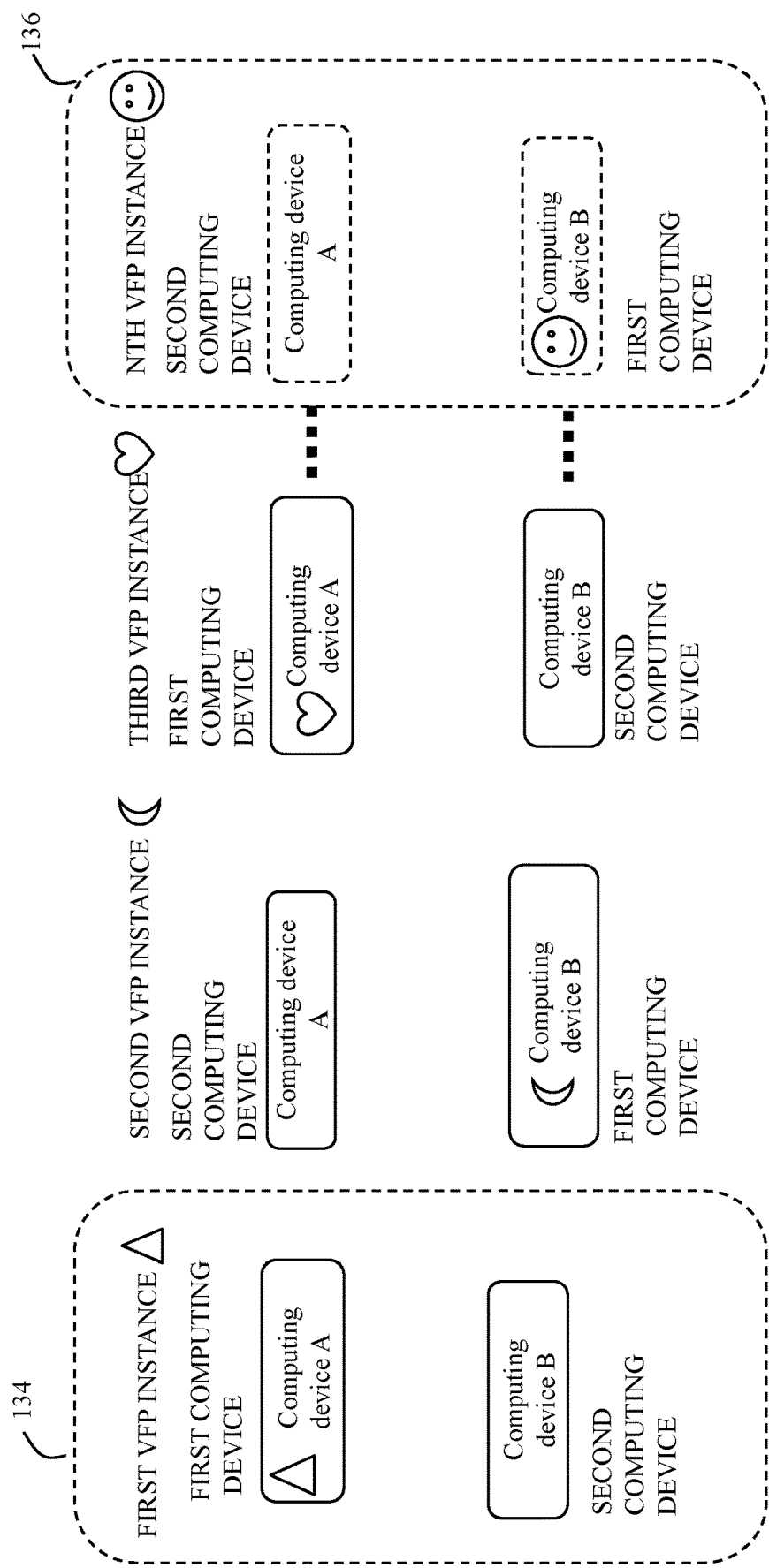

As illustrated in FIGS. 2B to 2E, a computing device 100 of the plurality of computing devices may instantiate one or more virtual focal point 132, with each instantiated virtual focal point 132 exhibiting different discernible features or attributes in accordance with one or more embodiments of the present invention. FIG. 2C is a simplified version of that which is illustrated in FIG. 2B, showing only a single VFP 132 per instance of VFP for a computing device pair.

Further, a computing device 100 of the plurality of the computing devices may initially exhibit an active state of an instance of a VFP 132, and another computing device of the plurality of the computing devices may initially exhibit an IN-active state of the instance of the same VFP 132 as that of the computing device.

As a specific example, for the instance 134 shown in FIGS. 2B and 2C where first VFP 132 instance is a TRIANGLE, computing device A initially exhibits the active state of the VFP instance 132 as TRIANGLE whereas computing device B initially exhibits an IN-active state of the instance of the same VFP 132 (i.e., TRIANGLE) of the computing device A.

As another example shown in FIGS. 2B and 2C, in the instance 136 where $N^{TH}$ VFP 132 instance is a SMILEY FACE, computing device B initially exhibits the active state of the VFP instance 132 as "SMILEY FACE" whereas computing device A initially exhibits an IN-active state of the instance of the same VFP 132 (i.e., "SMILEY FACE") of the computing device B.

It should be noted that for convenience and to distinguish or identify a specific computing device 100 (in particular, distinguishing a player computing device 128 from another player computing device 128), references such as "first computing device" and "second computing device" may also be used. In such instances, a computing device 100 that initially exhibits an active state of an instance of a VFP 132 may be defined as the first computing device, and another computing device of the plurality of the computing devices that initially exhibits an IN-active state of the instance of the same VFP 132 as that of the computing device may be defined as the second computing device. For example, for the selected instance 134 shown in FIGS. 2B and 2C where first VFP 132 instance is a TRIANGLE, the computing device A initially exhibits the active state of the VFP instance 132 as TRIANGLE and hence, for that instance 134 computing device A may be defined as the first computing device whereas computing device B, which initially exhibits an IN-active state of the instance of the same VFP 132 (i.e., TRIANGLE) of the computing device A may be defined as the second computing device.

As another example, for the selected instance 136 shown in FIGS. 2B and 2C where $N^{TH}$ VFP 132 instance is a SMILEY FACE, the computing device B initially exhibits the active state of the VFP instance 132 as SMILEY FACE and hence, for that instance 136 computing device B may be defined as the first computing device whereas computing device A, which initially exhibits an IN-active state of the instance of the same VFP 132 (i.e., SMILEY FACE) of the computing device B may be defined as the second computing device.

Figure 2D:
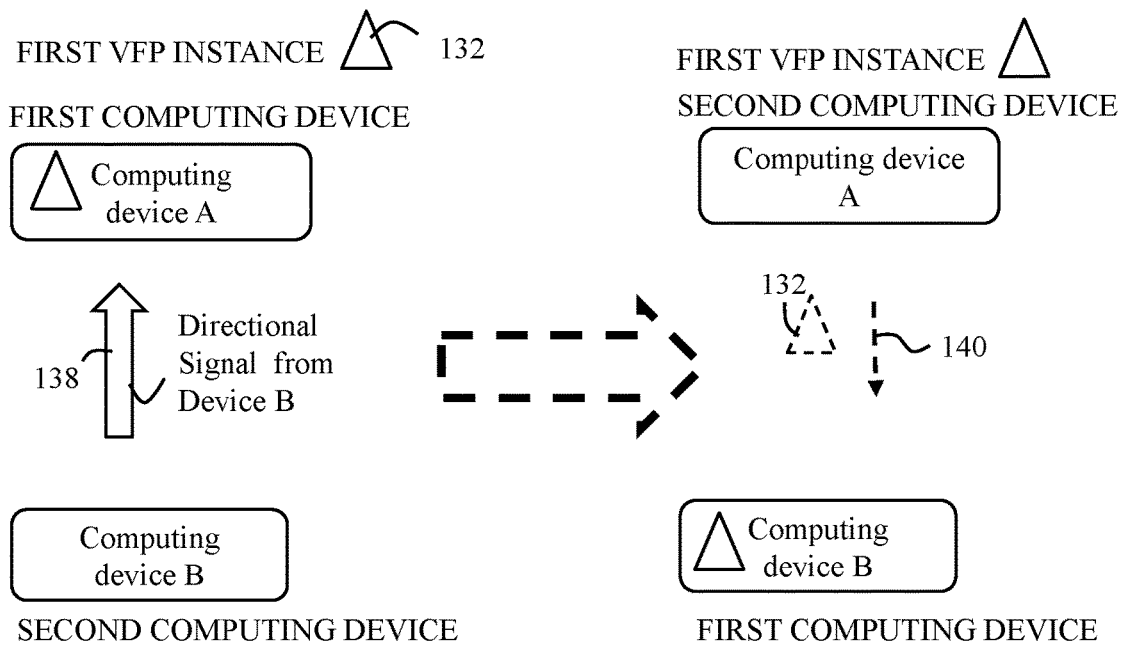
Figure 2E:
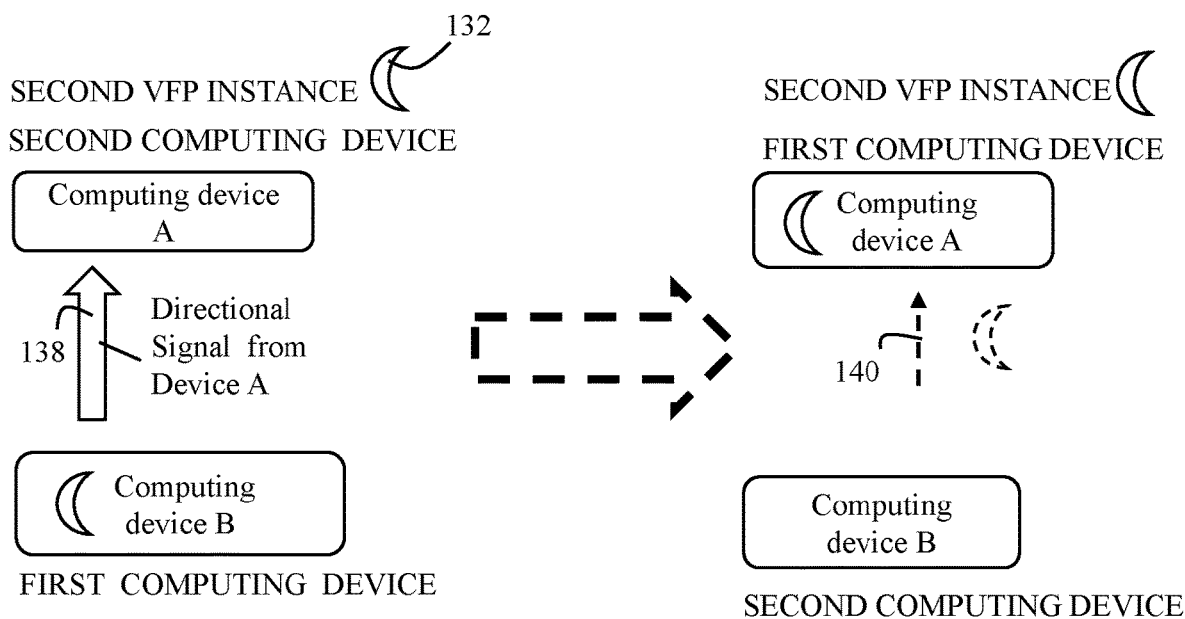

FIGS. 2D and 2E are non-limiting, exemplary illustrations of a virtual "transfer" of a VFP from one computing device to another computing device in accordance with one or more embodiments of the present invention. Referring to FIGS. 2A and 2D and as further detailed below, depending on the game, there may be many varieties of factors and situations where a VFP 132 may be "transferred" from one computing device to another computing device.

As illustrated FIG. 2D, the computing device B (the second computing device) for example, may target and transmit a directional signal packet 138 (detailed below) to electronically "shoot/hit" computing device A (the first computing device), the results of which may be a transfer (shown by arrow 140) of the VFP 132 from computing device A to computing device B (detailed below). Since computing device B now exhibits the active state of the VFP instance 132 as TRIANGLE, computing device B may now be referred to as the first computing device.

Referring to FIGS. 2A and 2E and as further detailed below, the computing device B (the first computing device) may transmit a directional signal packet 138 (detailed below) to computing device A (the second computing device) to "pass" the VFP 132, resulting in a "transfer" (shown by arrow 140) of the VFP 132 from computing device B (the first computing device) to computing device A (second computing device). Since the computing device A now exhibits the active state of the VFP instance 132 as MOON, computing device A may now be referred to as the first computing device.

It should be noted that FIG. 2D and FIG. 2E are complementary examples of TAKING VFP possession and GIVING (or passing) VFP possession, respectively. In a game, TAKING VFP possession (FIG. 2D) typically occurs involuntarily between players of different teams while GIVING (or passing) VFP possession (FIG. 2E) typically occurs voluntarily between players on the same team (depending on the game rules). Both VFP transfer mechanisms (VFP transfer as a "pass" or "taking") are important aspects of interactive possession-based gameplay. In both instances, computing device B sends a directional signal that is received by computing device A. Further, in both instances Computing device A acknowledges the reception of the directional signal from computing device B with an omni-directional acknowledgement signal that initiates a VFP transfer to give up possession or take possession (as further detailed below). FIG. 2D shows VFP transfer from computing device A to computing device B, i.e. computing device B TAKING VFP possession from computing device A. FIG. 2E shows VFP transfer from computing device B to computing devices A, i.e. computing device B GIVING VFP possession to computing device A.

The following detail a non-limiting, non-exhaustive exemplary set of methodologies for "transfer" of a VFP from one computing device to another. It should be noted that the reasons for the "transfer" of VFP are many and may depend on many factors, non-limiting, non-exhaustive examples of which may include, for example, the type of game played, the game rules, etc.

Figure 3A:
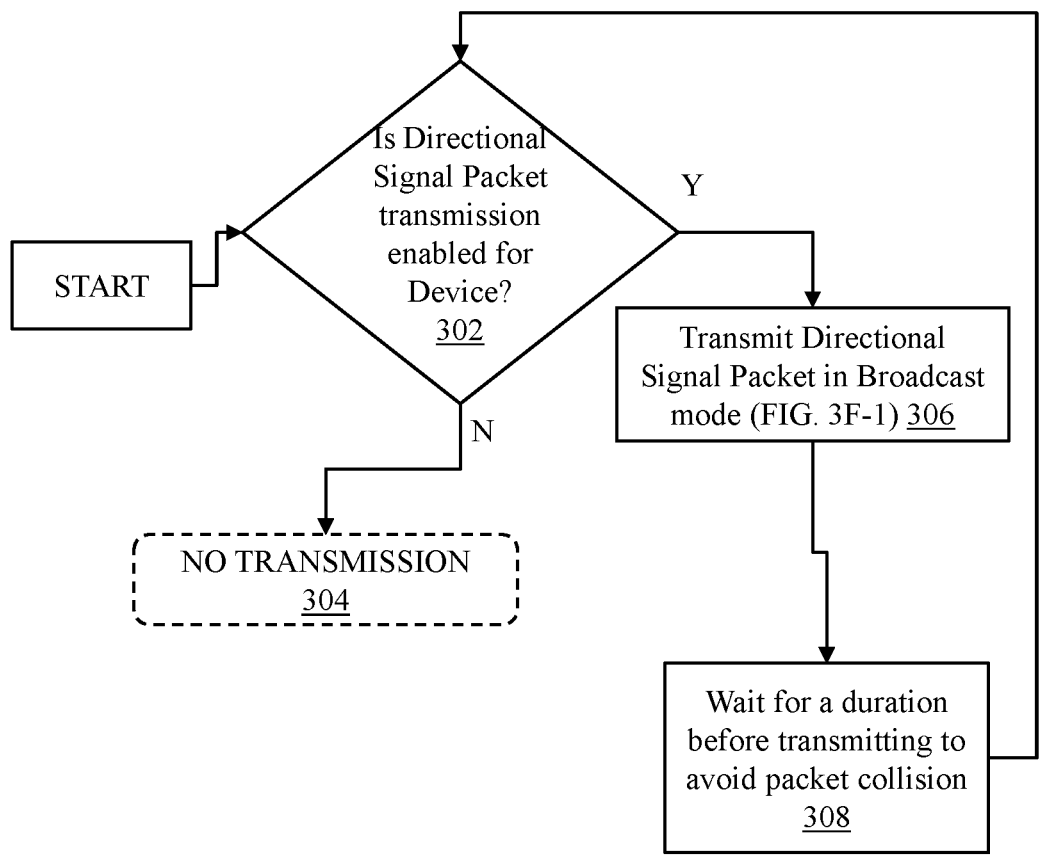
FIGS. 3A to 3N-5 are non-limiting, exemplary illustrations of flowcharts that represent one or more methods for operations of the one or more computing devices shown in FIGS. 1 and 2A to 2E in accordance with one or more embodiments of the present invention.

FIG. 3A is a non-limiting, exemplary flowchart that details transmission of a Directional Signal Packet by a computing device in accordance with one or more embodiments of the present invention.

As illustrated, MCU 166 based on Game Logic 168 of a computing device 100 at operations 302 determines if a Directional Signal Packet transmission is enabled. If MCU 166 determines that the Directional Signal Packet transmission is not enabled, then there would be no transmission (operations 304). Depending on the game, game rules, etc. the Directional Signal Packet transmission may remain disabled or become enabled.

As further illustrated in FIG. 3A, if MCU 166 based on Game Logic 168 of computing device 100 at operations 302 determines that Directional Signal Packet transmission is enabled, at operations 306, MCU 166 commences transmission of Directional Signal Packet in broadcast mode by IR Tx transmitter (emitter) 110 via UART1 TxRx transceiver 104 or oTx via transducer module 460. However, as indicated in operations 308, MCU 166 may generally wait for a set duration of time T before transmitting the Directional Signal Packet to avoid potential signal packet collision.

Figure 3B:
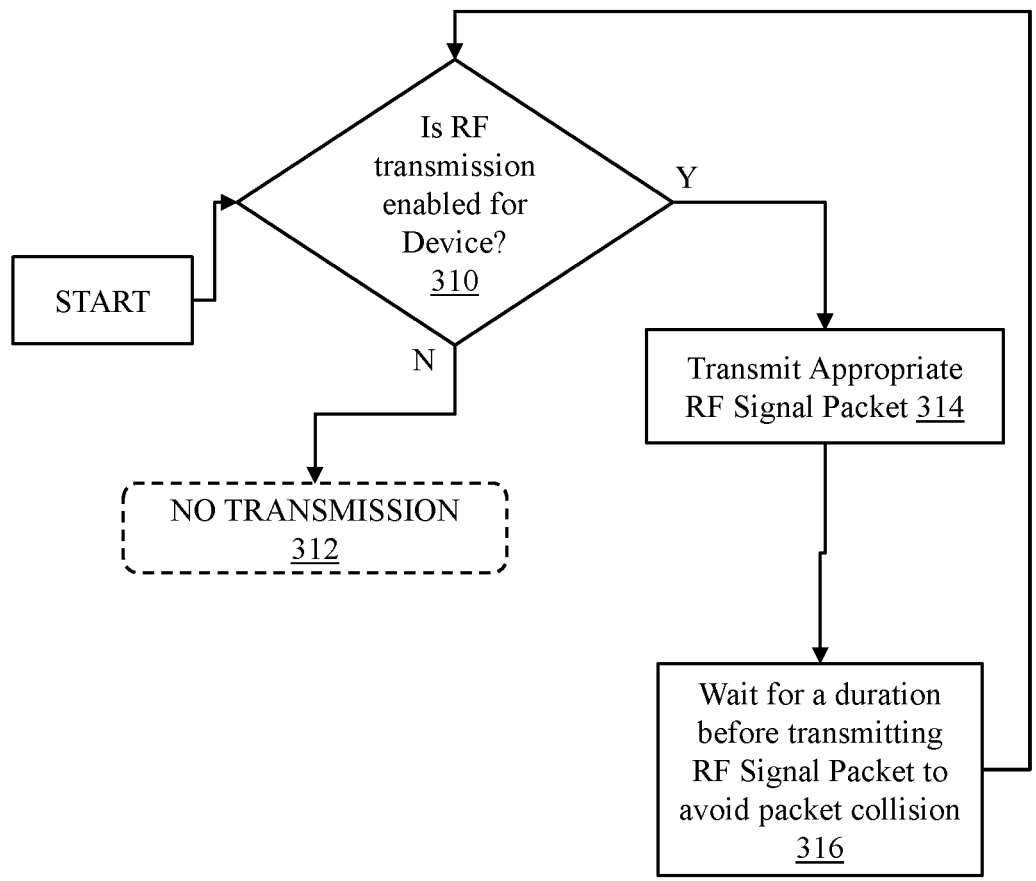
Figure 3C:
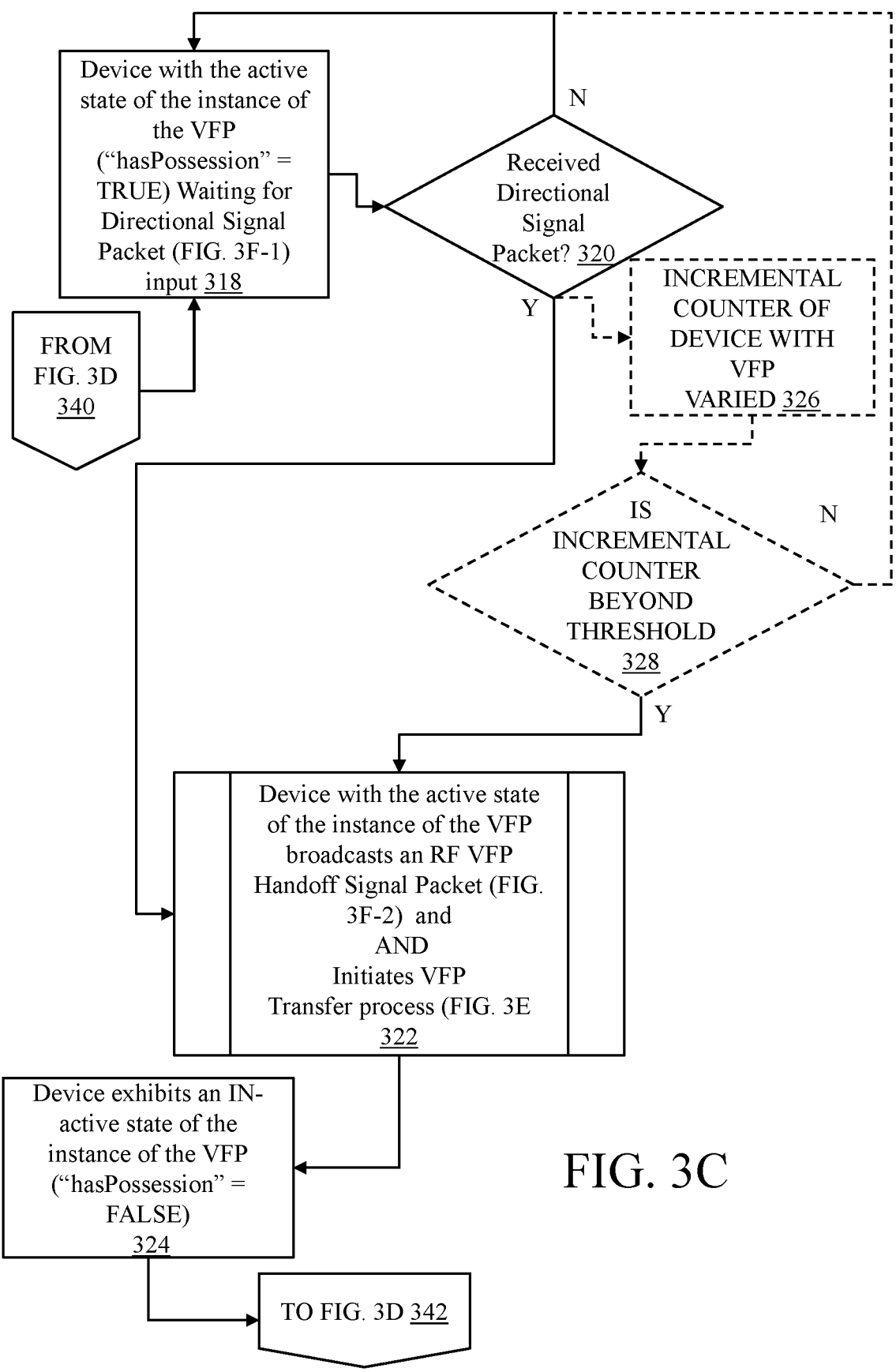
Figure 3D:
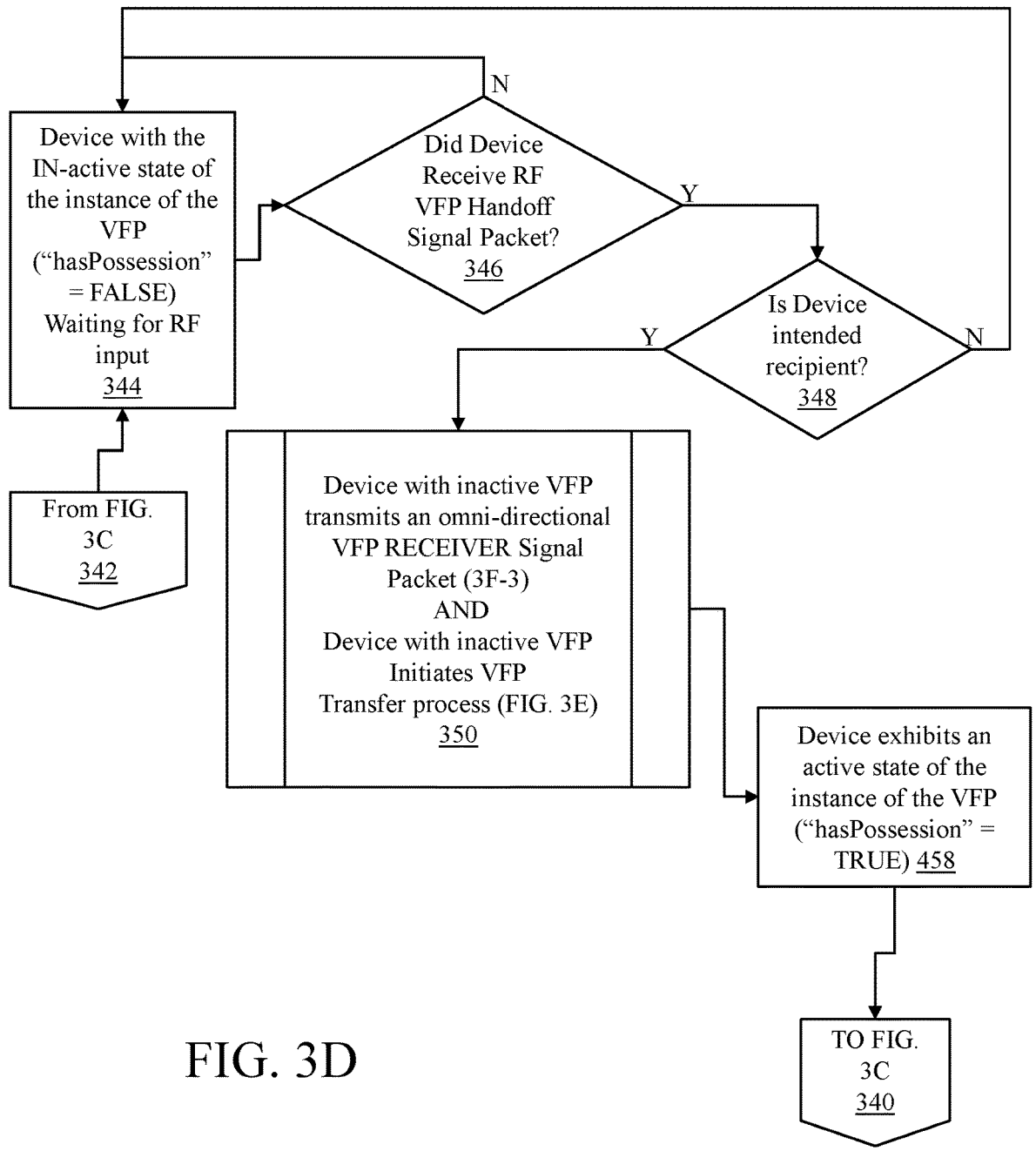
Figure 3E:
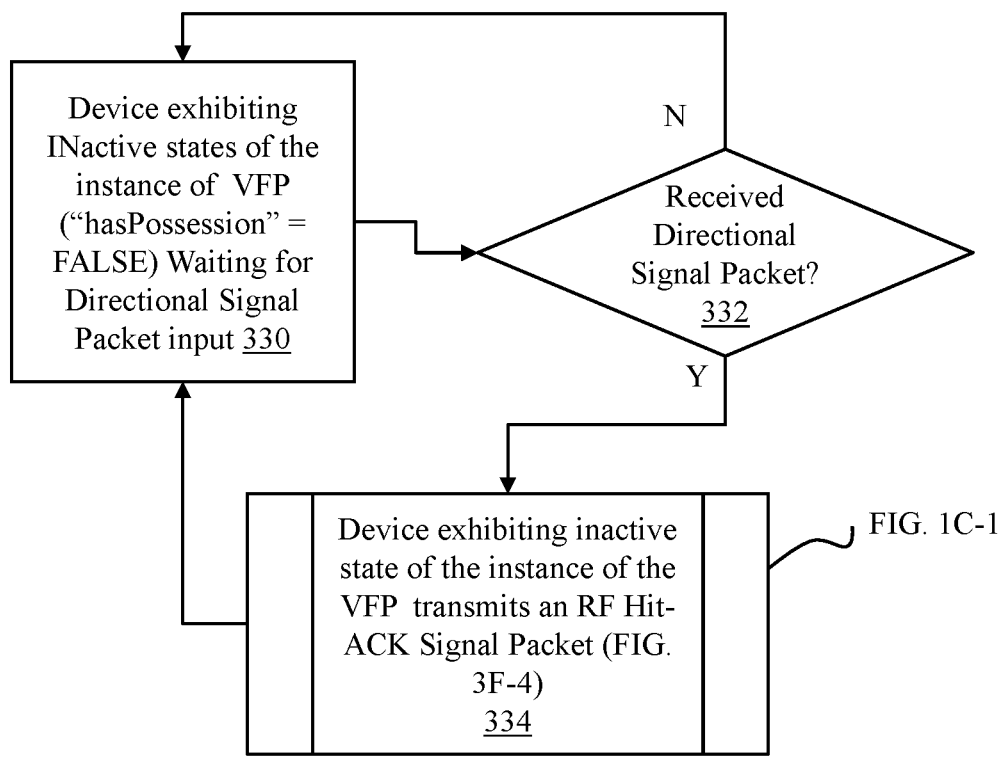
Figure 3F:
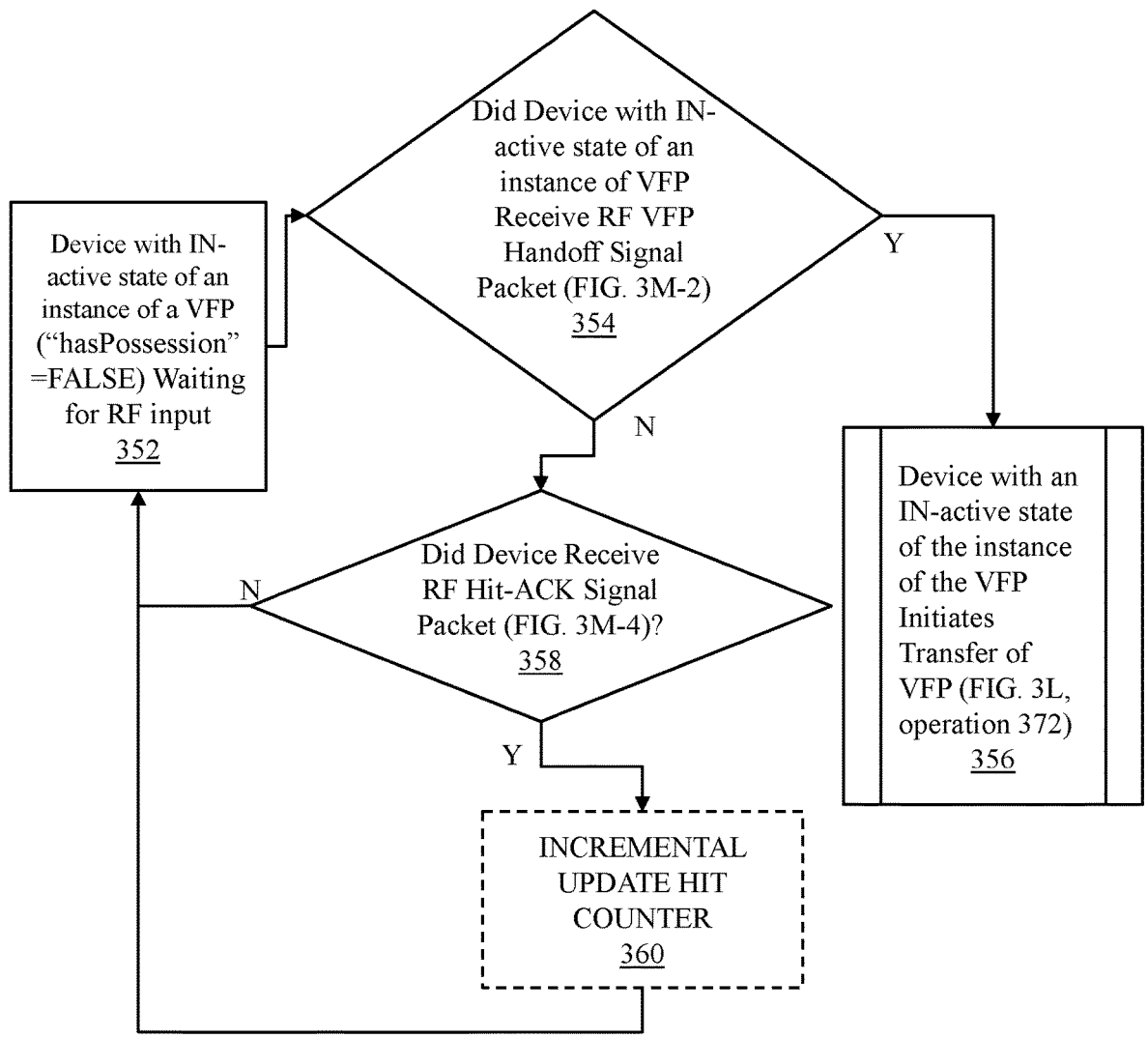
Figure 3G:
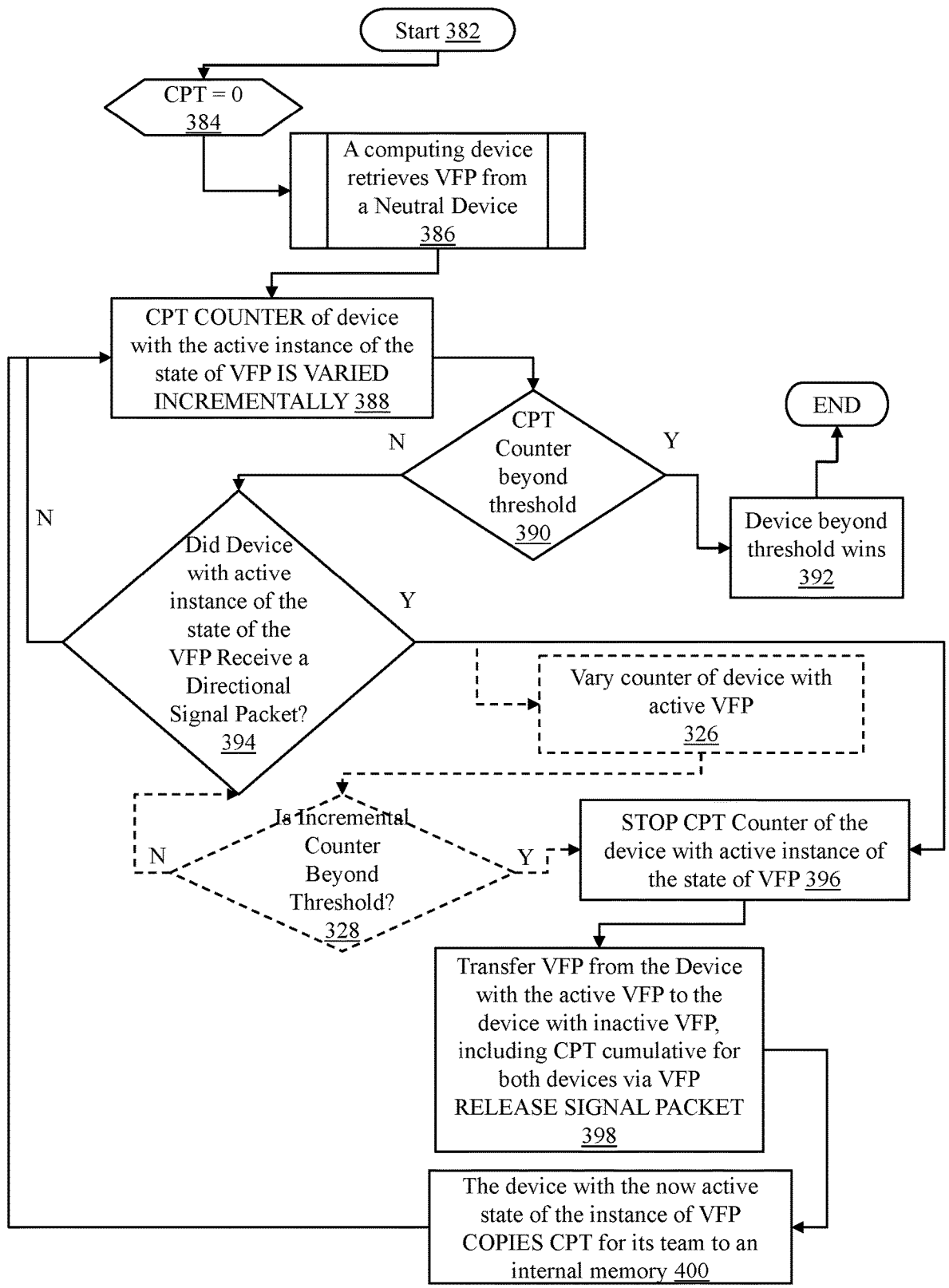
Figure 3H:
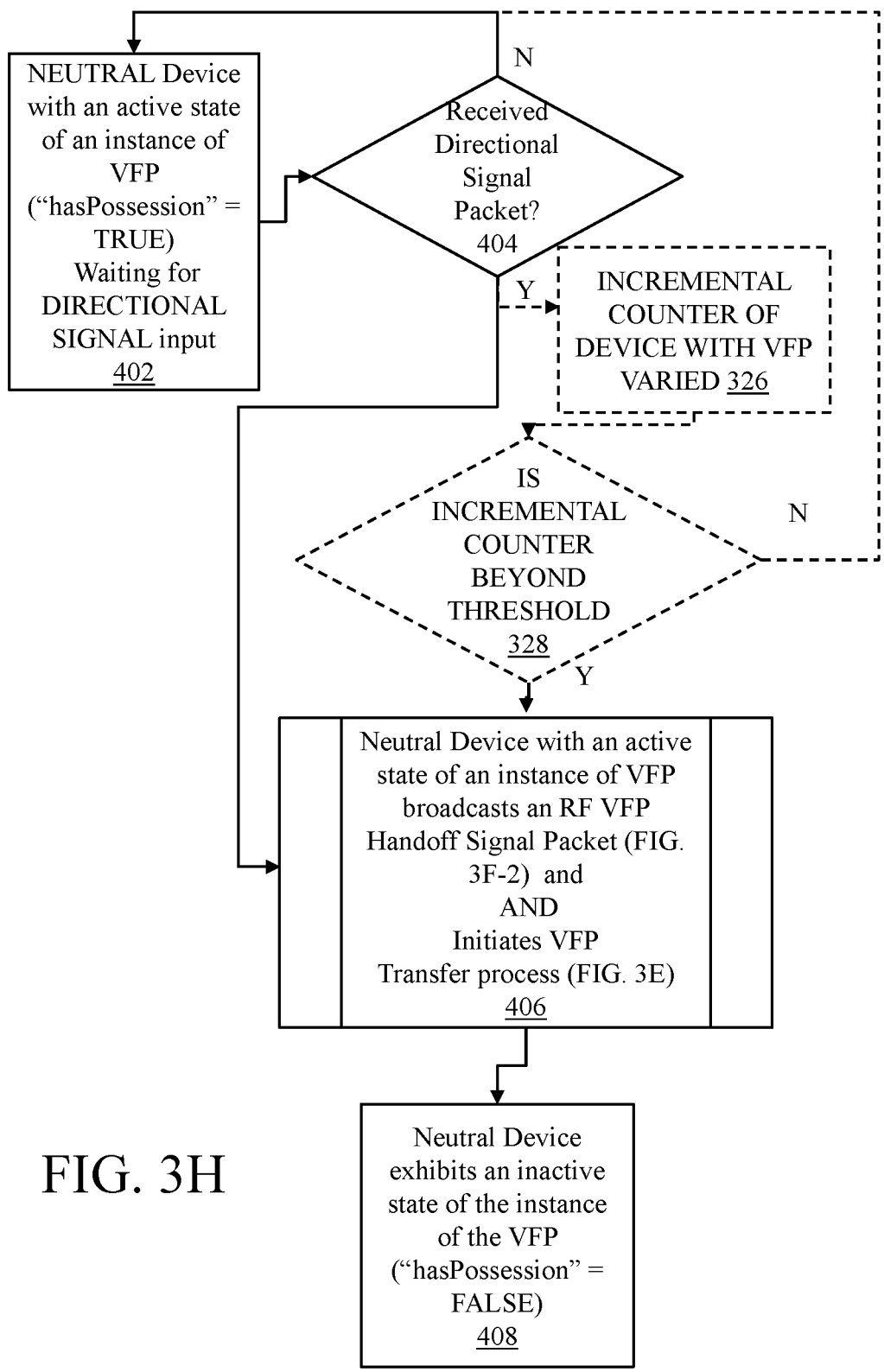
Figure 3I:
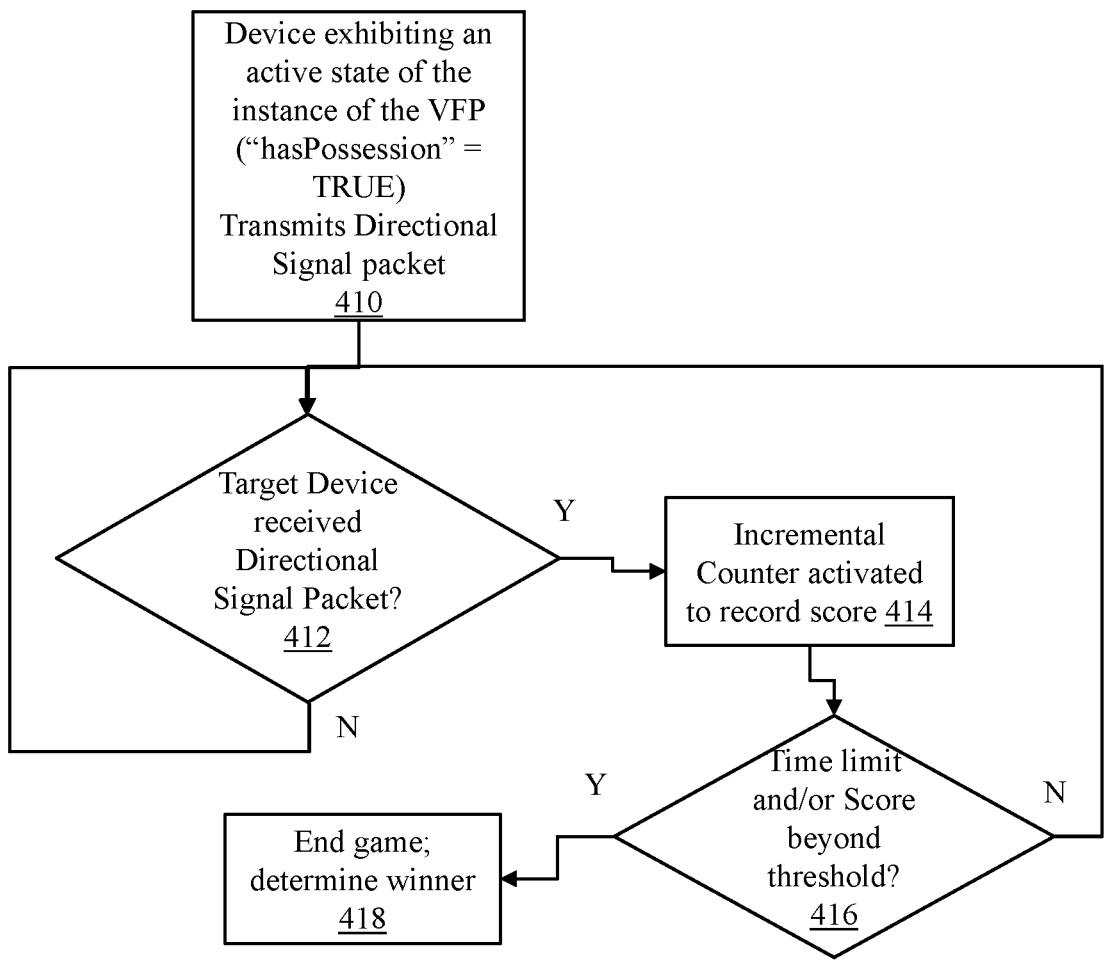
Figures 1, 2, 3J:
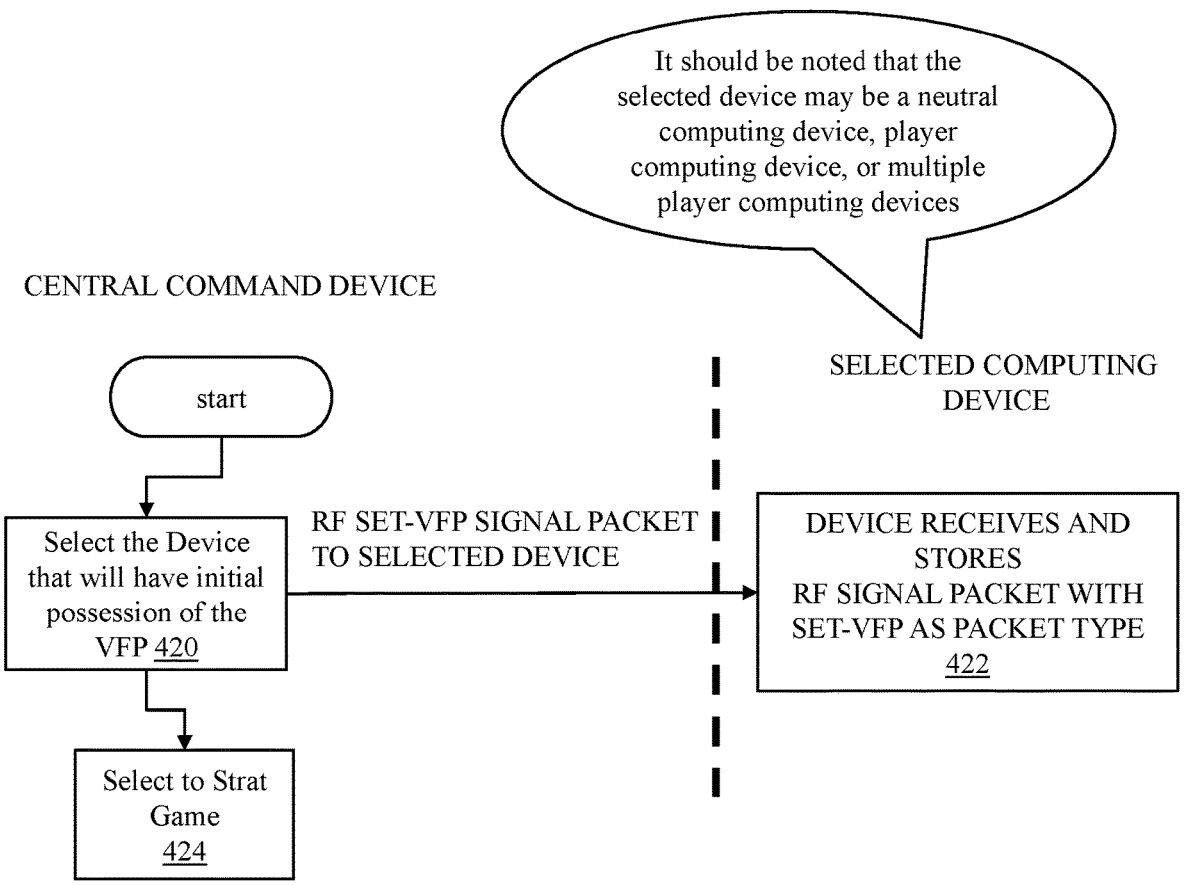
Figure 3K:
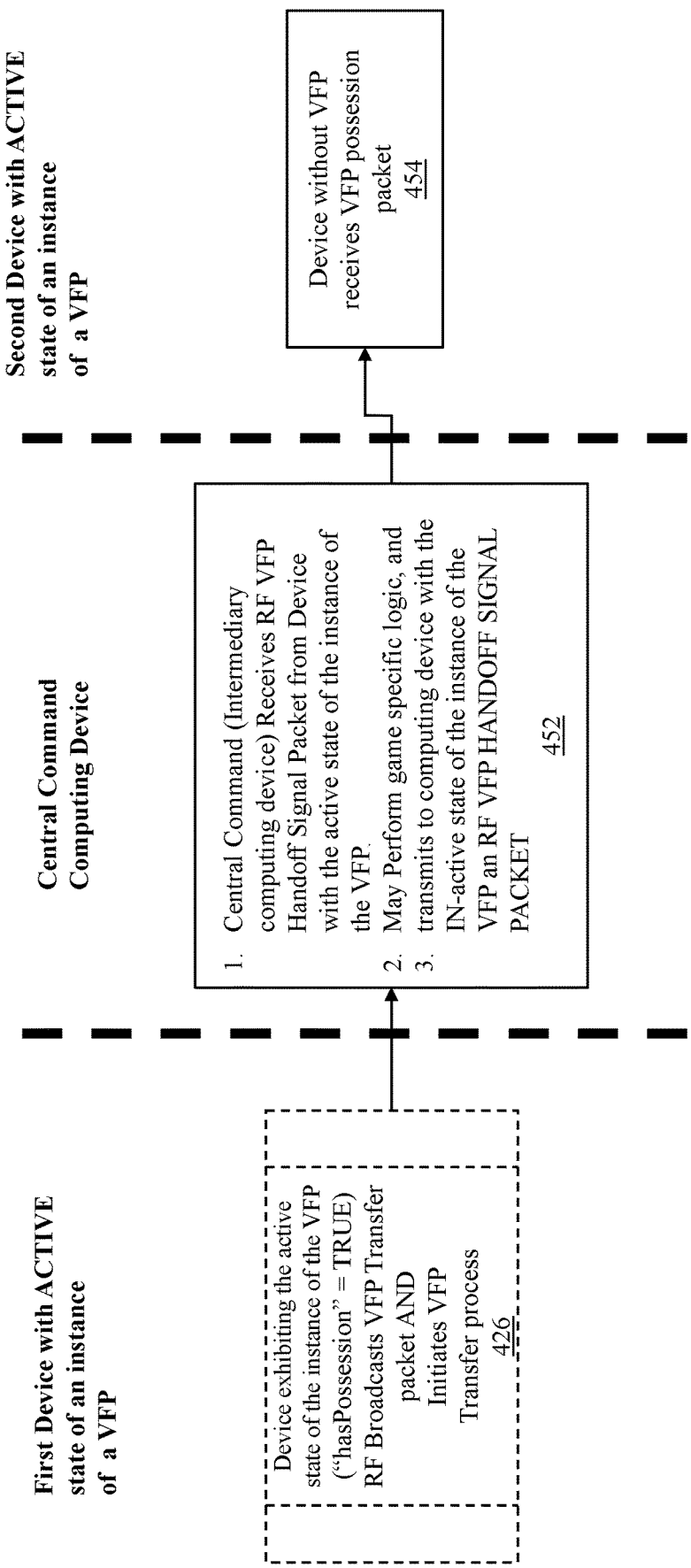
Figure 3L:
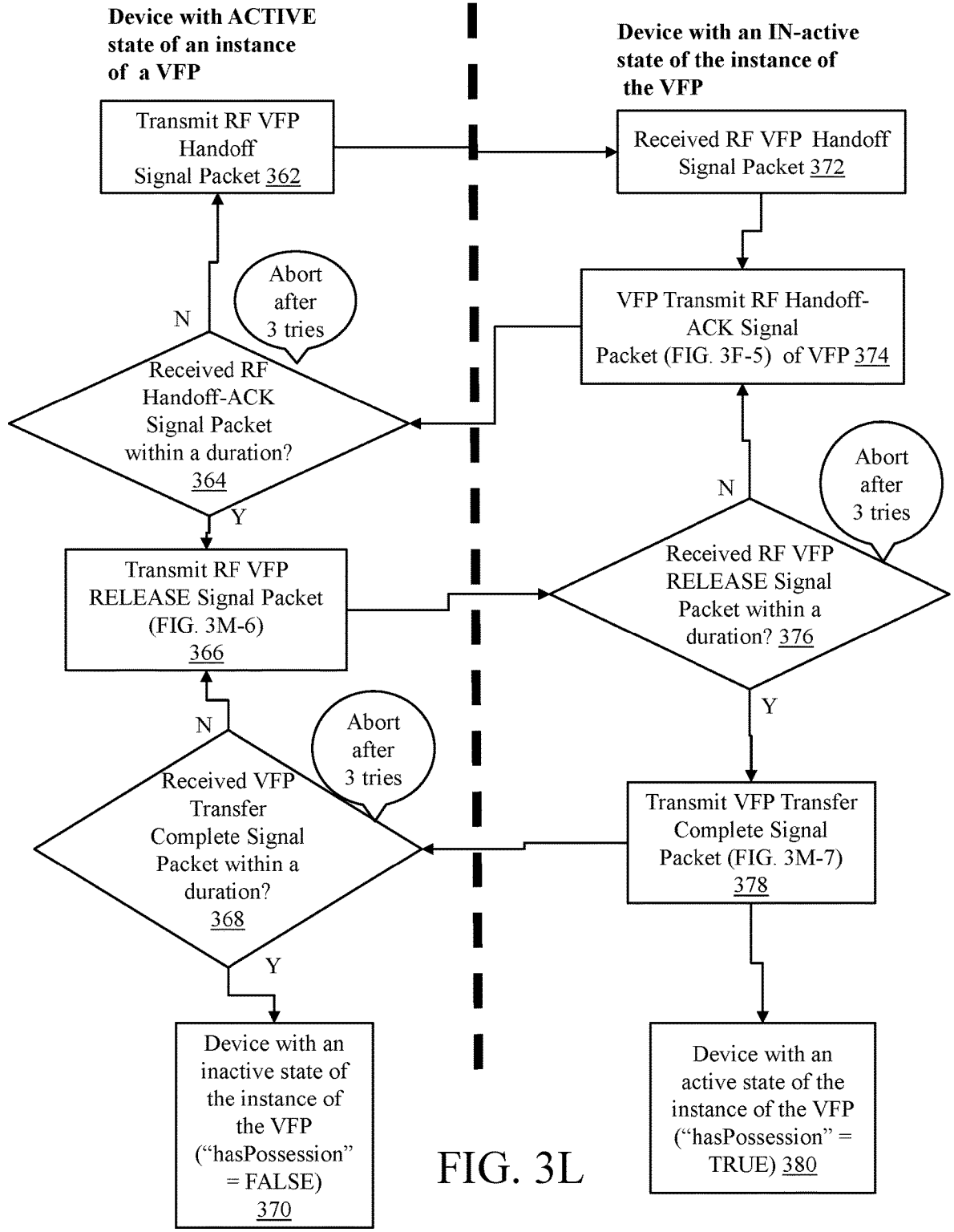
Figures 3, 3M, 4, 5:
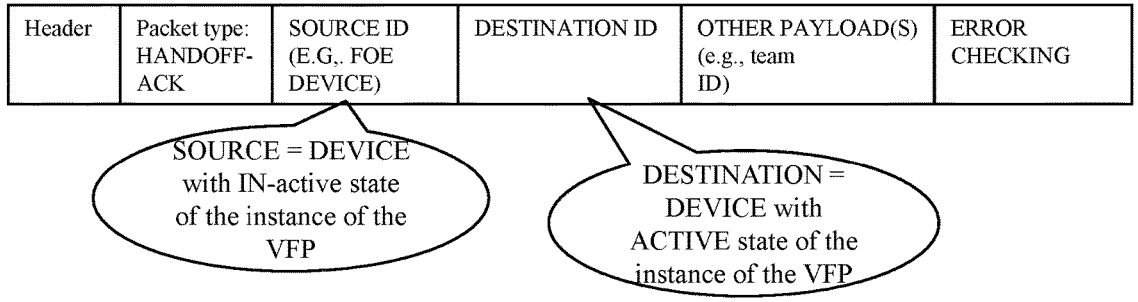
Figures 3, 3M, 4, 5, 6:
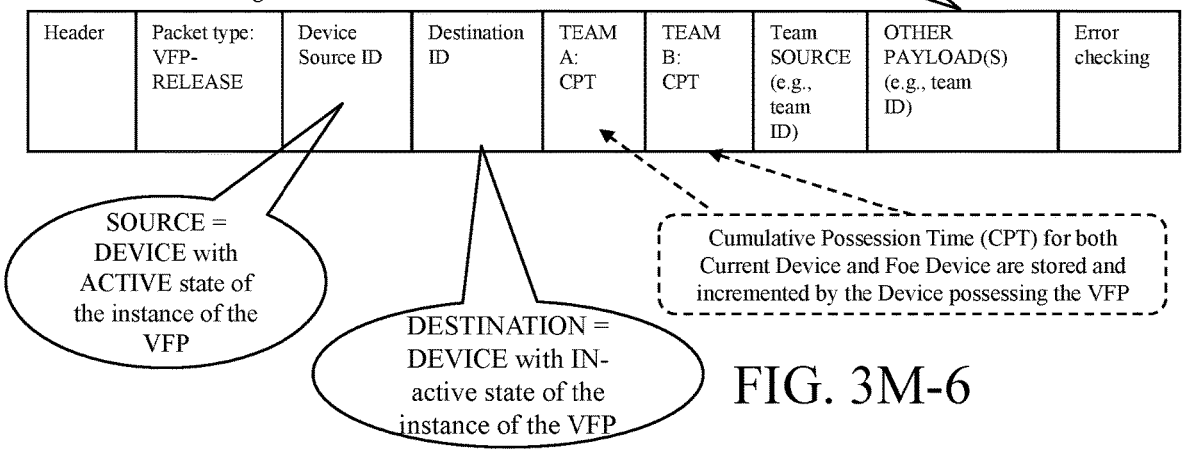
Figures 3, 3M, 4, 5, 6, 7:
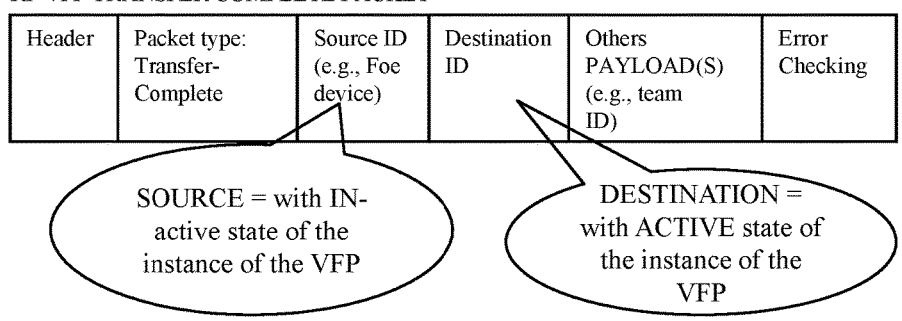

As best illustrated in FIG. 3M-1, a Directional Signal Packet (e.g., an IR signal, or other medium) may include Header, Payload, and Error Checking. The payload may comprise of the Packet Type (in this instance, attack signal).

The payload may further include a source device ID, which is the identification of the source from which the directional signal was transmitted. In a non-limiting, exemplary instance, another computer (for example, a second computing device) may be identified as the source of the signal received by a computing device (e.g., a first computing device).

The payload of the Directional Signal Packet may also include a destination device ID, which in this example, is defined as broadcast. That is, the signal packet shown in FIG. 3M-1 is broadcast transmitted (at operations 306) from the source device (e.g., second computing device) to all other computing devices. The destination may contain a specific device ID if the signal is intended only for a specific device or subset of devices. Examples of other Payload data may include for example, Team ID to which the source device may belong.

FIG. 3B is a non-limiting, exemplary flowchart that details transmission of Radio Frequency (RF) signals by a computing device in accordance with one or more embodiments of the present invention.

As illustrated, MCU 166 based on Game Logic 168 of a computing device 100 at operations 310 determines if RF transmission is enabled. If MCU 166 determines that the RF transmission is not enabled, then there would be no RF transmission (operations 312). Depending on the game, game rules, etc. the RF signal packets transmission may remain disabled or become enabled.

As further illustrated in FIG. 3B, if MCU 166 based on Game Logic 168 of computing device 100 at operations 310 determines that RF Signal Packet transmission is enabled, at operations 314 MCU 166 commences transmission of the RF Signal Packet by RF rTx transmitter antenna via RF transceiver module 102. FIGS. 3M-2 to 3M-8 are a non-limiting, non-exhaustive set of examples of the different types of RF signal packets that may be used, each of which is further detailed below.

Referring back to FIG. 3B, as indicated in operations 316, MCU 166 may generally wait for a duration of time T before transmitting an RF Signal Packet to avoid potential signal packet collision.

FIG. 3C is a non-limiting, exemplary flowchart that detail the transfer of a VFP (as "loss") from a computing device (e.g., first computing device) to another computing device (e.g., second computing device) in accordance with one or more embodiments of the present invention.

In the non-limiting, exemplary instance shown in FIG. 3C, a computing device with an active state of an instance of a VFP 132 during play awaits for reception of Directional Signal Packet input in operations 318.

At operations 320 MCU 166 determines if a Directional Signal Packet is received. MCU 166 may determine receipt of a Directional Signal Packet based on Game Logic 168 (for example, via the IR Rx receiver 112 associated with the UART1 TxRx transceiver 104 or Transducer TX/RX 460, etc.).

If MCU 166 of the computing device (e.g., first computing device) at operations 320 determines that a Directional Signal Packet is received, the computing device based on Game Logic 168 of MCU 166 at operations 322 broadcasts an RF VFP Handoff Signal Packet (FIG. 3M-2). The computing device (e.g., first computing device) may also initiate a VFP Transfer Process (FIG. 3E) to the other computing device (second computing device).

It should be noted that as further detailed below, depending on hardware setup (as shown in FIG. 2A), the computing device exhibiting the active state of the instance of the VFP may optionally communicate with an intermediary computing device (e.g., Central Command computing device 122) to transfer the VFP rather than direct communications transfers between the player computing devices.

As best illustrated in FIG. 3M-2, an RF Handoff Signal Packet may include Header, Payload, and Error Checking. The payload may comprise of the Packet Type (in this instance, HANDOFF).

The payload may further include a source device ID, which is the identification of the source from which the RF VFP Handoff Signal Packet was transmitted. In a non-limiting, exemplary instance, this would be the computing device with the active state of the instance of the VFP.

The payload of the RF VFP Handoff Signal Packet may also include a destination device ID, which in this exemplary instance may be the device ID of the computing device with the IN-active state of the instance of the VFP. More specifically, the destination ID is of the second computing device that has successfully transmitted a directional signal packet (FIG. 3M-1) to the first computing device. This way, for example, if there are multiple devices, the source and destination of transfer of VFP is clearly designated.

Referring back to FIG. 3C, upon completion of the VFP Transfer Process detailed further in relation to FIG. 3E, the computing device exhibits an IN-active state of the instance of the VFP at operations 324. Stated otherwise, the computing device switches from the active state of the instance of the VFP to an inactive state of the instance of the Virtual Focal Point when the computing device receives a Directional Signal Packet transmitted by the other computing device (second computing device).

As further detailed in FIG. 3C, depending on the game being played, rules of the games, etc., several Directional Signal Packets may be required to be received by the computing device before it handoffs of VFP to the other computing device (and hence, loss of VFP of the first computing device). For example, a game may require an optional incremental counter as shown in operations 326 where the number of Directional Signal Packets received at operations 320 of the computing device (first computing device) is counted by MCU 166. At operations 328 MCU 166 determines if the count is beyond a certain threshold and if so, executes operations 322 as detailed above; otherwise, MCU 166 operations loops back to waiting for another Directional Signal Packet at operations 318.

FIG. 3D is a non-limiting, exemplary flowchart that details the transfer of a VFP (as "gain") by another computing device (e.g., second computing device) due to "loss" of VFP by a computing device (e.g., the first computing device) in accordance with one or more embodiments of the present invention.

As indicated above, FIG. 3C related to a first computing device "losing" VFP to a second computing device. FIG. 3D is the method of the gaining of the VFP by the second computing device due to the "loss" of the VFP from the first computing device. Accordingly, the flowcharts of FIGS. 3C and 3D are related (as shown by Off-page connections 340 and 342) in that they detail interactions between a pair of computing devices in relation to VFP loss by one and the VFP gain by the other.

As illustrated in FIG. 3D, MCU 166 of the computing device with the IN-active states of the instance of the VFP waits for reception of an RF input at operations 344. At operations 346 MCU 166 determines if an RF VFP Handoff Signal Packet (FIG. 3M-2) is received. If no RF VFP Handoff Signal Packet is received, MCU 166 loops back to execute operations 344.

If at operations 346 MCU 166 determines that an RF VFP Handoff Signal Packet (FIG. 3M-2) is received, then at operation 348 MCU 166 determines if the computing device which received the RF Handoff Signal Packet is the intended recipient.

Intended recipient may be identified by device IDs of both the transmitter (source ID) and receiver (destination ID) payloads of the RF VFP Handoff Signal Packet. For example, the source ID may be the ID of the computing device with the active state of the instance of the VFP and the destination ID may be the ID of the computing device with the IN-active state of the instance of the VFP.

If the MCU 166 determines that the computing device which received the RF Handoff Signal Packet is the intended recipient at operations 348, then MCU 166 executes operations 350; otherwise, MCU 166 loops back to operations 344.

At operations 350 MCU 166 of the destination computing device may transmit an RF VFP Receiver Signal Packet (FIG. 3M-3) and may initiate the VFP Transfer process (FIG. 3E).

It should be noted and as further detailed below, depending on hardware setup (as shown in FIG. 2A), the computing device exhibiting IN-active state of the instance of the VFP may optionally communicate with an intermediary computing device (e.g., Central Command computing device 122) to transfer (receive) the VFP rather than direct communications transfers between the player computing devices.

Since the computing device at operations 458 now exhibits an active state of the instance of the VFP, it now may operate as indicated in FIG. 3C via the Off-page connector 340 of FIG. 3D. Further, at operations 324 (FIG. 3C), since the computing device exhibits an IN-active state of the instance of the VFP, it now may operate as indicated in FIG. 3D via the Off-page connector 342. Accordingly, a single computing device may quickly switch from one where it exhibits an active state of the instance of the VFP to one where it exhibits an IN-active state of the instance of the VFP and vice versa.

FIG. 3E is a non-limiting, exemplary flowchart that detail the receipt of a Directional Signal Packet by another computing device (second computing device) that exhibits an IN-active state of an instance of a VFP in accordance with one or more embodiments of the present invention. Since in one or more embodiments of the present invention Directional Signal Packets are transmitted in broadcast mode, the possibility exists where a second computing device with IN-active state of an instance of a VFP may receive a Directional Signal Packet during play (operations 330 and 332).

If at operations 332 MCU 166 of the computing device (e.g., second computing device) with IN-active state of an instance of a VFP determines that it received a Directional Signal Packet, MCU 166 executes operations 334. That is, at operations 334 the computing device (e.g., second computing device) with IN-active state of an instance of a VFP broadcasts an RF Hit-Acknowledgement (Hit-ACK) Signal Packet, detailed in FIG. 3M-4 otherwise, MCU 166 operations are looped back to operations 330.

Referring to FIG. 3M-4, an RF Hit-ACK Signal Packet is an RF signal that may include Header, Payload, and Error Checking. The payload may comprise of the Packet Type (in this instance, Hit-ACK).

The payload may further include a source device ID, which is the identification of the source from which the RF Hit-ACK Signal Packet is transmitted.

The payload of the RF Hit-ACK Signal Packet may also include a destination device ID, which may be in broadcast mode or specific a particular recipient. That is, the RF Hit-ACK Signal Packet shown in FIG. 3M-4 is transmitted (at operations 334).

FIG. 3F is a non-limiting, exemplary flowchart illustration of a method for receiving RF input by a computing device shown in FIG. 2A in accordance with one or more embodiments of the present invention. As illustrated, MCU 166 of the computing device with IN-active states of an instance of a VFP continuously waits for reception of RF Signal Packets input by RF Transceiver module 102 via their respective rRx antennas at operations 352 of Game Logic 168.

At operations 354, MCU 166 determines if the received RF Signal Packet is an RF VFP Handoff Signal Packet (FIG. 3M-2). If at operations 354 MCU 166 of the computing device (e.g., second computing device) determines that the RF Signal Packet is a RF VFP Handoff Signal Packet, MCU 166 executes operations 356 for commencement of transfer of VFP. That is, the computing device with IN-active states of the instance of the VFP commences the transfer process detailed in FIG. 3L to receive VFP.

If at operations 354 the computing device (e.g., the second computing device) determines that the RF Signal Packet is not a RF VFP Handoff Signal Packet, then at operations 358 MCU 166 determines if the RF Signal Packet received is a Hit-ACK Signal Packet (FIG. 3M-4) and if so, an optional incremental Hit counter is updated at operations 360. This assumes the game may require counting the number hits or tags.

FIG. 3G is a non-limiting exemplary flowchart illustrating a non-limiting, exemplary method of accounting for a cumulative possession time (CPT) of a VFP by a computing device in accordance with one or more embodiments of the present invention. There may be instances where it may be desired to account for a cumulative possession time of a VFP in certain types of games, with the player or team with the highest cumulative time being the winner. FIG. 3G is a non-limiting example of CPT processing.

At the Start operations 382, no player computing device 128 participating in a game that may require CPT processing has or exhibits an active state of an instance of a VFP. Instead, the required active state of an instance of a VFP may be exhibited by a Neutral computing device. In this instance, the Neutral computing device may be thought of as the "first computing device" and all other players computing devices defined as the "second computing device" or subsequent computing devices. Accordingly, MCU 166 of player computing devices in the game sets respective CPT counters of player computing devices 128 to zero at operations 384.

When the game commences, at operations 386, any player computing device 128 that first successfully tags or targets the Neutral computing device 124 may "retrieve" an active state of an instance of a VFP from the Neutral computing device as detailed in FIGS. 3C and 3H. This results in the Neutral computing device 124 exhibiting the IN-active state of the instance of the VFP, with the player computing device

128 that successfully tagged or targeted Neutral computing device 124 now exhibiting the active state of the instance of the VFP at operations 386.

As further illustrated, at operations 388 the CPT COUNTER of the player computing device 128 with the active state of the instance of the VFP is varied incrementally by the MCU 166 of the player computing device 128.

At operations 390, MCU 166 of the player computing device 128 determines if the CPT is beyond threshold and if so, at operations 392 the player computing device with CPT count beyond threshold wins.

If MCU 166 at operations 390 determines that the CPT count is not beyond threshold, MCU 166 at operation 394 determines if the player computing device 128 with the active instance of the state of the VFP received a Directional Signal Packet (i.e., has the player device been tagged by another player device).

If MCU 166 of the player computing device 128 with the active instance of the state of the VFP determines that no Directional Signal Packet is received, then operations 388 and operations 390 are executed.

If MCU 166 of the player computing device 128 with the active instance of the state of the VFP determines that a Directional Signal Packet is received, then at operations 396 CPT counter is stopped. Optionally, operations 326 and operations 328 may first be executed before operations 396. This way, the CPT counter will continue counting until the number "hits" or "tags" as a result of receiving Directional Signal Packets is beyond a certain threshold.

At operations 398 VFP is transferred via a broadcast of a VFP Release Signal Packet (FIG. 3M-6) from the computing device with the ACTIVE state of the instance of the VFP to the computing device with the IN-ACTIVE state of the instance of the VFP, which was the source of the Directional Signal Packet. A non-limiting example of details of such transfer is shown in FIG. 3L.

Referring to FIG. 3M-6, an RF VFP RELEASE Signal Packet is an RF signal that may include Header, Payload, and Error Checking. The payload may comprise of the Packet Type (in this instance, VFP Release).

The payload may further include a source device ID, which is the identification of the source from which the RF VFP Release Signal Packet is transmitted.

The payload of the RF VFP Release Signal Packet may also include a destination device ID, which may be in broadcast mode and include the identification of the source of the computing device that successfully transmitted the Directional Signal Packet (the computing device with IN-ACTIVE state of the instance of the VFP).

The payload of the RF VFP Release Signal Packet may also include Team CPTs, for example, CPT for Team A and CPT for Team B, in addition to Team Source ID, which identifies the player device team that transmits the RF VFP Release Signal Packet.

Referring back to FIG. 3G, after transmission of RF VFP Release Signal, at operation 400, MCU 166 of the computing device with the now ACTIVE state of the instance of the VFP copies CPT for its team to memory 164, and flow is looped to operations 388 for the computing device with the now ACTIVE state of the instance of the VFP.

FIG. 3H is a non-limiting, exemplary flowchart that illustrates the involvement or use of a Neutral computing device in a game in accordance with one or more embodiments of the present invention.

Depending on the game and game rules, the method of initialization for every hardware with respect to an ACTIVE or IN-active state of an instance of a VFP may be varied. For example, when starting a game, initial condition or state of the Neutral computing device 124 may be such that upon start it will always exhibit an ACTIVE or IN-active state of an instance of a VFP. As another example, depending on the rules of the game, a player computing device 128 may by default exhibit an ACTIVE state of an instance of a VFP. Accordingly, a Neutral computing device 124 may be use for a variety of reasons in various games. For example, one or more Neutral computing device 124 may function as "goal" posts, targets, or a neutral starting point between two player computing devices, etc.

Accordingly, the flowchart of FIG. 3H illustrates a non-limiting exemplary method of the interplay between a Neutral computing device with an ACTIVE state of an instance of VFP and other computing devices with IN-active state of the instance of the VFP of the Neutral computing device.

As illustrated, in the non-limiting, exemplary instance shown in FIG. 3H, a Neutral computing device with an active state of an instance of a VFP 132 during play waits for reception of Directional Signal Packet input in operations 402.

At operations 404 MCU 166 of the Neutral computing device determines if a Directional Signal Packet is received. MCU 166 may determine receipt of a Directional Signal Packet based on Game Logic 168 (for example, via the IR Rx receiver 112 associated with the UART1 TxRx transceiver 104 or Transducer TX/RX 460).

If MCU 166 of the Neutral computing device 124 at operations 404 determines that a Directional Signal Packet is received, Neutral computing device 124 based on Game Logic 168 of MCU 166 at operations 406 broadcasts an RF VFP Handoff Signal Packet (FIG. 3M-2). Neutral computing device 124 may also initiate a VFP Transfer Process (FIG. 3L).

It should be noted that as further detailed below, depending on hardware setup (as shown in FIG. 2A), the Neutral computing device 124 exhibiting the active state of the instance of the VFP may optionally communicate with an intermediary computing device (e.g., Central Command computing device 122) to transfer the VFP rather than direct communications transfers between the Neutral computing device 124 and another computing device (e.g., a player computing device). As further illustrated, after operations 406, Neutral computing device 124 exhibits an IN-active state of the instance of the VFP at operations 408.

As further detailed in FIG. 3H, depending on the game being played, rules of the games, etc., several Directional Signal Packets may be required to be received by Neutral computing device 124 before its handoff of VFP to the other computing device. For example, a game may require an optional incremental counter as shown in operations 326 where the number of Directional Signal Packets received at operations 404 of the Neutral computing device is counted by MCU 166. At operations 328 MCU 166 determines if the count is beyond a certain threshold and if so, executes operations 406 as detailed above; otherwise, MCU 166 of the Neutral computing device 124 operations loops back to waiting for another Directional Signal Packet at operations 402.

FIG. 3I is a non-limiting, exemplary flowchart that illustrates a method of maintaining a score for goals or hits by a computing device in accordance with one or more embodiments of the present invention. FIG. 3G is related to the cumulative possession time (or CPT) whereas FIG. 3I is related to the actual score of goals or hits.

As illustrated in FIG. 3I, MCU 166 of a computing device exhibiting an ACTIVE state of the instance of the VFP transmits a Directional Signal packet at operations 410 to towards a target (e.g., Neutral computing device, another computing device, a sensor 120 associated with a goal post, etc.).

At operations 412 the targeted computing device exhibiting an IN-active state of the instance of the VFP determines if it has received a Directional Signal Packet and if so, MCU 166 of the targeted computing device activates an incremental counter to record a score at operations 414. It should be noted that this updated score may be displayed on a scoreboard visible to all players and spectators and may also be available as a payload of an RF broadcast signal transmitted by the target computing device to all other player computing devices, very similar to CPT updates of RF Release Signal Packet shown in FIG. 3M-6.

Referring back to FIG. 3I, at operations 416 the target computing device or a Neutral computing device determines if the time limit and/or score is beyond a threshold and if so, the game ends (operations 418) with the winner determined based on the score and the rules of the game.

FIG. 3J-1 is a non-limiting exemplary illustration of a flowchart for a non-limiting, exemplary use of a Central Command computing device in accordance with one or more embodiments of the present invention.

As illustrated, a Central Command computing device 122 may be used to select the computing device (player computing device, Neutral computing device, etc.) that will be granted the possession of an active state of an instance of a VFP (operations 420). For example, the Central Command computing device 122 may transmit an RF SET VFP Signal Packet (FIG. 3J-2) to set the active state of the instance of the VFP in a player computing device 128 or a neutral computing device 124.

At operations 422, the selected computing device receives and stores RF Signal Packet with VFP payload and hence, becomes a computing device with the active state of the instance of the VFP, while at operations 424 Central Command computing device commences the game.

FIG. 3J-2 is a non-limiting, exemplary illustration of an RF Set-VFP Signal Packet in accordance with one or more embodiments of the present invention. As illustrated, RF Set-VFP Signal Packet is comprised of a Header, payload, and Error Checking.

The payload section of the RF Set-VFP Signal Packet may comprise of a Packet Type, which is Set-VFP, a Source ID (which is the ID associated with the Central Command computing device), and a Destination ID, which is the ID of the selected computing device.

FIG. 3K is a non-limiting, exemplary illustration for the use of Central Command computing device as an intermediary computing device for transfer of the active state of the instance of the VFP from one computing device to another computing device that exhibits an IN-active state of the instance of the VFP in accordance with one or more embodiments of the present invention.

As is indicated above, depending on hardware setup (as shown in FIG. 2A), the computing device exhibiting an active state of the instance of the VFP may optionally communicate with an intermediary computing device (e.g., Central Command computing device 122) to transfer the VFP rather than direct communication transfer of the VFPs between the player computing devices.

As illustrated, operations 426 is a representative of operations (by an MCU 166 of any computing device) that exhibits active state of the instance of the VFP, broadcasting VFP Handoff Signal Packet, and initiates VFP Transfer Process.

The computing device may communicate the transmission of the RF VFP Handoff Signal Packet with a Central Command computing device using the "hand-shake" operations detailed in FIG. 3L or alternatively, it may be a simple onetime transmission without any handshake or reliability checks.

At operations 452 MCU 166 of Central Command computing device 124 receives the RF VFP Handoff Signal Packet (again, via the processes of FIG. 3L for example) and may perform game specific logic (if any). For example, operations 326 and 328 may be performed by MCU 166 of Central Command computing device 124 as game specific logic.

Additionally, MCU 166 of Central Command computing device 124 at operation 452 may transmit to a computing device with the IN-active state of the instance of the VFP an RF VFP Handoff Signal Packet. Again, the Central Command computing device may communicate the transmission of the RF VFP Handoff Signal Packet with the computing device using the "hand-shake" operations detailed in FIG. 3L or alternatively, it may be a simple one-time transmission without any handshake or reliability checks. At operations 454, the computing device without the VFP receives the VFP possession. Accordingly, the Central Command computing device 124 operating as an intermediary computing device may be thought of as a router where it passes the VFP from one device to another.

FIG. 3L is a non-limiting, exemplary flowchart that illustrates the details of a hand-shake process between two computing devices for transfer of VFP from one computing device with an active state of an instance of a VFP to another computing device with an IN-active state of the instance of the VFP in accordance with one or more embodiments of the present invention. FIGS. 3M-1 to 3M-7 are a non-limiting, non-exhaustive sampling of various signal packets used in relation to VFP transfer.

It should be noted that any well-established and well-known methods of transfer with certain level of reliability may be used, including for example, using the Message Queuing Telemetry Transport Quality of Service (or MQTT QOS=2), with MQTT protocol specifying the quality of service, which guarantees the reliability of message delivery under different network environments. Alternatively, all signal transmissions may be simple one-time transmissions from one device to another without any handshake or reliability checks.

As illustrated, in FIG. 3L, operations 362, 364, 366, 368, and 370 may be carried out by the MCU 166 of the computing device (e.g., the first computing device) with an ACTIVE state of an instance of a VFP.

On the other hand, operations 372, 374, 376, 378, and 380 may be carried out by the MCU 166 of the other computing device (e.g., the second computing device) with an IN-active state of the instance of the VFP of the first computing device.

Further, the entry point for execution of the Transmit Handoff Signal Packet of VFP operation 362 may be from operations (e.g., 322, 426, etc.) that transmit a VFP Handoff Signal Packet and initiate VFP transfer process by a computing device (e.g., the first computing device) and the entry point for the execution of the Received VFP Handoff Signal Packet operations 372 may be from other operations such as operation 350 (FIG. 3D) and or operations 356 (FIG. 3F) by the other computing device (e.g., the second computing device).

As illustrated, the computing device exhibiting an ACTIVE state of an instance of a VFP transmits an RF VFP Handoff Signal Packet at operations 362 to the other computing device exhibiting an IN-active state of the instance of the VFP.

The other computing device exhibiting the IN-active state of the instance of the VFP receives RF VFP Handoff Signal Packet at operations 372, and transmits a VFP Handoff-Acknowledgement (Handoff-ACK) Signal Packet the computing device (e.g., the first computing device) at operations 374.

At operations 364 the computing device (e.g., first computing device) exhibiting the ACTIVE state of the instance of the VFP determines if RF VFP Handoff-ACK Signal Packet from the other computing device (e.g., second computing device) exhibiting the IN-active state of the instance of the VFP is received.

If the computing device (e.g., first computing device) determines that the VFP Handoff-ACK Signal Packet is not received, MCU 166 of the computing device (e.g., first computing device) re-transmits VFP Handoff Signal Packet at operations 362. As indicated in the flow, the loop of operations 362, 372, 374 and 364 may be aborted after multiple tries.

If the computing device (e.g., first computing device) determines that the VFP Handoff-ACK Signal Packet is received, it transmits a VFP Release Signal Packet at operations 366 to other computing device (e.g., the second computing device).

The other computing device (e.g., the second computing device) at operations 376 determines if the VFP Release Signal Packet from the computing device (e.g., first computing device) is received.

If the other computing device (e.g., second computing device) determines that the VFP Release Signal Packet is not received, MCU 166 of the other computing device (e.g., second computing device) re-transmits VFP Handoff-ACK Signal Packet at operations 374. As indicated in the flow, the loop of operations 376, 374, 364, and 366 repeats and may be aborted after multiple tries.

If the other computing device (e.g., second computing device) determines that the VFP Release Signal Packet is received at operations 376, the other computing device transmits VFP Transfer Complete Signal Packet to the computing device (e.g., the first computing device).

At operations 368 the computing device (e.g., first computing device) determines if VFP Transfer Complete Signal Packet is received from the other computing device (e.g., the second computing device).

If the computing device (e.g., first computing device) determines that the VFP Transfer Complete Signal Packet is not received, MCU 166 of the computing device (e.g., first computing device) re-transmits VFP Release Signal Packet at operations 366. As indicated in the flow, the loop of operations 368, 366, 376, and 378 repeats and may be aborted after multiple tries.

If the computing device (e.g., first computing device) determines that the VFP Transfer Complete Signal Packet is received, the computing device that exhibited the active state of the instance of the VFP now exhibits the IN-active state of the instance of the VFP at operations 370, and the other computing device that exhibited the IN-active state of the instance of the VFP of the computing device (first computing device) now exhibits an ACTIVE state of the instance of the of the computing device (first computing device) in operations 380.

FIGS. 3N-1 to 3N-5 are non-limiting, exemplary illustrations of flowcharts and signal packet types used by computing devices in the instances where one computing device exhibiting an ACTIVE state of an instance of a VFP voluntarily transmits to another computing device with an IN-active state of the instance of the VFP of the computing device in accordance with one or more embodiments of the present invention.

Situations may arise in most games where a first computing device may "pass" the ACTIVE state of an instance of a VFP to another computing device with an IN-active state of the instance of the VFP of the computing device (similar to a game of football where the ball is passed from one player to another team player, for example).

Specifically, the invention disclosed provides complementary methods of VFP transfer between players of the different teams (taking possession of VFP from an opponent) and players of the same team (giving possession of VFP to a teammate). A VFP transfer between players of different teams is typically involuntary while a VFP transfer between players of the same team is typically voluntary. Both methods of VFP transfer require the directional signal of a computing device A to be received by another computing device B (FIG. 2D and FIG. 2E)

Figures 1, 3N:
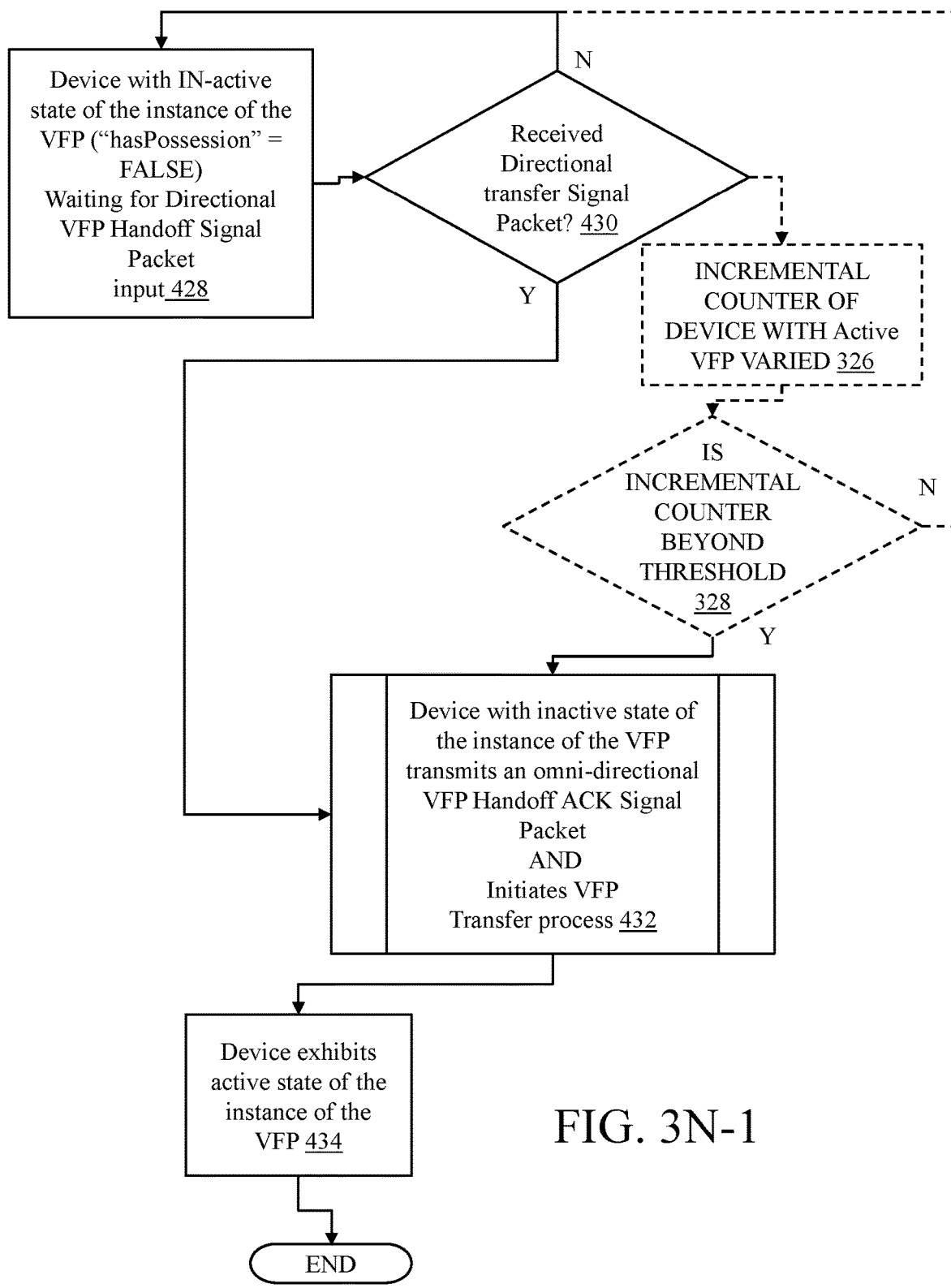
Figures 2, 3N:
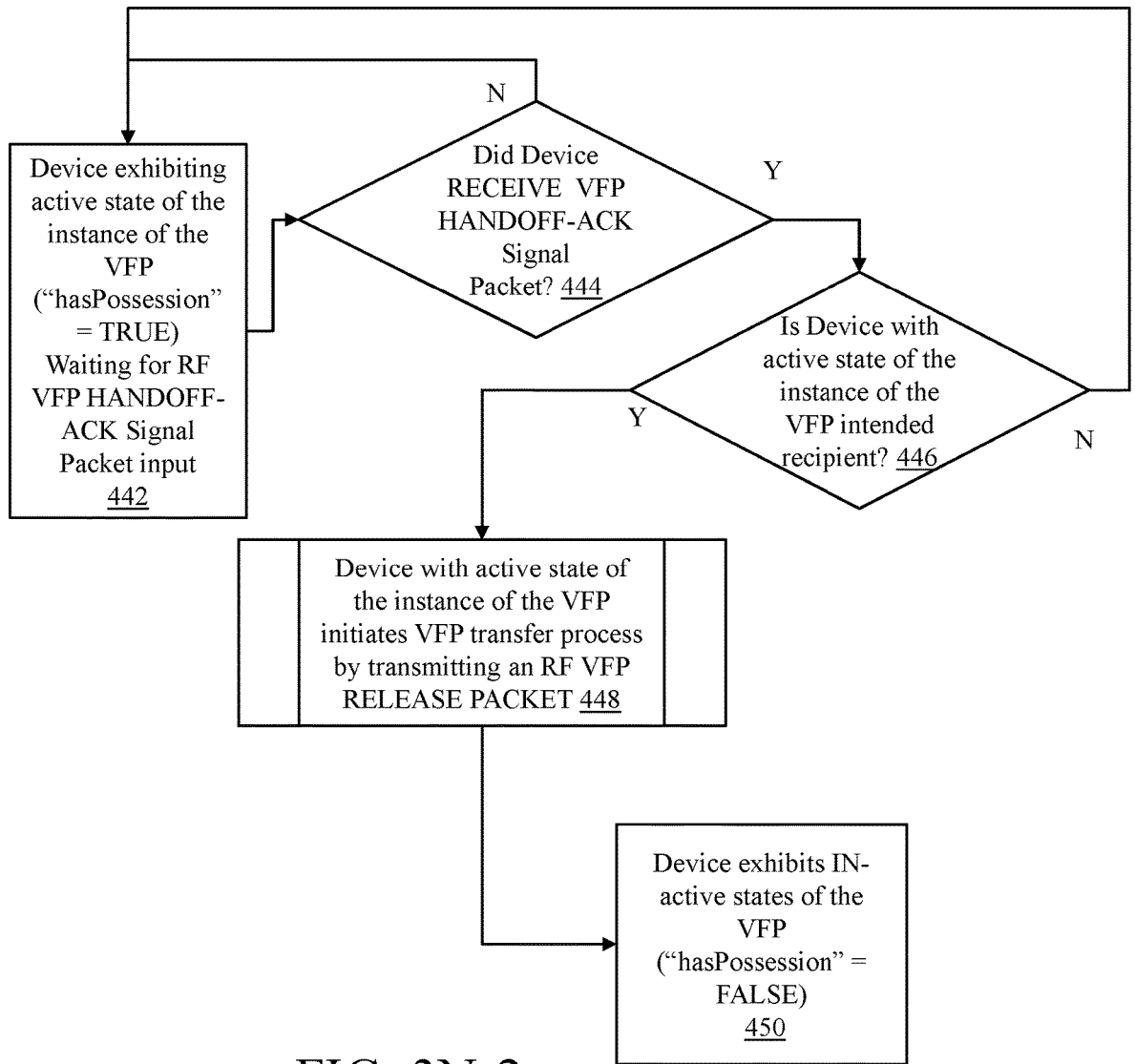
Figures 3, 3N:
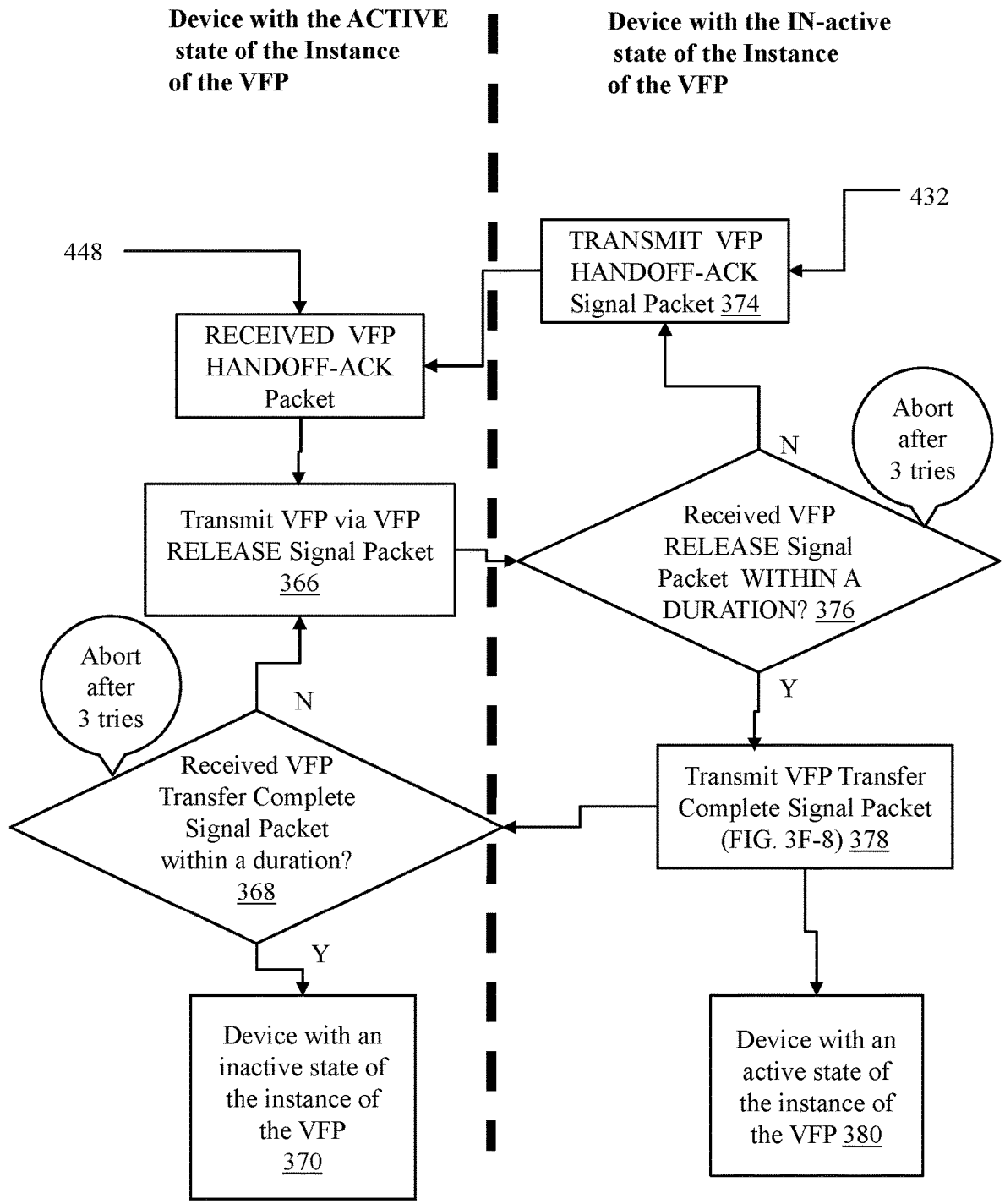

FIG. 3N-1 is non-limiting exemplary illustration of a flowchart that details the processes for receiving of the VFP by a computing device (e.g., second computing device) with the IN-active state of the instance of the VFP "passed" by first computing device with the ACTIVE state of the instance of the VFP. FIG. 3N-2 is non-limiting exemplary illustration of a flowchart that details the processes for the passing of the VFP by a computing device (e.g., first computing device) with the ACTIVE state of the instance of the VFP to the second computing device with the IN-active state of the instance of the VFP.

As illustrated in FIG. 3N-1, at operations 428 the computing device with IN-active state of the instance of the VFP waits for Directional VFP Handoff Signal Packet (FIG. 3N-4) input. In other words, the second computing device with IN-active state of the instance of the VFP is waiting for the first computing device with ACTIVE state of the instance of the VFP to transmit "pass" the ACTIVE state of the instance of the VFP.

FIG. 3N-4 is a non-limiting, exemplary illustration of Directional VFP Handoff Signal Packet in accordance with one or more embodiments of the present invention. As illustrated in FIG. 3N-4, Directional VFP Handoff Signal Packet is comprised of a Header, Payload, and Error Checking.

The payload of the Directional VFP Handoff Signal Packet may comprise of a Packet type, which identifies the signal packet as VFP Handoff. Further included as payload may be a source ID (from which the Directional VFP Handoff Signal Packet was transmitted) and a destination ID in broadcast mode.

Referring back to FIG. 3N-1, at operations 430 MCU 166 of the computing device with IN-active state of the instance of the VFP determines if Directional VFP Handoff Signal Packet is received. In other words, MCU 166 at operation 430 determines if a first computing device with the active state of the instance of the VFP has transmitted a Directional VFP Handoff Signal Packet so to "pass" the active state of the instance of the VFP to the second computing device.

If MCU 166 of the second computing device (the one with the IN-active state of the instance of the VFP) determines that it has received a Directional VFP Handoff Signal Packet, at operations 432 the second computing device transmits a RF VFP Handoff ACK Signal Packet (FIG. 3N-5) and initiates a VFP Transfer Process (FIG. 3N-3).

FIG. 3N-5 is a non-limiting, exemplary illustration of RF VFP Handoff ACK Signal Packet in accordance with one or more embodiments of the present invention. As illustrated in FIG. 3N-5, RF VFP Handoff ACK Signal Packet is comprised of a Header, Payload, and Error Checking.

The payload of the RF VFP Handoff ACK Signal Packet may comprise of a Packet type, which identifies the signal packet as VFP Handoff Acknowledgement (or ACK). Further included as payload may be a source ID (from which the RF VFP Handoff ACK Signal Packet was transmitted) and a destination ID of the first computing device (device with the active state of the instance of the VFP) that transmitted the Directional VFP Handoff Signal Packet.

Referring back to FIG. 3N-1, upon completion of operations 432, MCU 166 of the second computing device (the device that had the IN-active state of the instance of the VFP), exhibits the active state of the instance of the VFP. In other words, the VFP was transferred ("passed") successfully. Optionally, operations 326 and operations 328 may first be executed before operations 432. This way, a counter will continue counting until the number of successful "passes", "hits", or "tags" as a result of receiving a Directional VFP Handoff Signal Packets is beyond a certain threshold.

As indicated above, FIG. 3N-2 is a non-limiting exemplary illustration of a flowchart that details the processes for a computing device (e.g., first computing device) with the ACTIVE state of the instance of the VFP passing it to the second computing device with the IN-active state of the instance of the VFP. As illustrated, MCU 166 of first computing device exhibiting active state of the instance of the VFP waits for an RF VFP Handoff-ACK Signal Packet (FIG. 3N-5) at operations 442.

At operations 444 the MCU 166 of the first computing device determines if the VFP Handoff-ACK Signal Packet is received and if so, at operations 446 MCU 166 determines if it was the intended recipient.

If the MCU 166 of the first computing device with the active state of the instance of the VFP determines that the RF VFP Handoff-ACK Signal Packet received is itself the intended recipient at operations 446, then MCU 166 executes operations 448 otherwise, MCU 166 loops back to operations 442.

At operations 448 MCU 166 of the first computing device with the active state of the instance of the VFP initiates VFP transfer process (FIG. 3N-3) by transmitting RF VFP Release Signal Packet (FIG. 3M-6), and at operations 450 the first computing device exhibits the IN-active state of the instance of the VFP upon completion of operation 448.

FIG. 3N-3 is a non-limiting, exemplary flowchart that illustrates the details of a hand-shake process between two computing devices for transfer of VFP from one computing device with an active state of an instance of a VFP to another computing device with an IN-active state of the instance of the VFP in accordance with one or more embodiments of the present invention. The "entry point" for the flow of FIG. 3N-3 is from operations 448 of FIG. 3N-2 and operations 432 of FIG. 3N-1, the remaining operations are identical to operations shown and described in relation to FIG. 3L.

GAMING SYSTEM EXAMPLES

The following FIGS. 4A to 4D, 5A to 5E, and 6A to 6F are non-limiting, non-exhaustive, small sampling types of numerous numbers of games that may use any one or more of the systems and methodologies disclosed throughout the invention in relations to FIGS. 1A to 3N-5.

Gaming systems illustrated in FIGS. 4A to 4D, 5A to 5E, and 6A to 6F may use similar corresponding or equivalent components, methods, interconnections, functional, operational, and or cooperative relationships as described in FIGS. 1 to 3N-5. Therefore, for the sake of brevity, clarity, convenience, and to avoid duplication, the general description of FIGS. 4A to 4D, 5A to 5E, and 6A to 6F will not repeat every corresponding or equivalent component, methods, interconnections, functional, operational, and or cooperative relationships that has already been described above in relation to FIGS. 1 to 3N-5 but instead, are incorporated by reference herein for all examples.

Gaming System Example 1

FIGS. 4A to 4D are non-limiting, exemplary illustrations of a gaming system that use physical drones in a real physical game of "Drone Oddball", with each drone having the computing devices (shown in FIGS. 1A to 2E) and methods disclosed throughout the present invention in accordance with one or more embodiments.

The objective of Drone Oddball game is to be the first drone to take possession of the VFP (exhibit an ACTIVE state of an instance of VFP) for some cumulative time, or be the drone with the most cumulative possession time (CPT) when some game timer runs out.

A first drone 436 with VFP 132 may be tagged by a second drone 438, at which point VFP 132 transfers to second drone 438 (progressively shown in FIGS. 4A to 4D).

The game may commence with the ACTIVE state of an instance of VFP for one drone. In this exemplary instance, drone 436 is determined (for example, by a toss of a coin) to exhibit an ACTIVE state of an instance of VFP 132. Alternatively (as shown in FIGS. 5A to 5E), the ACTIVE state of an instance of VFP 132 may be part of a Neutral computing device 124, which must be retrieved by one of the drones.

Figure 4A:
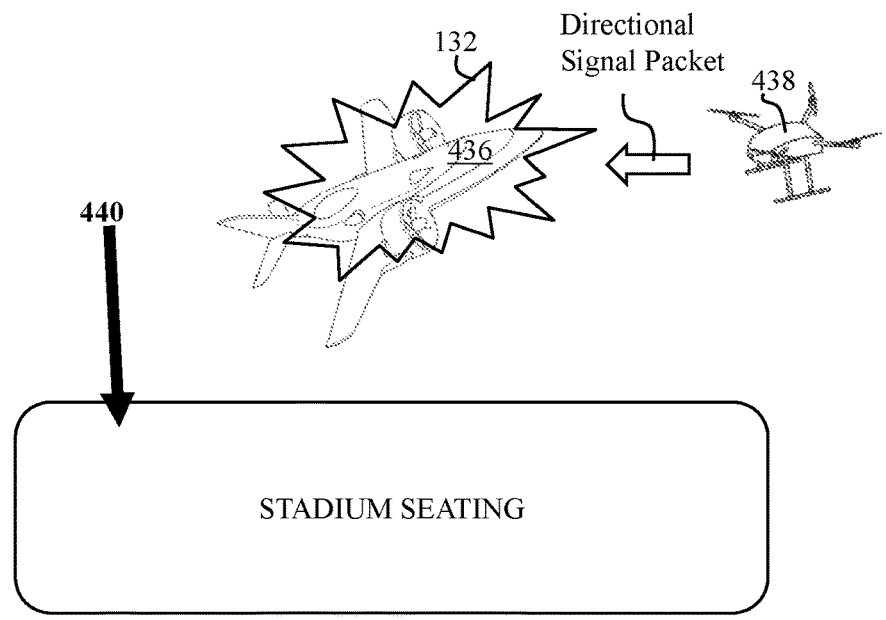
FIGS. 4A to 4D are non-limiting, exemplary illustrations of a gaming system that use physical drones in a real physical game of "Drone Oddball", with each drone having the computing devices (shown in FIGS. 1 to 2E) and methods disclosed throughout the present invention in accordance with one or more embodiments.
Figure 4B:
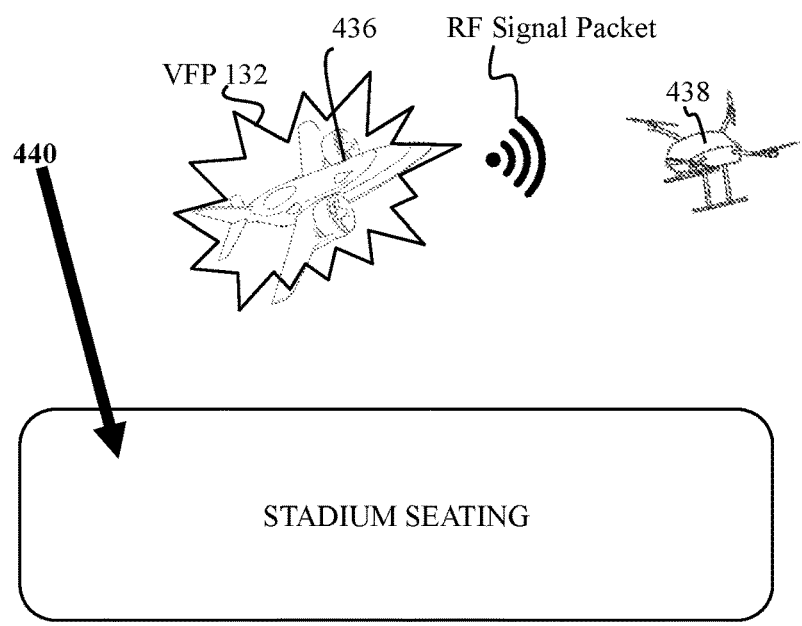
Figure 4C:
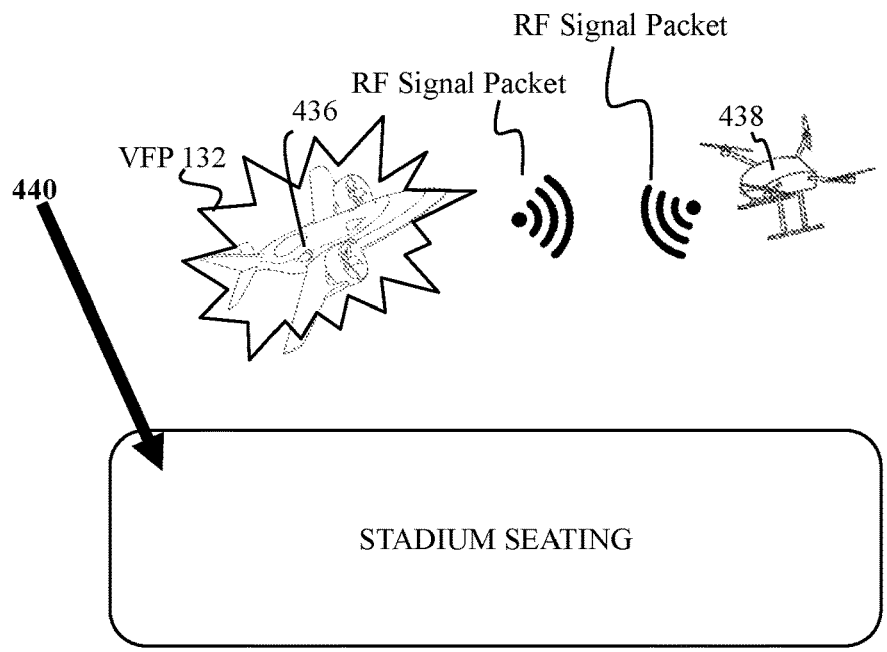
Figure 4D:
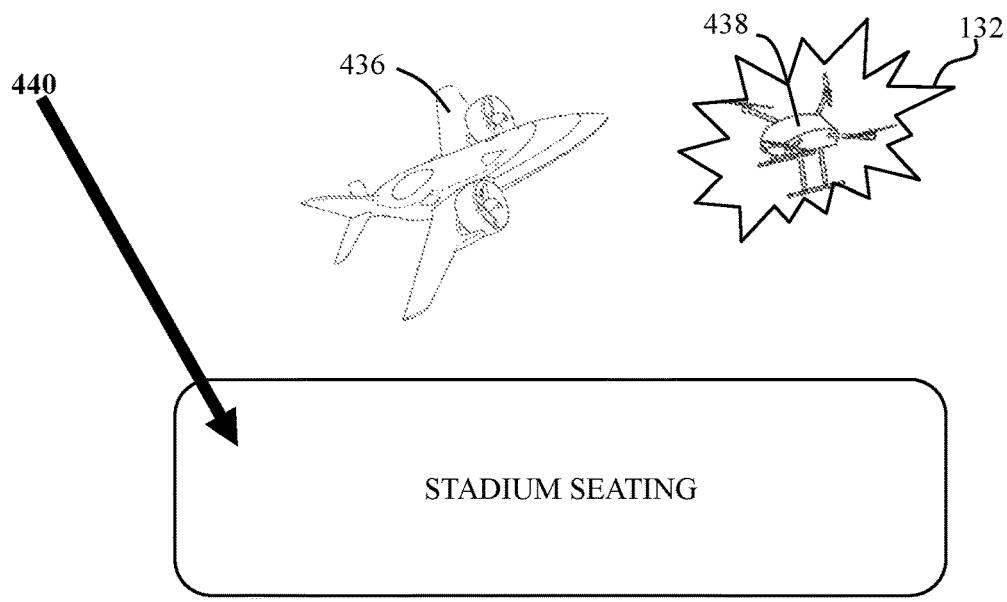

As demonstrated, a cumulative possession time (CPT) for both drone 436 and 438 may be accounted for using their respective MCU 166 executing operations shown in FIG. 3G for example. The process of tagging and transfer of VFP are described above in relation to flows of FIGS. 1A to 3M-7. In this instance, drone 438 transmits a directional signal packet to drone 436 as shown in FIG. 4A, with FIGS. 4B to 4D illustrating various RF Signal Packet communications/transmissions (as detailed above) between the computing devices of the drones 436 and 438 for reliable transfer of VFP 132 (finally shown in FIG. 4D). Please note that in FIG. 4D, the first drone 436 is now considered to be the "second computing device) as it now exhibits the IN-active state of an instance of VFP 132 and second drone 438 exhibits the ACTIVE state of an instance of VFP 132. As importantly, the entire game and the spectacular maneuvering of the drones are no longer confusing to spectators or players as they observe the VFP 132, with the game easily followed by all spectators 440 and players operating the drones. Additionally, as noted above, if a Central Command (e.g., an intermediary) computing device is used, then the CPT may be stored and transferred from the intermediary computing device in accordance with operations detailed in FIGS. 3G and 3K.

Gaming System Example 2

FIGS. 5A to 5E are non-limiting, exemplary illustrations of a gaming system that use physical drones in a real physical game of "free for all with a goal", with each drone having the computing devices (shown in FIGS. 1 to 2E) and methods disclosed throughout the present invention in accordance with one or more embodiments.

The aim of the game is to take possession of the VFP from a Neutral Computing device 124 with an ACTIVE state of an instance of a VFP 132 and score points by transferring the VFP 132 to a designated target 124 (which may comprise of another Neutral computing device 124).

Figure 5A:
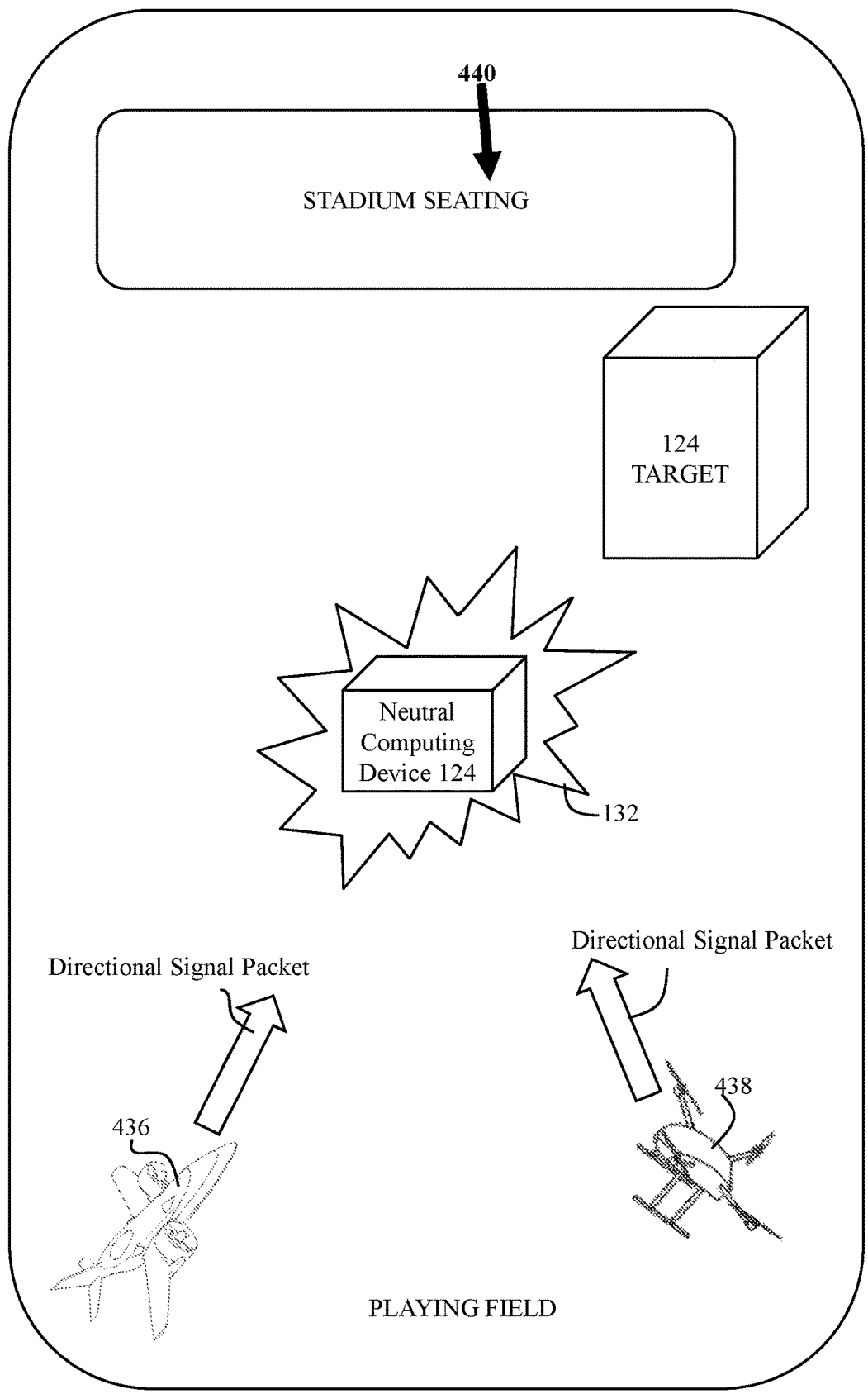
FIGS. 5A to 5E are non-limiting, exemplary illustrations of a gaming system that use physical drones in a real physical game of "free for all with a goal", with each drone having the computing devices (shown in FIGS. 1 to 2E) and methods disclosed throughout the present invention in accordance with one or more embodiments.

As illustrated in FIG. 5A, both drones 436 and 438 transmit Directional Signal Packets with the aim of first targeting the Neutral computing device 124 to retrieve its ACTIVE state of an instance of a VFP 132 as shown.

Figure 5B:
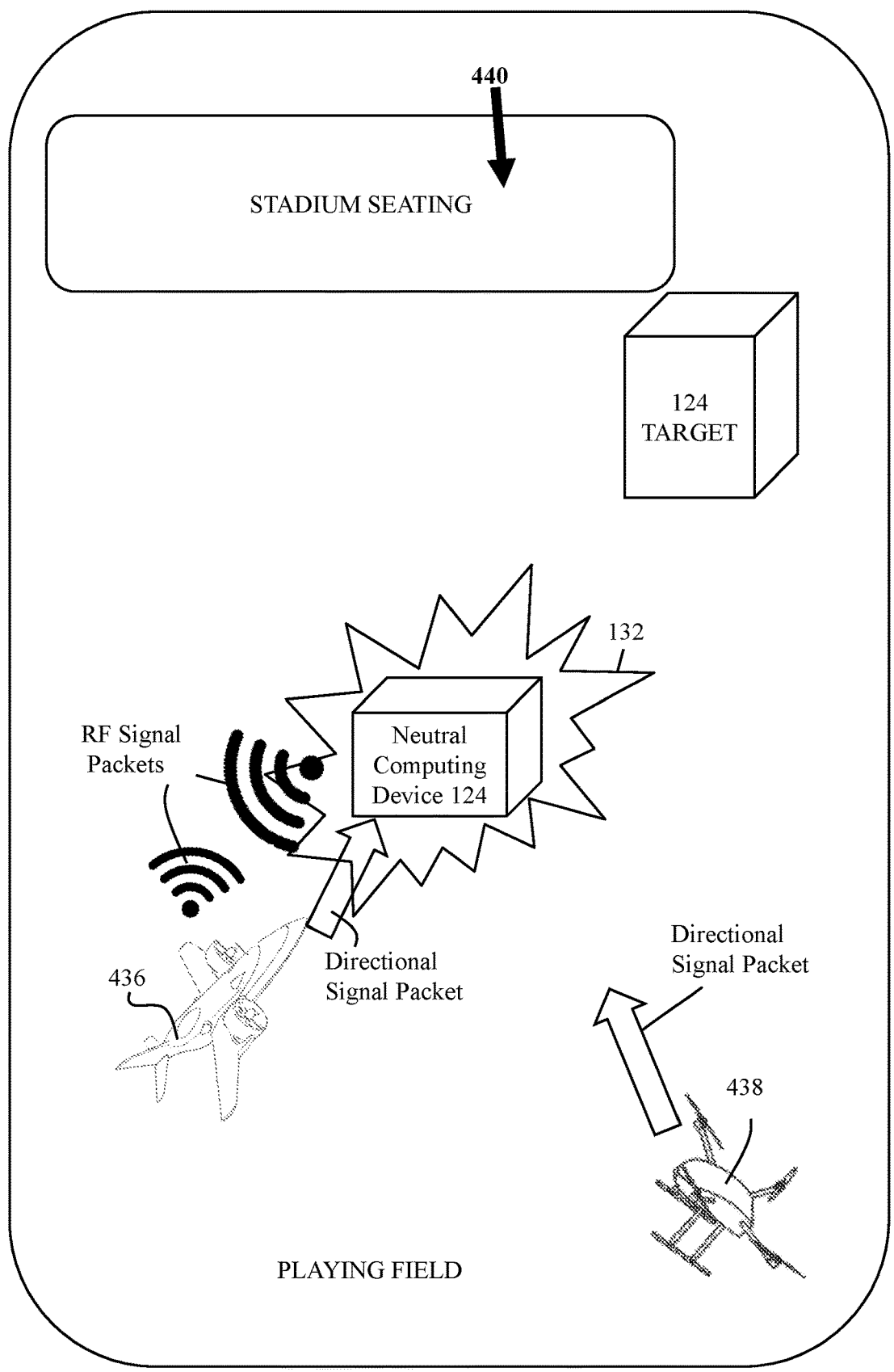
Figure 5C:
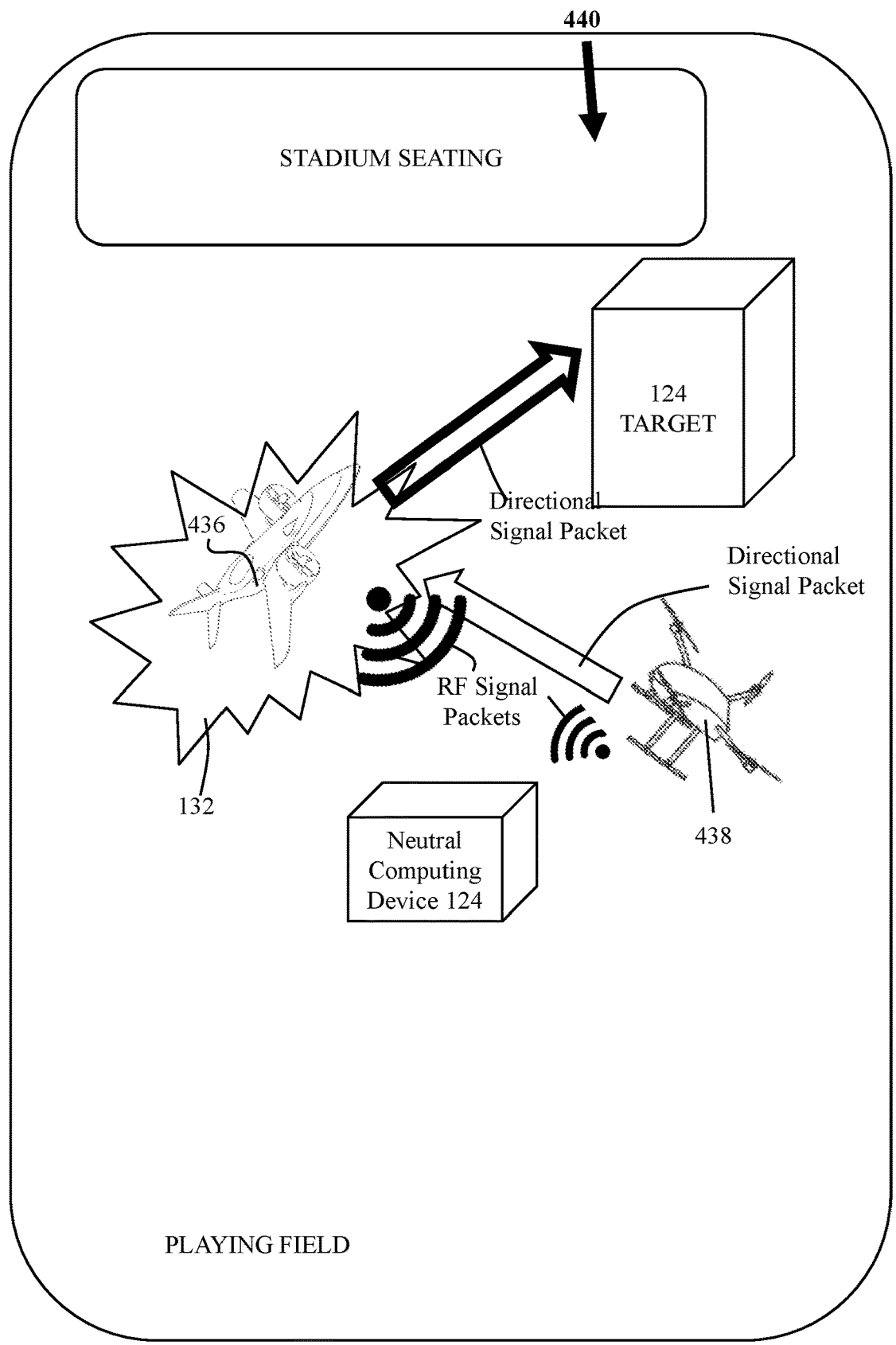

As illustrated in FIG. 5B, drone 436 successfully tags Neutral computing device 124 before drone 438 and hence, the ACTIVE state of an instance of a VFP 132 is transferred (via RF Signal Packets) from Neutral computing device 124 to the computing device of drone 436 (also shown in FIG. 5C).

As best illustrated in FIG. 5C, drone 436 transmits a Directional Signal Packet to the target goal 124 however, the transmitted signal is not received by target goal 124 (e.g., IR Tx from drone 436 was not in the line of sight of IR Rx of the target goal 124). On the other hand, drone 438 also transmits a Directional Signal Packet to drone 436 to retrieve (tag, take possession, etc.) its VFP 132 from drone 436. As shown, the Directional Signal Packet was properly received, resulting in RF Signal Packet exchanges for VFP transfer from drone 436 to drone 438 (best shown in FIG. 5D).

Figure 5D:
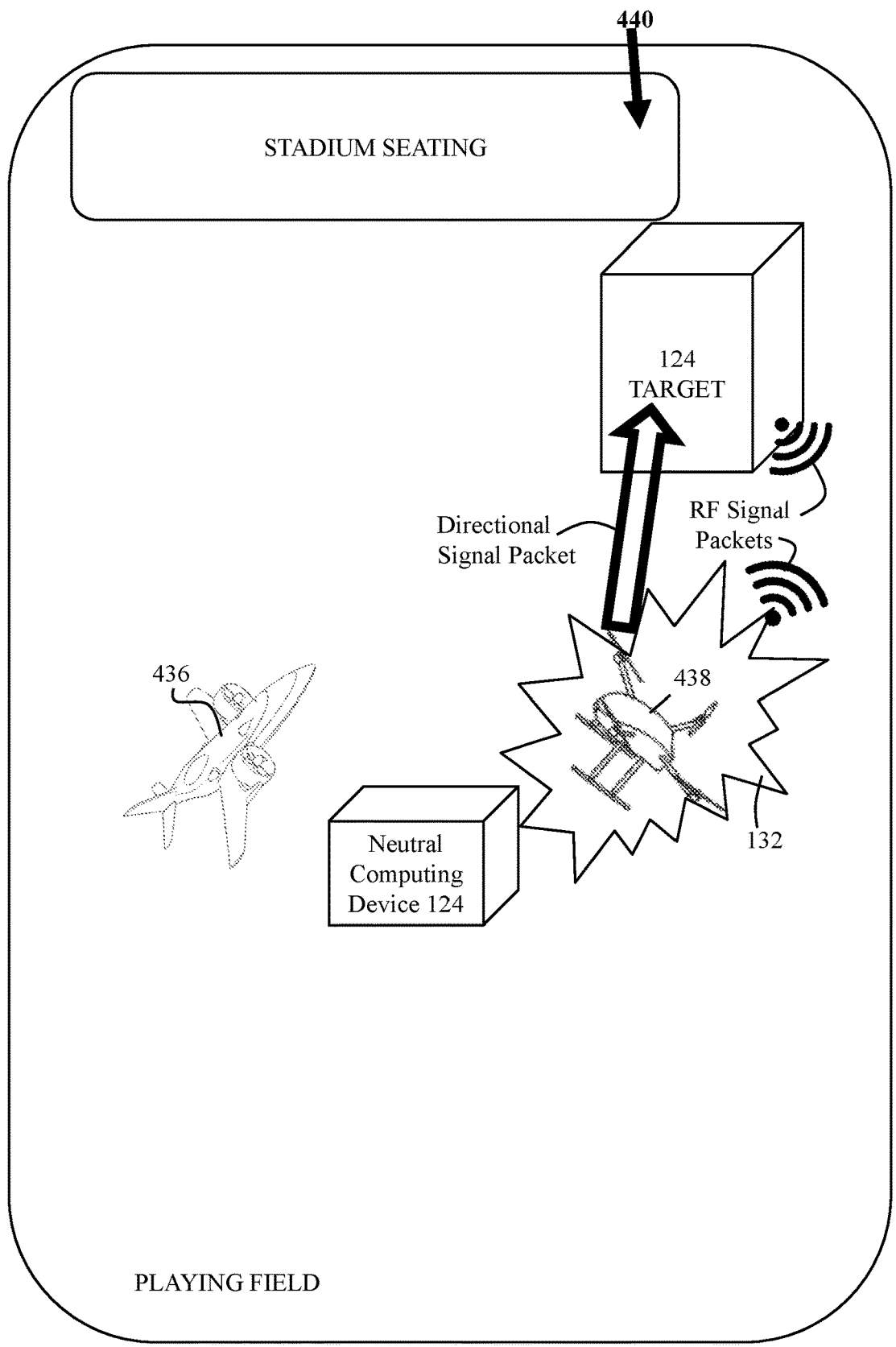
Figure 5E:
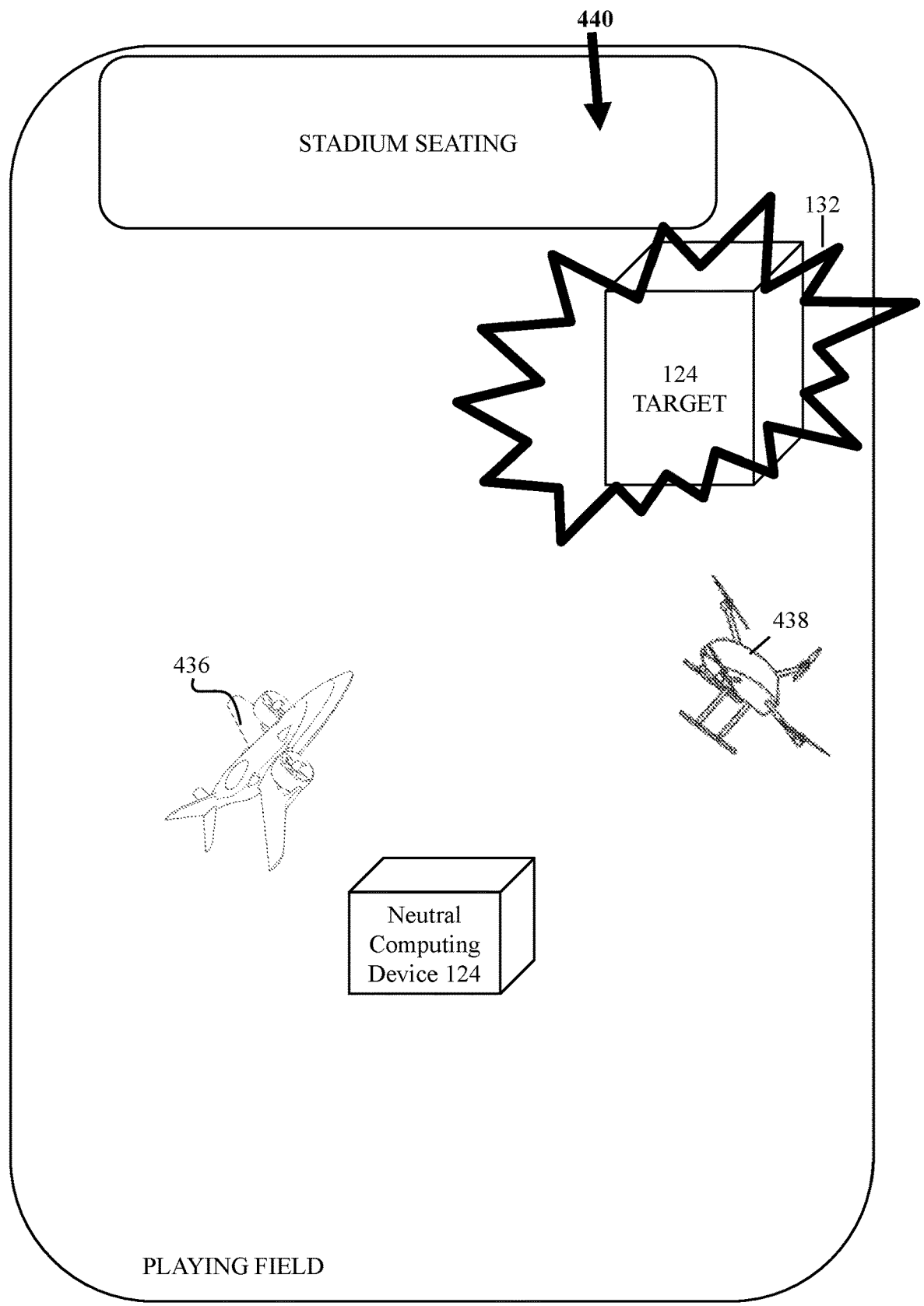

As illustrated in FIG. 5D, drone 438 also transmits Directional Signal Packet, which is successfully received by IR Rx of the target goal 124 at which point RF Signal Packets are exchanged for transfer of VIP 132 from drone 438 to target goal 124 (best shown in FIG. 5E), thus scoring point for the team of drone 438. The game may continue for a limited amount of time at which point, the drone with the highest score wins.

Gaming System Example 3

FIGS. 6A to 6F are non-limiting, exemplary illustrations of a gaming system that use physical drones in a real physical game of "Drone Football" with each drone having the computing devices (shown in FIGS. 1 to 2E) and methods disclosed throughout the present invention in accordance with one or more embodiments.

Figure 6A:
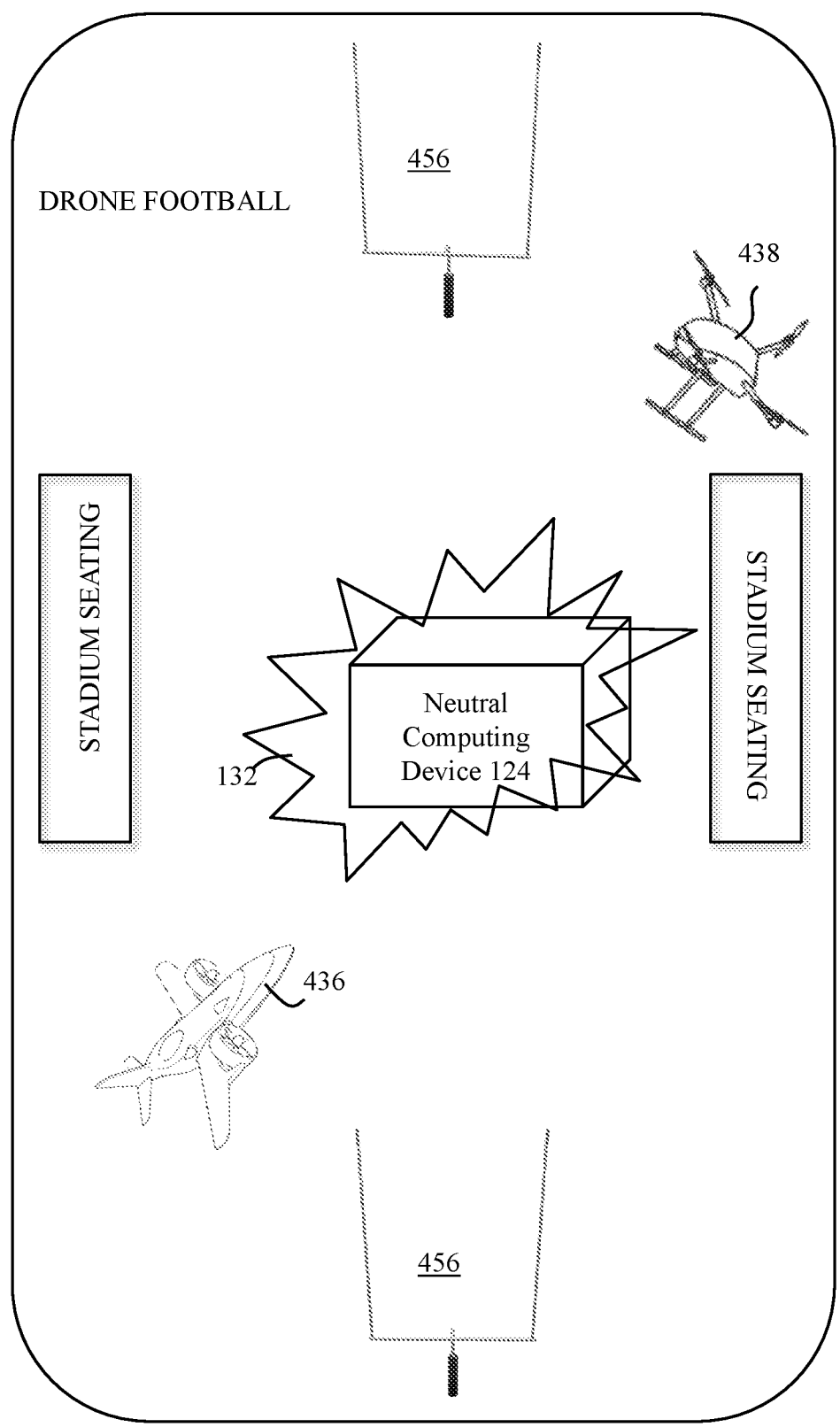
FIGS. 6A to 6F are non-limiting, exemplary illustrations of a gaming system that use physical drones in a real physical game of "Drone Football" with each drone having the computing devices (shown in FIGS. 1 to 2E) and methods disclosed throughout the present invention in accordance with one or more embodiments.
Figure 6B:
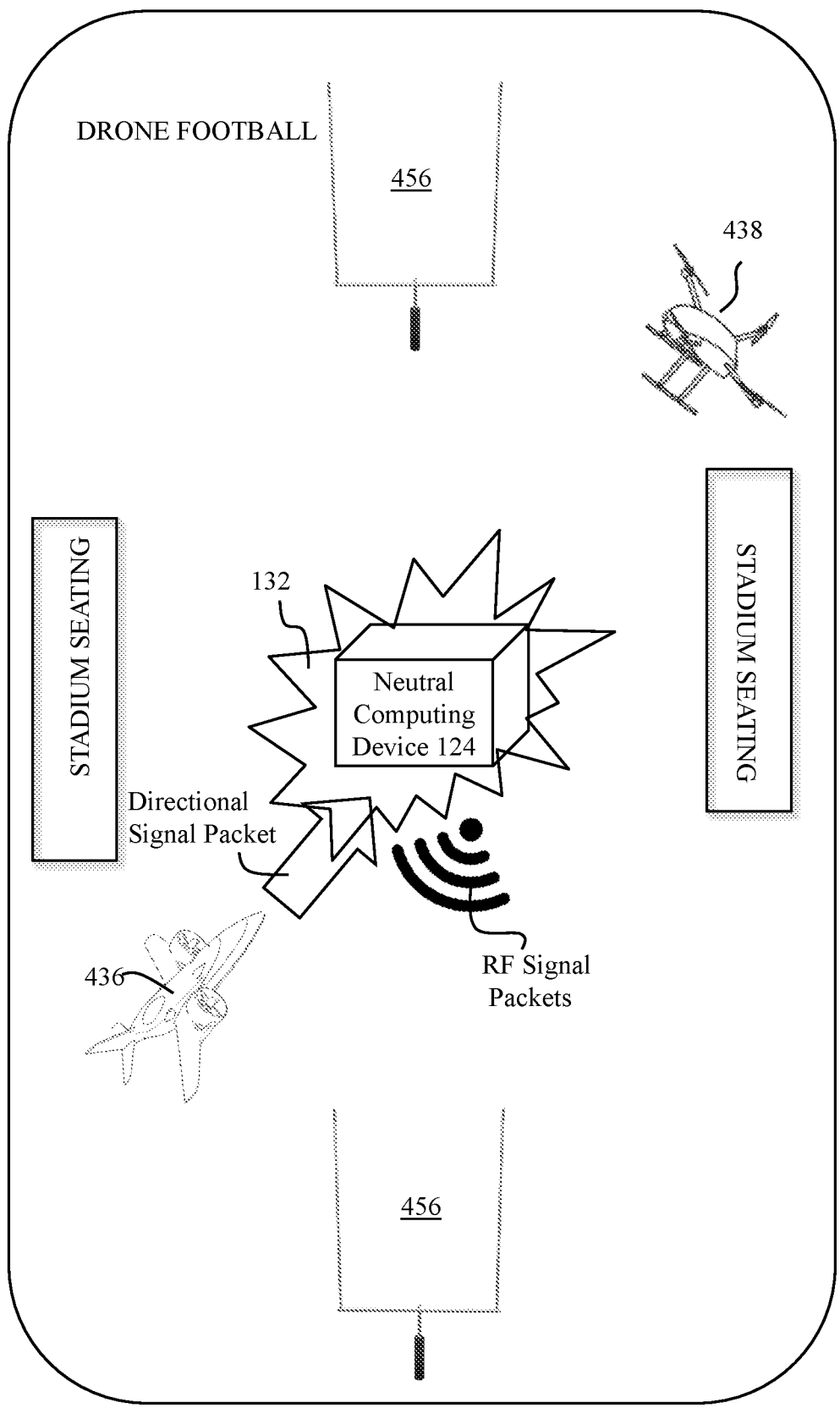
Figure 6C:
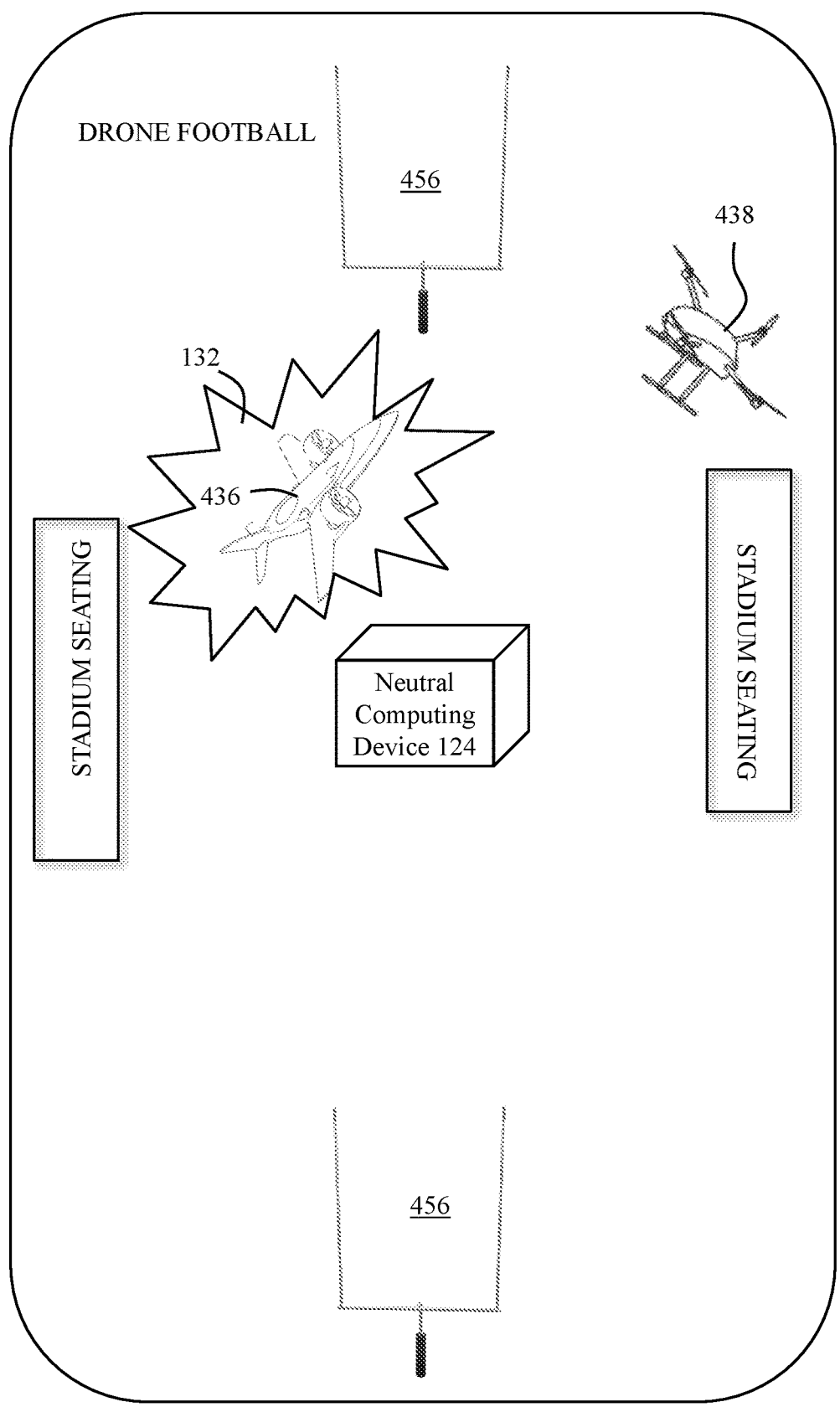
Figure 6D:
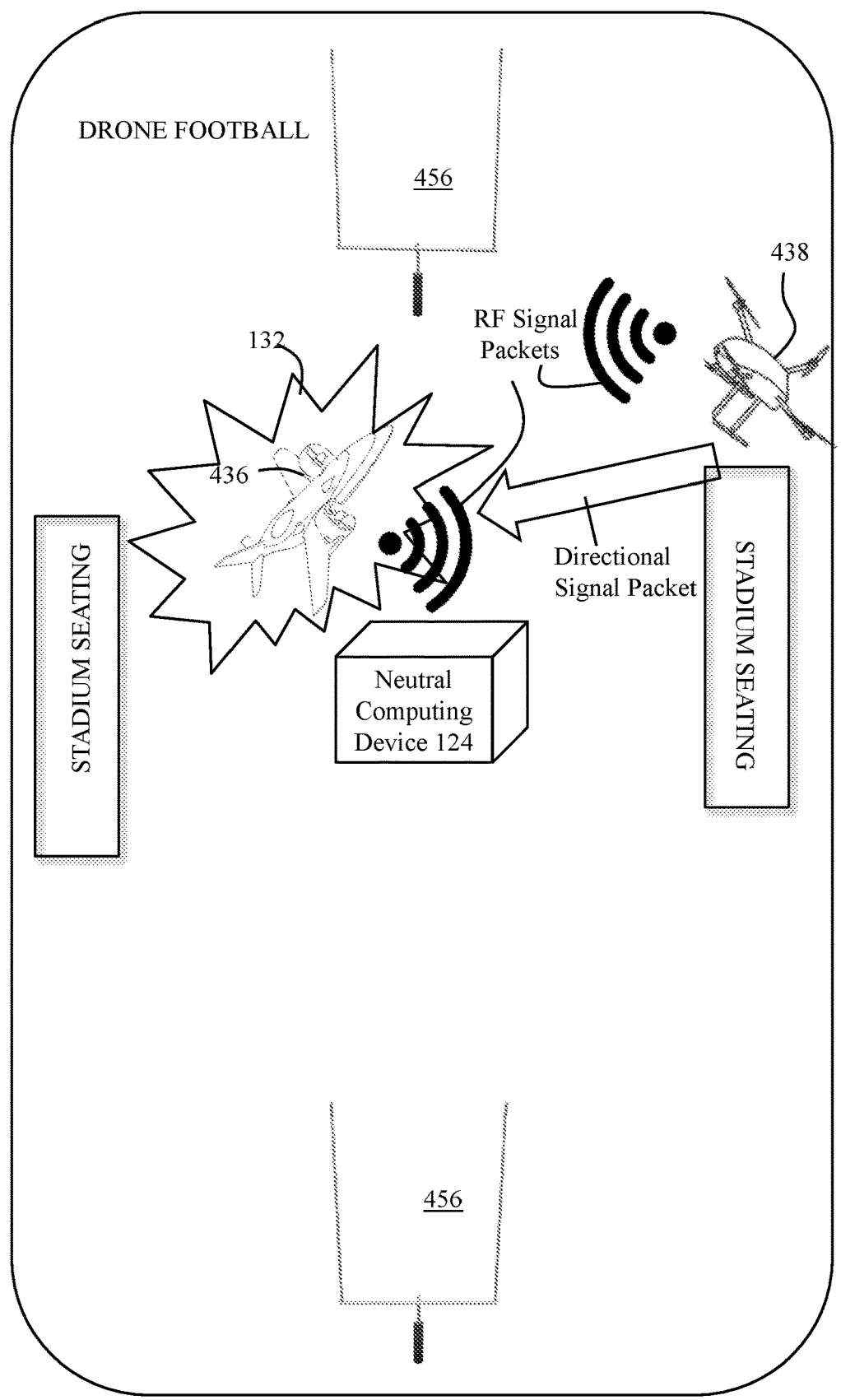
Figure 6E:
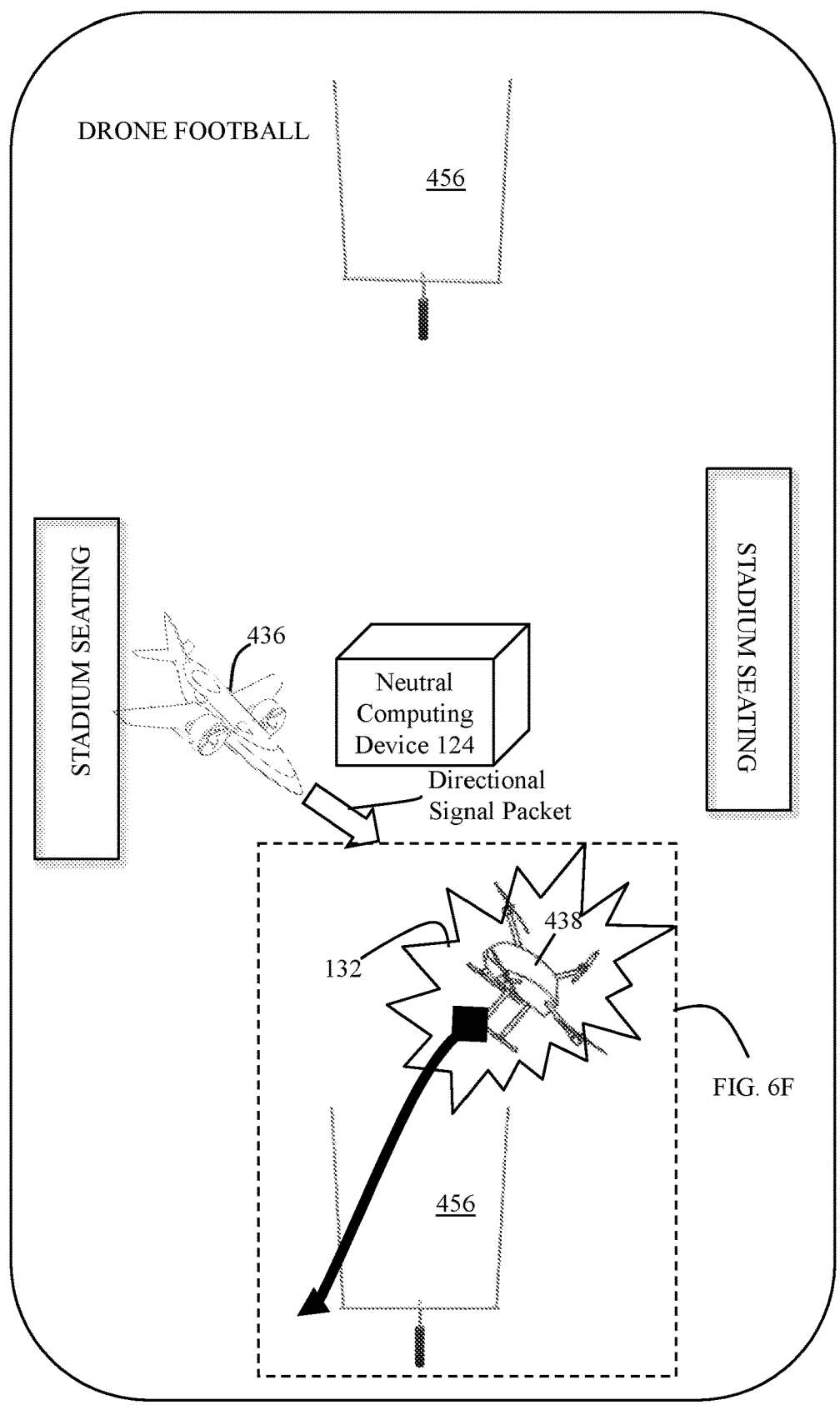
Figure 6F:
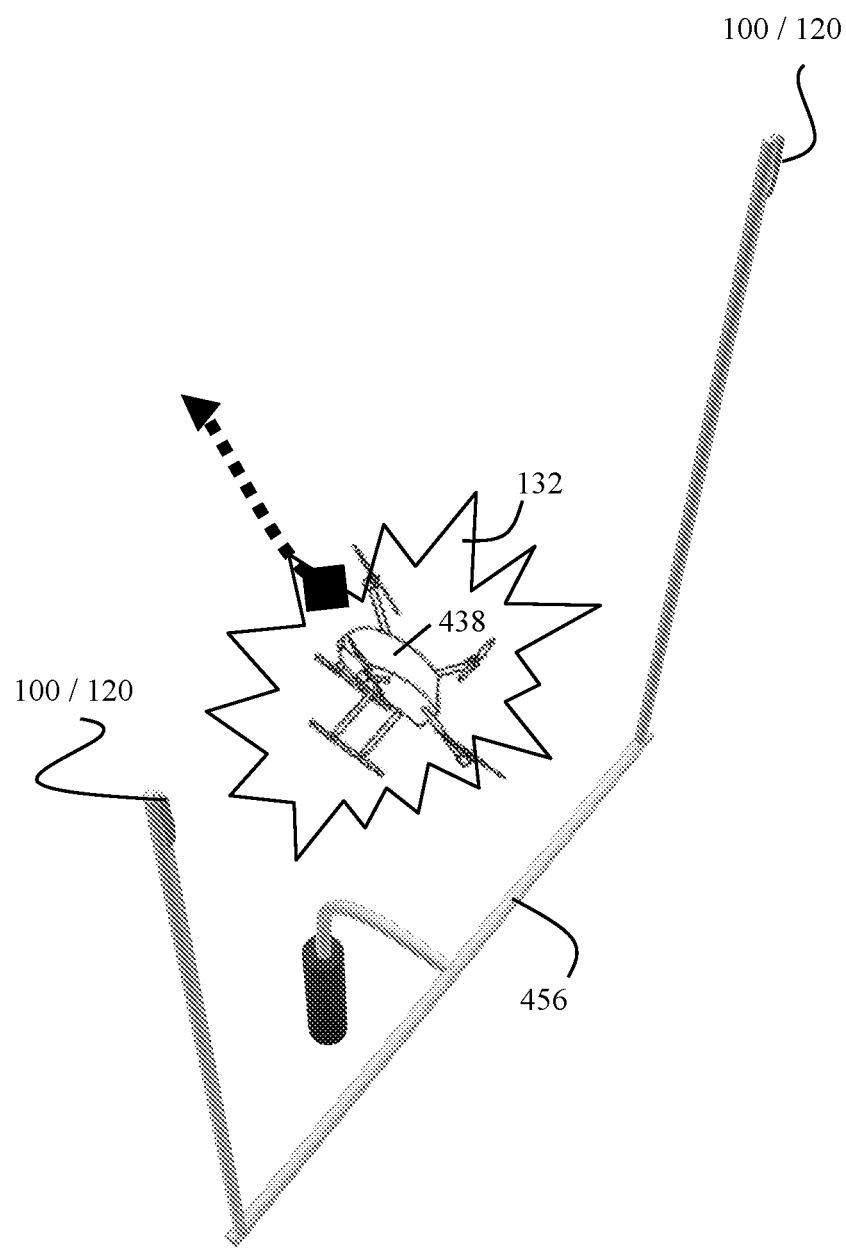

This physical game is similar to a football with goal posts 456 that may be on opposite sides of a football field, which may include additional sensors 120 or computing devices 100 (best shown in FIG. 6F).

In this game, a point is scored whenever a drone with an ACTIVE state of an instance of a VFP 132 flies between the goal posts of the opposite team (best shown in FIGS. 6E and 6F).

After a score, ACTIVE state of an instance of a VFP 132 may switch to the opposing team and the game continues (as with any football game). It should be noted that a coin toss may determine which team has the initial ACTIVE state of an instance of a VFP 132. Alternatively, as with FIGS. 5A to 5D, Neutral computing device 124 may also be used to determine which drone will have the ACTIVE state of an instance of a VFP 132 in the manner discussed in FIGS. 5A to 5D.

When the game starts, the objective is for the drone with an ACTIVE state of an instance of a VFP 132 to pass between goal posts 456. A drone may lose the ACTIVE state of the instance of the VFP 132 (e.g., FIG. 6D) when that drone 436 is successfully tagged by another drone 438 of the opposing team.

In this game, the drone with ACTIVE state of the instance of the VFP 132 does not emit IR signal to tag any other drone (for example, as per the operations 304 of the flowchart shown in FIG. 3A). Of course, the drone with the ACTIVE state of the instance of the VFP 132 is vulnerable to being tagged, resulting in IN-active state of an instance of a VFP 132 (FIG. 6D).

Player computing devices (e.g., drones) with IN-active state of an instance of a VFP 132 may both tag and potentially be tagged by drones. For example, if a drone IN-active state of an instance of a VFP 132 is tagged, that drone may temporarily lose the ability to emit IR signal to tag other drones for a certain period.

Based on the above game mechanics, a cooperative strategy develops because teammates of the drone with ACTIVE state of an instance of a VFP 132 will try to fly in formation in order to protect the drone with ACTIVE VFP 132 from opponents.

Opponents being tagged will be temporarily unable to tag and thus, giving additional time for the drone with ACTIVE state of an instance of a VFP 132 to maintain possession (for those instances where CPT is desired).

Gaming System Example 4

Figure 7A:
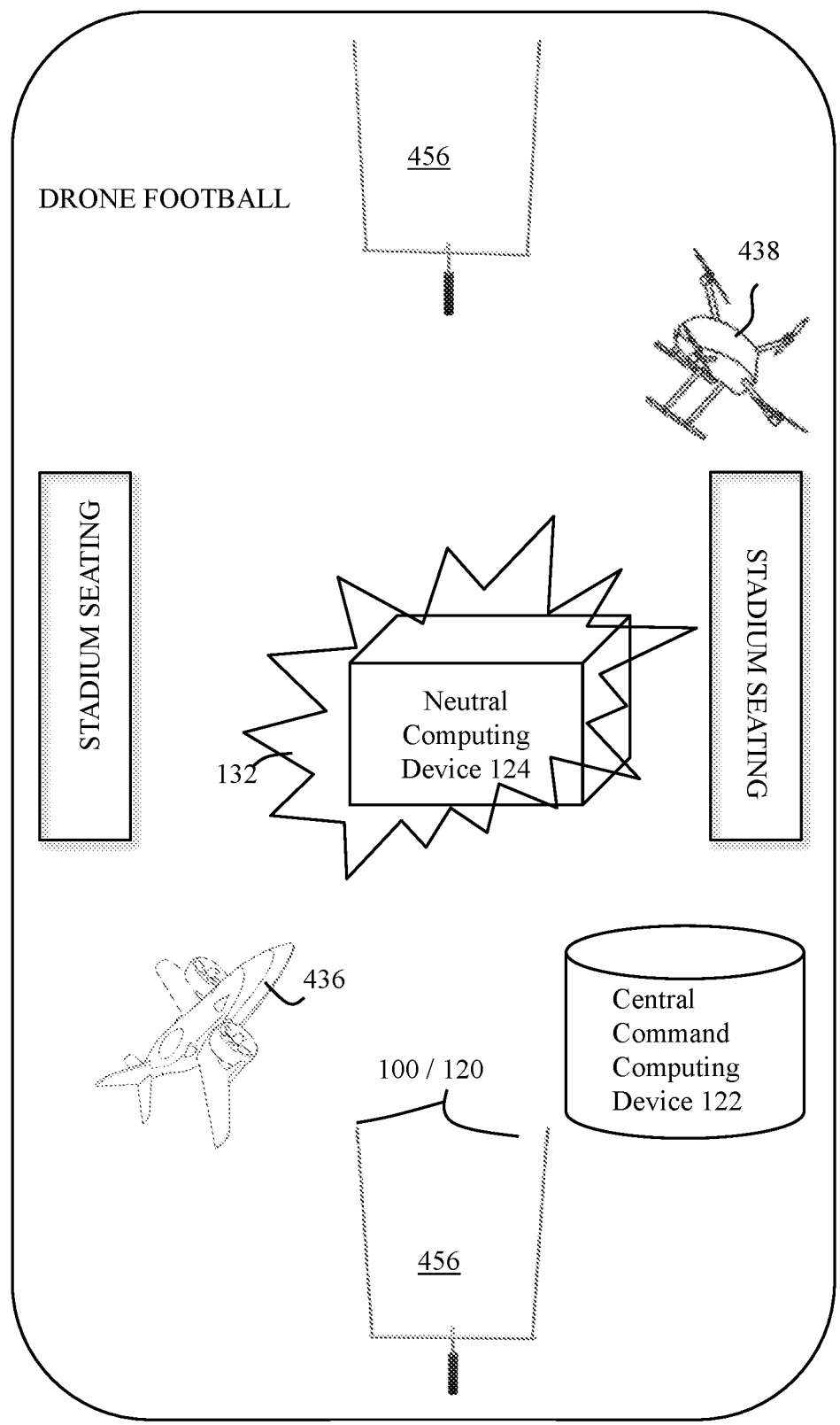
FIGS. 7A to 7G are non-limiting, exemplary illustrations of a gaming system that use physical drones in a real physical game of "Drone Football" that uses a central command computing device 122 (as an arbitrator) for VFP possession, with each drone having the computing devices (shown in FIGS. 1 to 2E) and methods disclosed throughout the present invention in accordance with one or more embodiments.
Figure 7B:
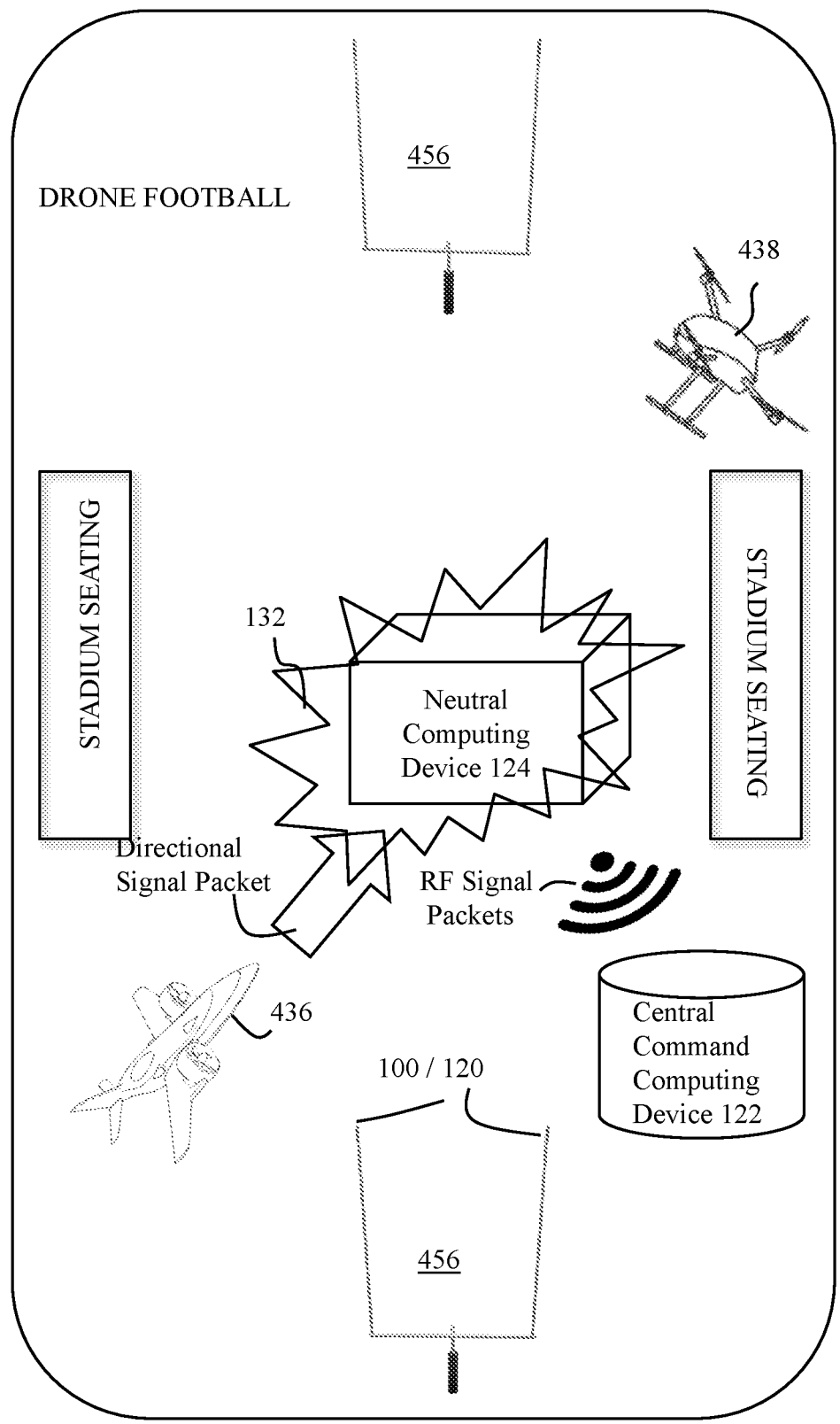
Figure 7C:
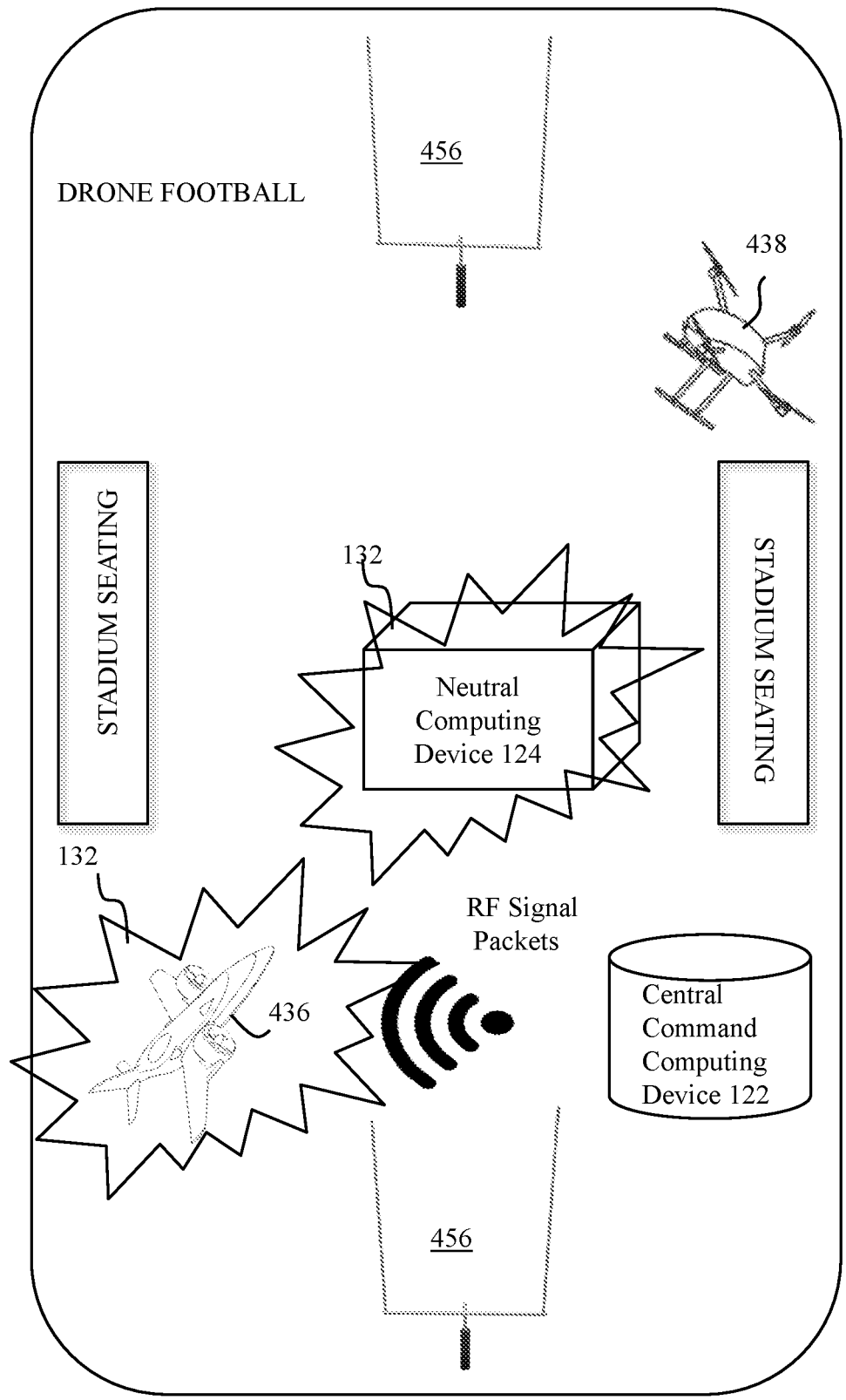
Figure 7D:
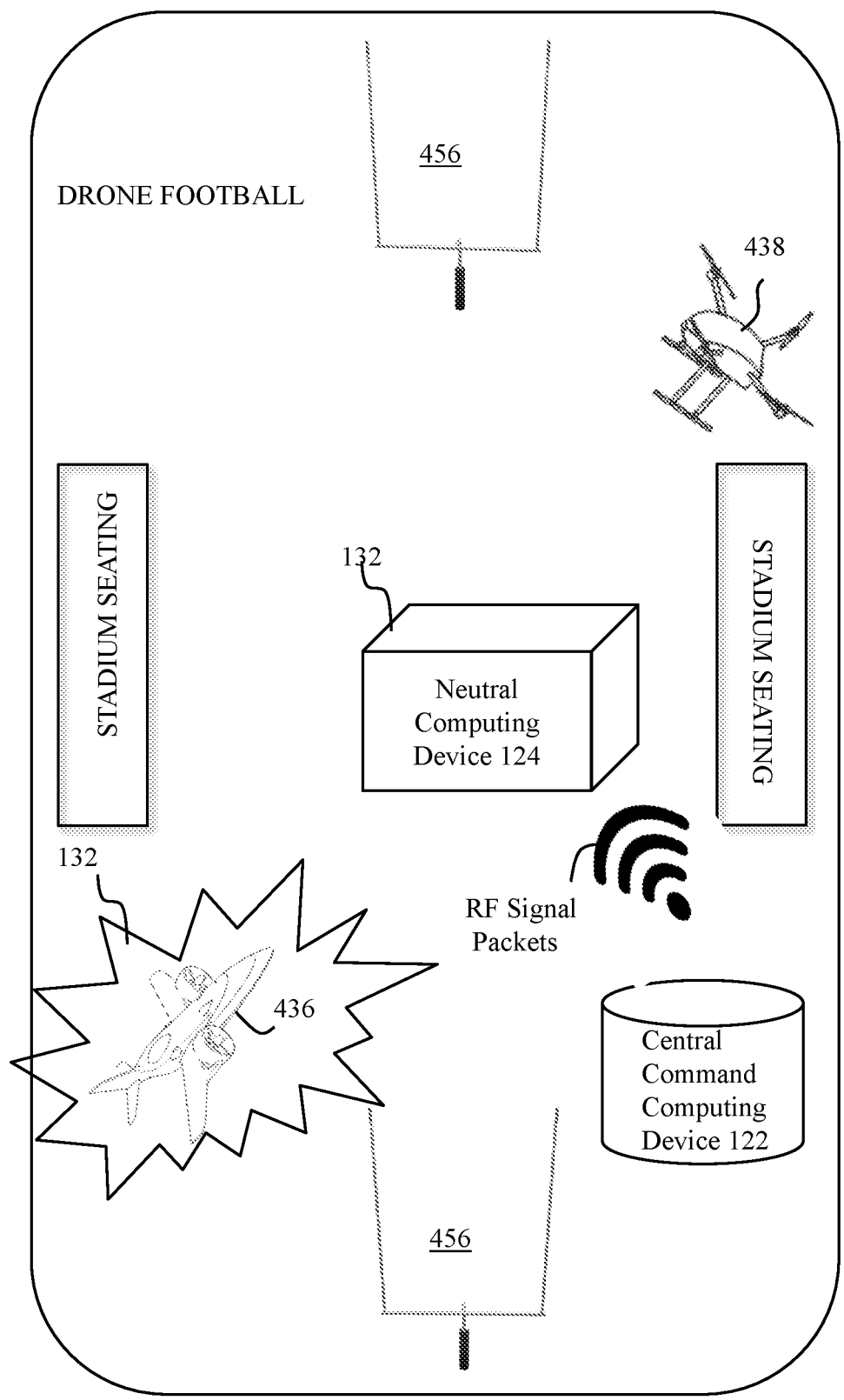
Figure 7E:
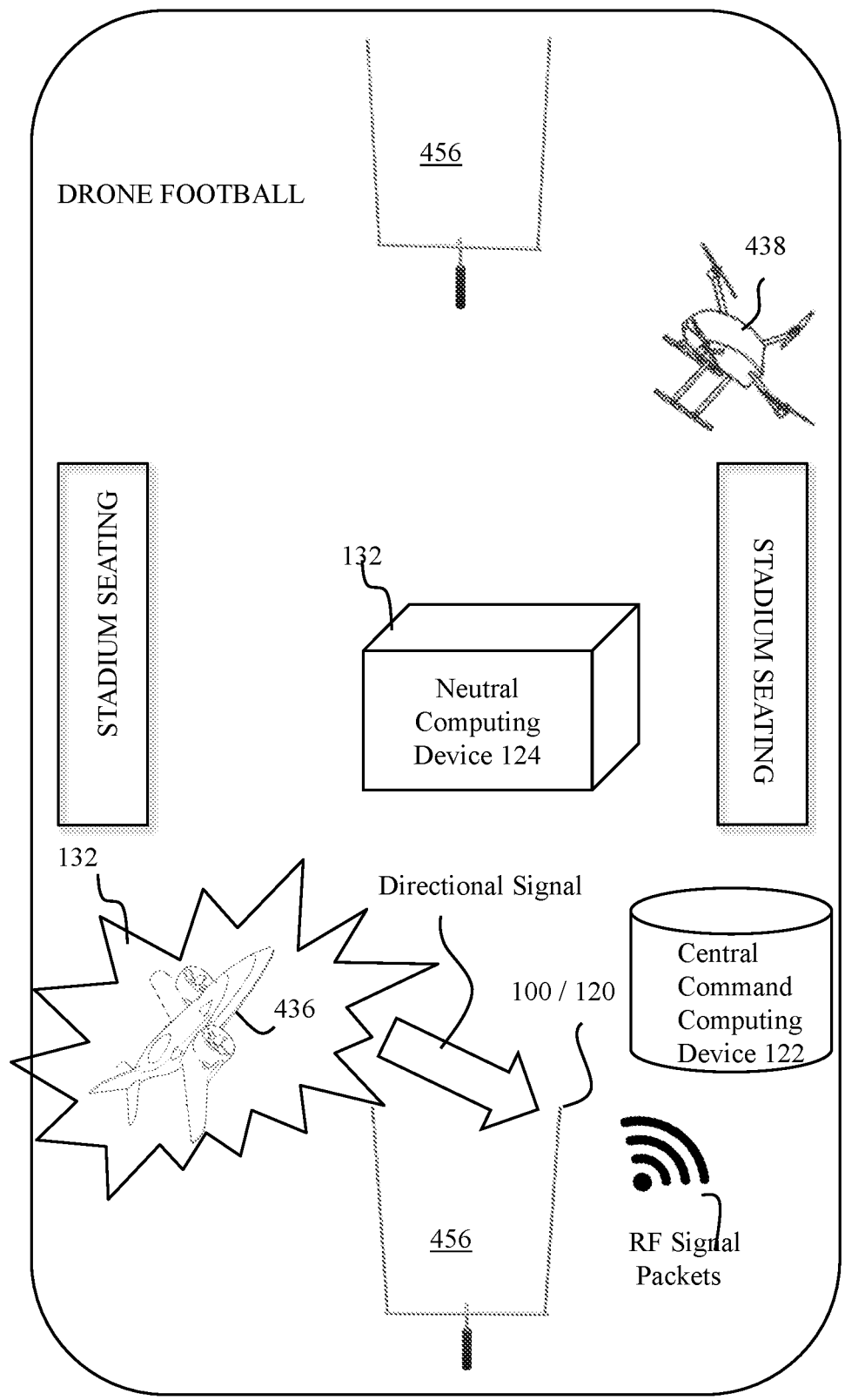
Figure 7F:
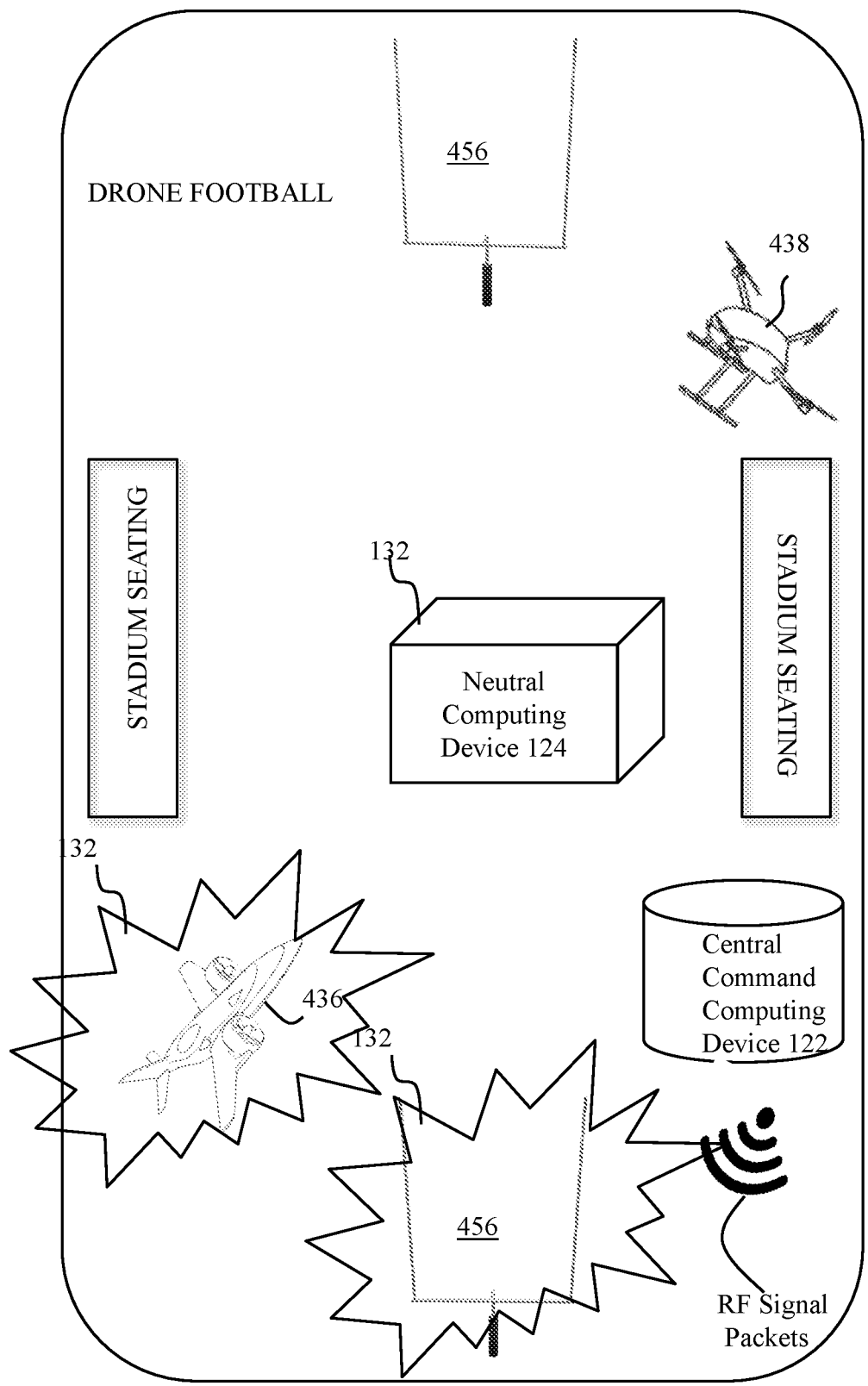
Figure 7G:
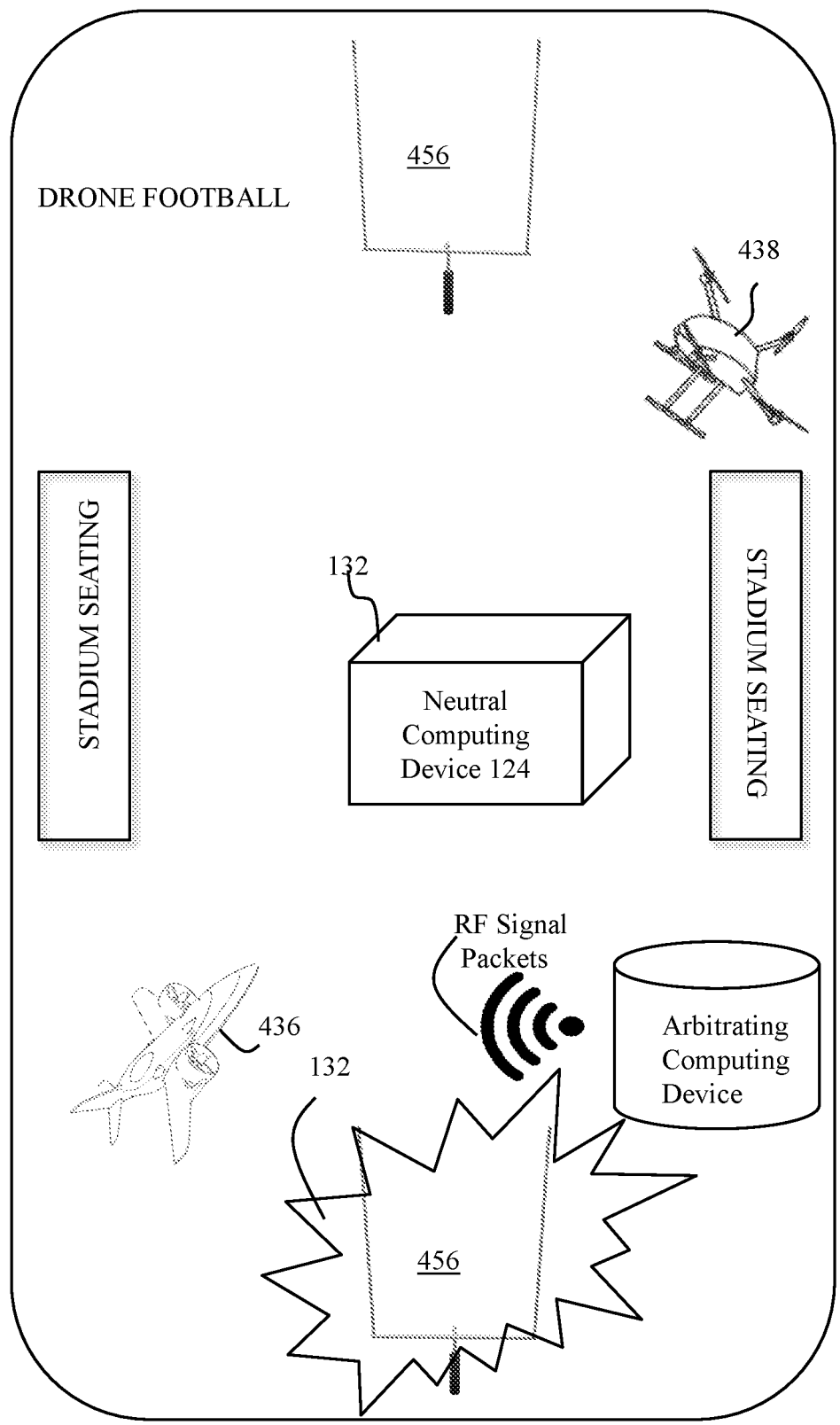

FIGS. 7A to 7G are non-limiting, exemplary illustrations of a gaming system that use physical drones in a real physical game of "Drone Football" that uses a central command computing device 122 (as an arbitrator) for VFP possession, with each drone having the computing devices (shown in FIGS. 1 to 2E) and methods disclosed throughout the present invention in accordance with one or more embodiments. As detailed below, FIGS. 7A to 7D illustrate taking of VFP 132 using the arbitrating computing device 122, and FIGS. 7E to 7G illustrate passing of VFP 132 using the arbitrating computing device 122.

This physical game is similar to a football with goal posts 456 that may be on opposite sides of a football field, which may include additional sensors 120 and or computing devices 100.

In this game, a point is scored whenever a drone with an ACTIVE state of an instance of a VFP 132 passes VFP 132 to computing device 100 associated with the goal posts 456 of the opposite team. In other words, the drone need not go through the goal posts 456.

In this non-limiting, exemplary instance, neutral computing device 124 may be used to determine which drone will have the ACTIVE state of an instance of a VFP 132 in the manner discussed in FIGS. 5A to 5D, but with all VFP transfers and possessions arbitrated by central command computing device 122, as detailed below.

After a score, ACTIVE state of an instance of a VFP 132 may switch back to the opposing team and or the neutral computing device 124 and the game continues as with any football game.

FIG. 7A illustrates a start of the game where drones 436 and 438 are flying over the football field. In the very instance shown, drone 436 is near goal post 456 of the opposing team (e.g., drone 438).

As shown in FIG. 7B, drone 436 near the opposing team goal post 456, successfully transmits a directional signal to take possession of the VFP 132 from neutral computing device. Upon receipt of the directional signal, neutral computing device transmits an RF signal packet to the central command computing device 122, indicating a "hit."

FIG. 7C illustrates central command computing device 122 transmitting an RF signal packet to drone 436, instructing it to activate VFP 132, and FIG. 7D illustrates central command computing device 122 transmitting an RF signal packet to Neutral Computing device 124 to turn OFF VFP 132. It should be noted that the order by which the central command computing device 122 turns ON or OFF VFP 132 of various computing devices may be varied. Nonetheless, at this stage, drone 436 has possession of VFP 132 and is near goal post 456 of opposing team mate drone 438.

As shown in FIG. 7E, drone 436 successfully transmits a directional signal to pass VFP 132 to computing device 100 associated with goal post 456 of the opposing team (drone 438) to score a goal. Upon receipt of the directional signal, computing device 100 associated with goal post 456 transmits an RF signal packet to the central command computing device 122, indicating a "hit" or "successful pass."

As shown in FIG. 7F, central command computing device 122 transmits an RF signal packet to computing device 100 associated with the goal post 456 to turn ON VFP 132, and as shown in FIG. 7G, central command computing device 122 transmits an RF signal packet to drone 436 to turn OFF VFP 132. As indicated above, the order of turning ON/OFF of various computing devices may be varied.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. For example, any one or more of the specified payloads of any one or more of any signal packet (s) may be varied and or moved to other packets, based on game, game rules, efficiency of data transfer, or many other factors, etc. As another example, the hardware and methods presented are not limited to be mounted on drones, but can equally apply to any moving object that is human controlled such as Radio Controlled (RC) cars, RC boats, or running players wearing computing devices 100. Such variations and alternative embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, lateral, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced items.

The use of the phrases "and or," "and/or" throughout the specification (if any used) indicate an inclusive "or" where for example, A and or B should be interpreted as "A," "B," or both "A and B."

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A gaming system, comprising:
   a plurality of computing devices;
   a computing device of the plurality of the computing devices initially exhibits an active state of an instance of a Virtual Focal Point (VFP); and
   one or more other computing device of the plurality of the computing devices initially exhibits an in-active state of the instance of the VFP;
   wherein: the VFP of the computing device is transferred to one of the one or more other computing device with the in-active state of the instance of the VFP when the computing device receives a targeted signal from the one of the one or more other computing device and
   wherein: a cumulative possession time (CPT) counter of the computing device is varied until the computing device receives a Directional Signal Packet at which point, the CPT counter is stopped.

2. The system as set forth in claim 1, wherein:
   the targeted signal is a Directional Signal Packet transmitted by the one of the one or more other computing device.

3. The system as set forth in claim 2, wherein:
   the computing device transmits an omni-directional VFP Handoff Signal Packet upon reception of the Directional Signal Packet.

4. The system as set forth in claim 3, wherein:
   the computing device further initiates VFP Transfer Process of the VFP.

5. The system as set forth in claim 4, wherein:
   the one of the one or more other computing device receives the omni-directional VFP Handoff Signal Packet.

6. The system as set forth in claim 5, wherein:
   the one of the one or more other computing device transmits an omni-directional VFP Handoff ACK Signal Packet upon reception of the VFP Handoff Signal Packet, and initiates VFP Transfer Process of the VFP.

7. The gaming system as set forth in claim 1, wherein:
   the one of the one or more other computing device receives a VFP Handoff Signal Packet and initiates a transfer of VFP.

8. The gaming system as set forth in claim 1, wherein:
   the computing device with the received Directional Signal Packet broadcasts a VFP Release Signal Packet, transferring VFP and CPT to the one of the one or more other comporting device.

9. The gaming system as set forth in claim 1, wherein:
   the computing device is a Neutral Computing device.

10. The gaming system as set forth in claim 1, wherein:
the one of the one or more other computing device computing device is a Neutral Computing device.

11. The gaming system as set forth in claim 3, wherein:
the omni-directional VFP Handoff Signal Packet is transmitted via a Central Command computing device.

12. The gaming system as set forth in claim 3, wherein:
the active state of the instance of the VFP is transferred from the computing device to the one of the one or more other computing device.

* * * * *